United States Patent
Back et al.

(10) Patent No.: US 12,238,620 B2
(45) Date of Patent: Feb. 25, 2025

(54) METHOD AND DEVICE FOR TRANSMITTING AND RECEIVING A PLURALITY OF COOPERATIVE AWARENESS MESSAGE (CAM) INFORMATION IN A V2X SYSTEM

(71) Applicant: LG ELECTRONICS INC., Seoul (KR)

(72) Inventors: Seoyoung Back, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 539 days.

(21) Appl. No.: 17/594,080

(22) PCT Filed: Apr. 11, 2019

(86) PCT No.: PCT/KR2019/004360
§ 371 (c)(1),
(2) Date: Oct. 1, 2021

(87) PCT Pub. No.: WO2020/209420
PCT Pub. Date: Oct. 15, 2020

(65) Prior Publication Data
US 2022/0217513 A1 Jul. 7, 2022

(51) Int. Cl.
*H04W 4/40* (2018.01)
*H04W 74/0808* (2024.01)

(52) U.S. Cl.
CPC ......... *H04W 4/40* (2018.02); *H04W 74/0808* (2013.01)

(58) Field of Classification Search
CPC ........... H04W 4/40; H04W 4/42; H04W 4/44; H04W 4/46; H04W 4/48; H04W 74/0808
See application file for complete search history.

(56) References Cited

U.S. PATENT DOCUMENTS 11,343,712 B2 * 5/2022 Hwang ............ H04W 28/0289
2015/0156662 A1 * 6/2015 Bai ........................ G08G 1/163
370/231

(Continued)

FOREIGN PATENT DOCUMENTS

KR  1020180125576  11/2018
KR  1020190002465   1/2019

OTHER PUBLICATIONS

PCT International Application No. PCT/KR2019/004360, International Search Report dated Jan. 10, 2020, 5 pages.

*Primary Examiner* — Jeong S Park
(74) *Attorney, Agent, or Firm* — LEE, HONG, DEGERMAN, KANG & WAIMEY

(57) ABSTRACT

The present invention provides a method for transmitting a plurality of pieces of CAM information in a V2X system. More specifically, the method, which is to be performed by a vehicle, includes: a step for transmitting a first message, including first information indicating whether a plurality of pieces of CAM information can be combined, to a base station through a first interface; a step for receiving, from the base station, a second message requesting that the plurality of pieces of CAM information be combined and transmitted; a step for receiving the plurality of pieces of CAM information from nearby vehicles through a second interface; and a step for transmitting a third message including the plurality of pieces of CAM information to the base station through the first interface.

13 Claims, 29 Drawing Sheets

(56) References Cited

U.S. PATENT DOCUMENTS

| | | | |
|---|---|---|---|
| 2018/0049220 A1 | 2/2018 | Patil et al. | |
| 2018/0120861 A1* | 5/2018 | Saxena | G05D 1/0291 |
| 2018/0359713 A1* | 12/2018 | Boban | H04W 64/00 |
| 2018/0376308 A1 | 12/2018 | Xiao et al. | |
| 2019/0090173 A1 | 3/2019 | Xiao et al. | |
| 2019/0222979 A1* | 7/2019 | Hahn | H04W 76/27 |
| 2019/0306911 A1* | 10/2019 | Hahn | H04W 72/20 |
| 2020/0192355 A1* | 6/2020 | Lu | G08G 1/09675 |
| 2020/0312128 A1* | 10/2020 | Higuchi | G08G 1/096791 |
| 2022/0005353 A1* | 1/2022 | Hwang | H04W 4/40 |
| 2022/0095152 A1* | 3/2022 | Szilagyi | H04W 4/46 |

\* cited by examiner

[FIG. 1]
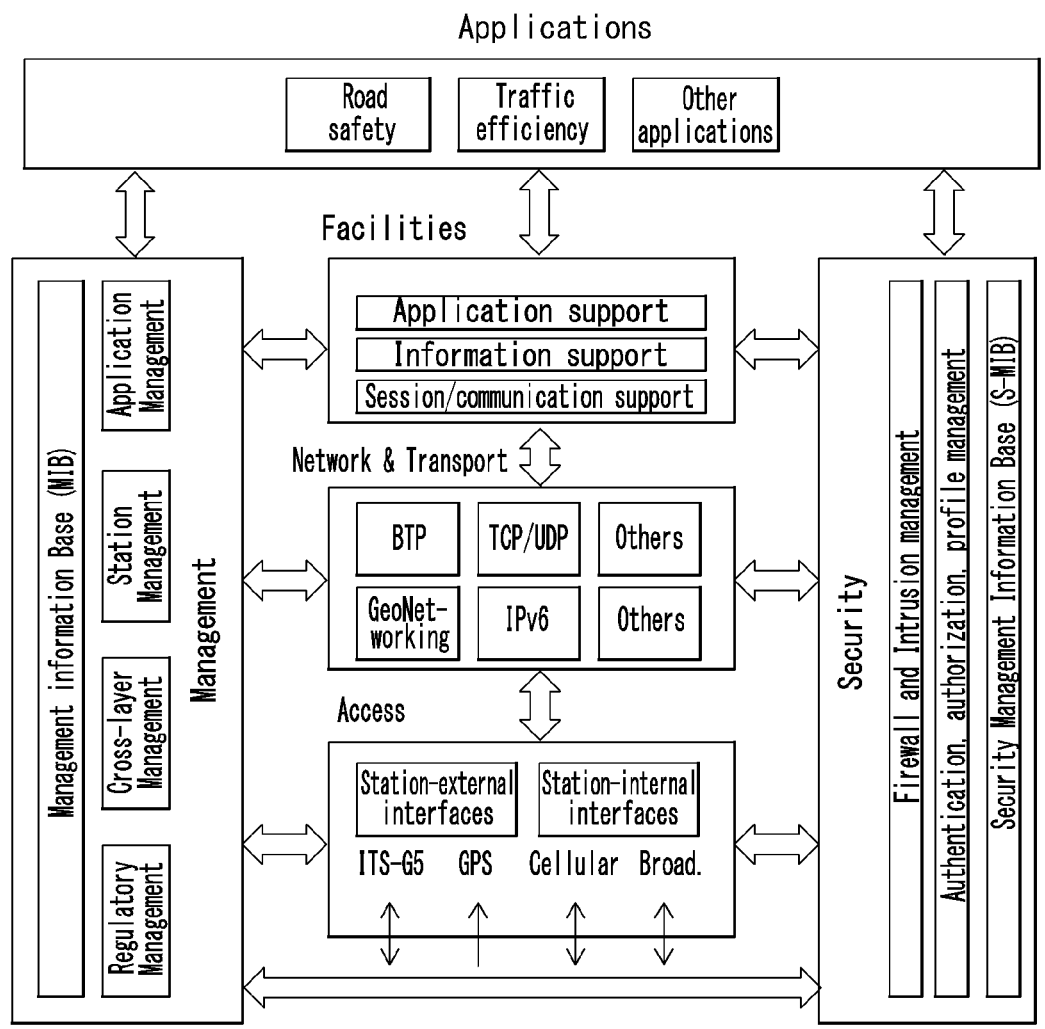

[FIG. 2]
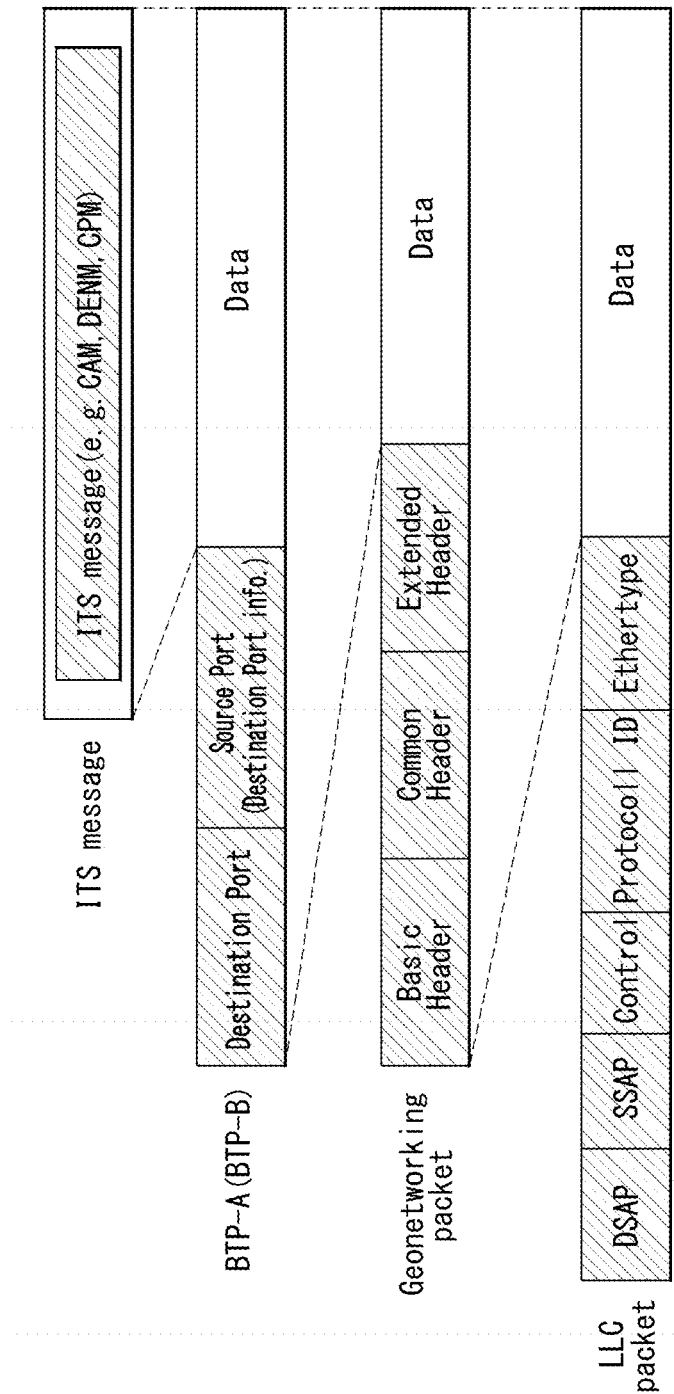

[FIG. 3]
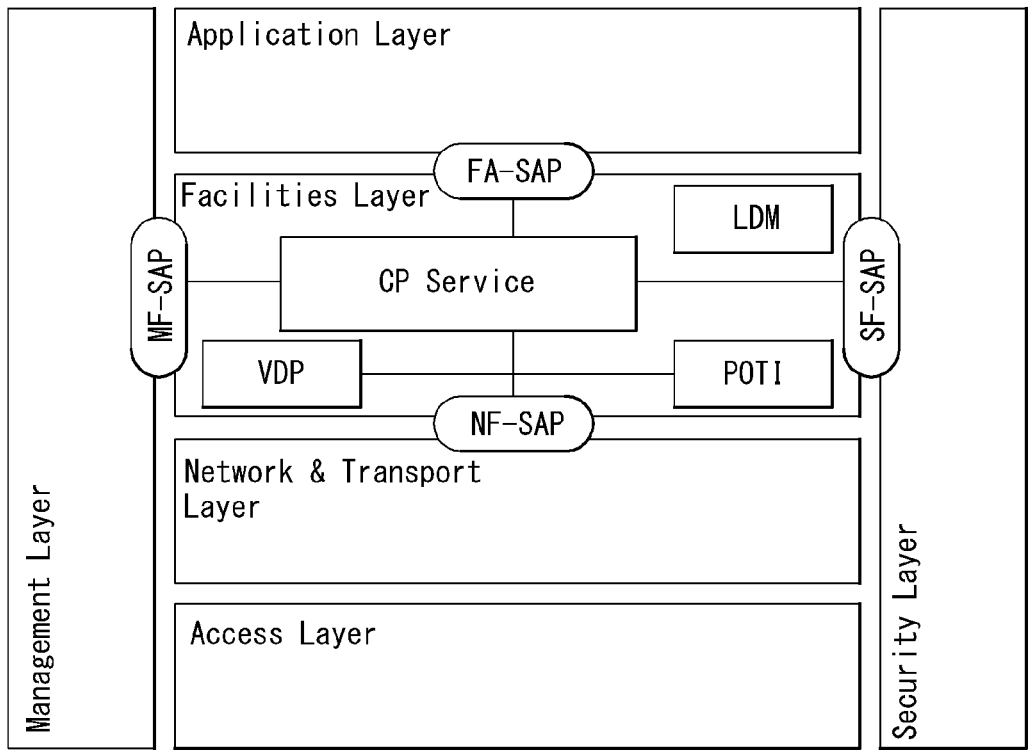
[FIG. 4]
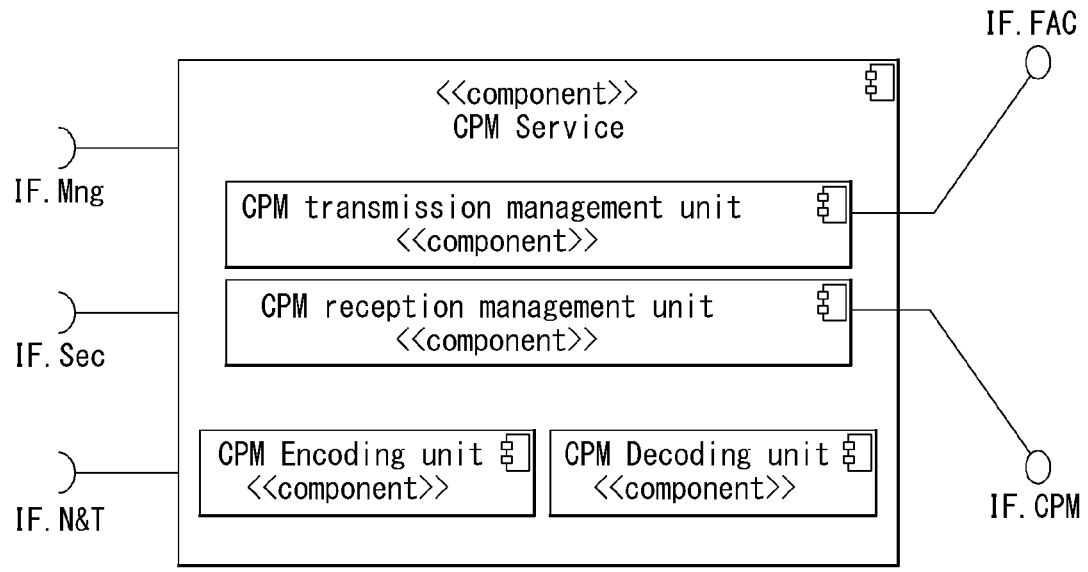

[FIG. 5]

| ITS PDU Header | Originating Vehicle Container | Field-of-View Container | | | Perceived Object Container | | |
|---|---|---|---|---|---|---|---|
| | | Sensor1 | ... | Sensor n | Object 1 | ... | Object n |

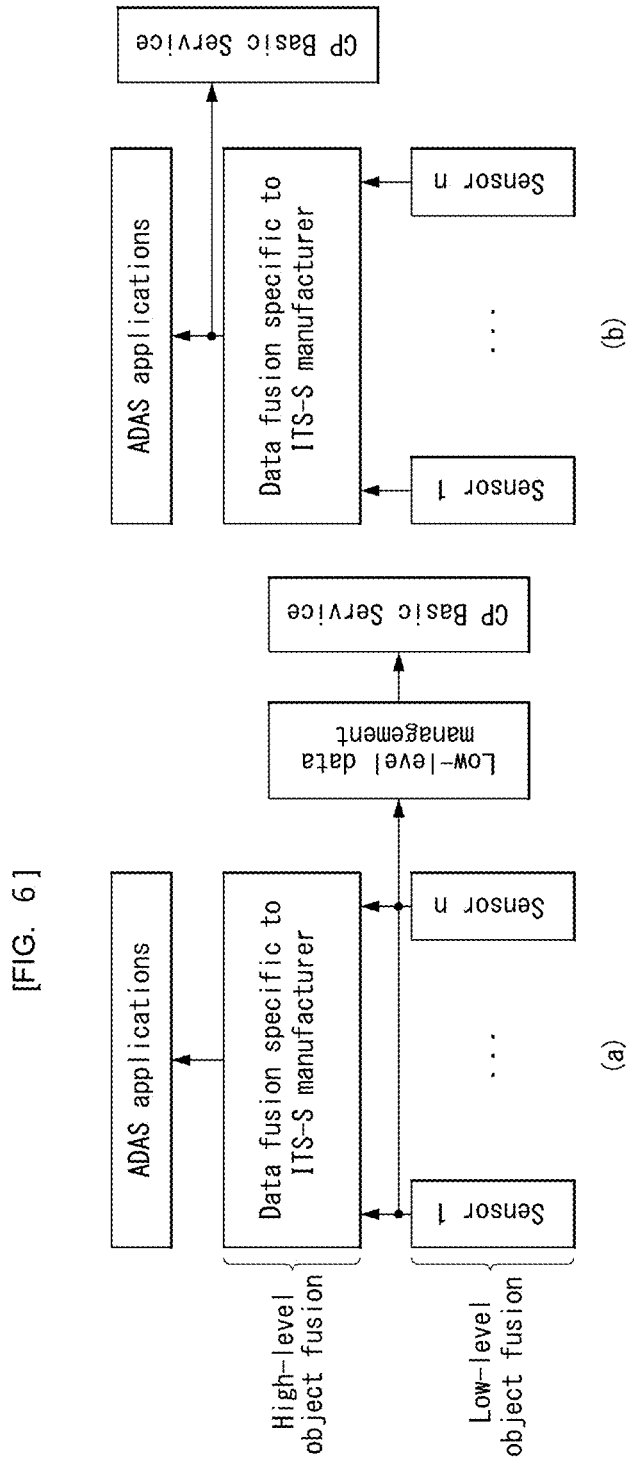

[FIG. 7]
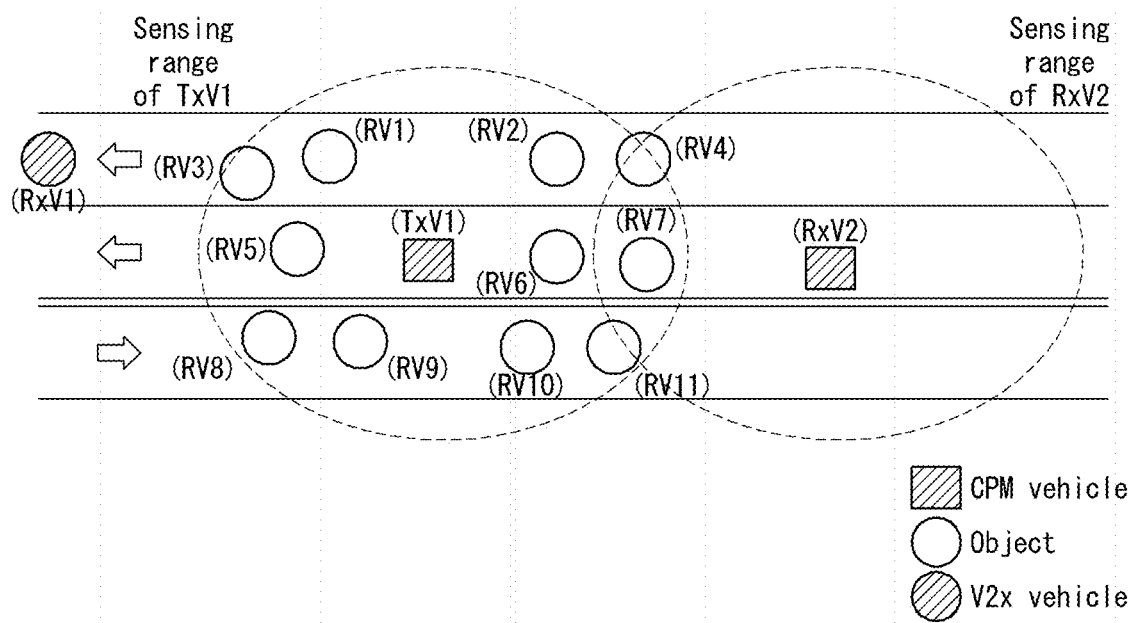
[FIG. 8]
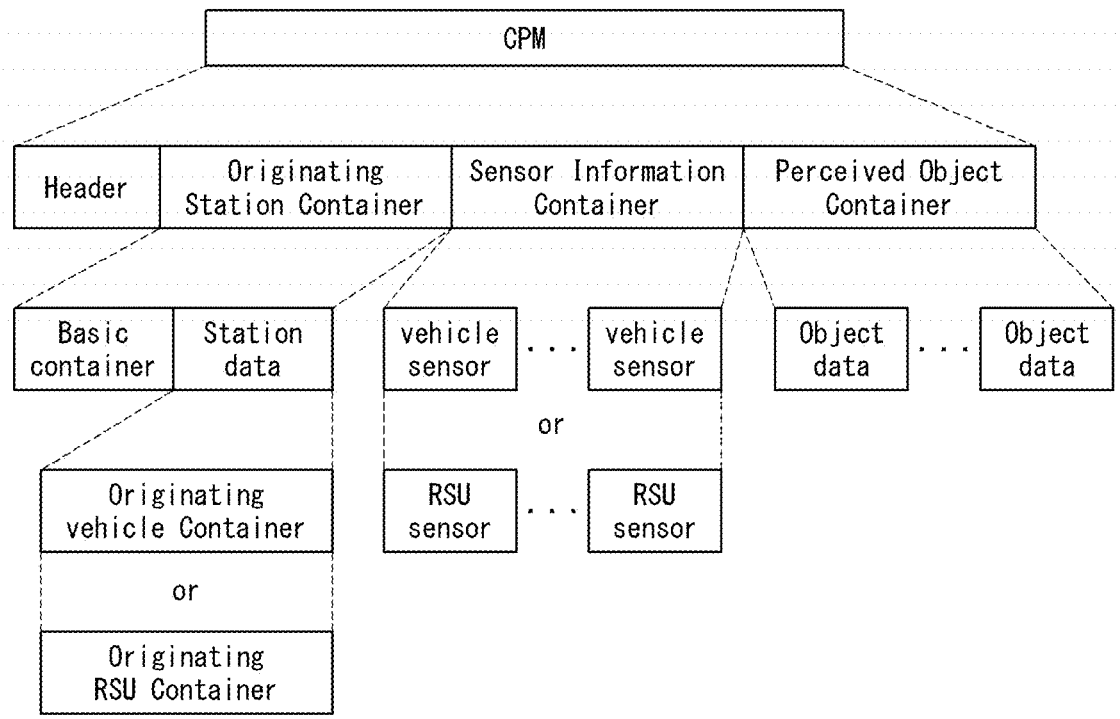

[FIG. 9]
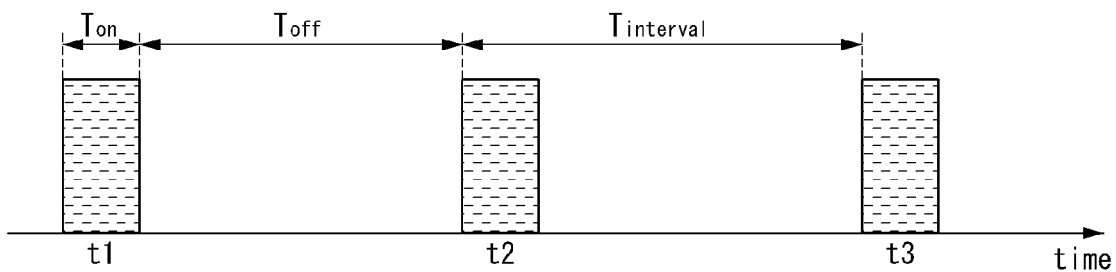
[FIG. 10]
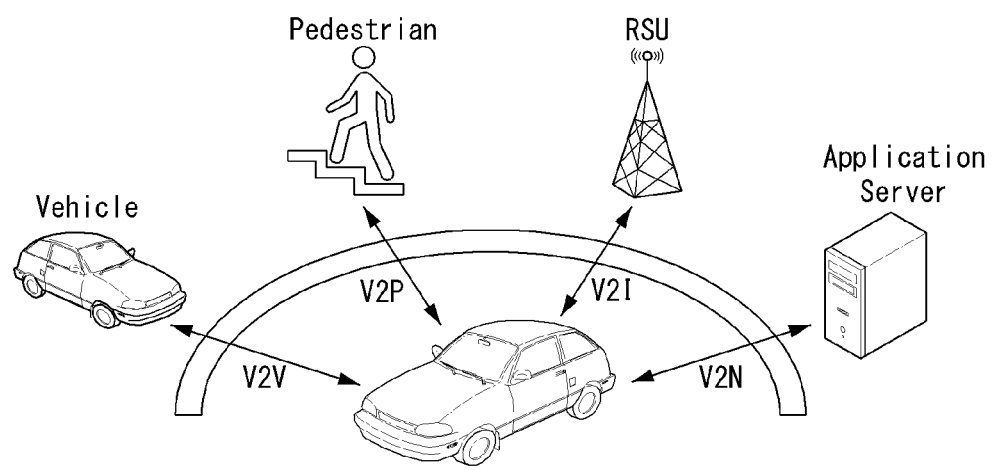

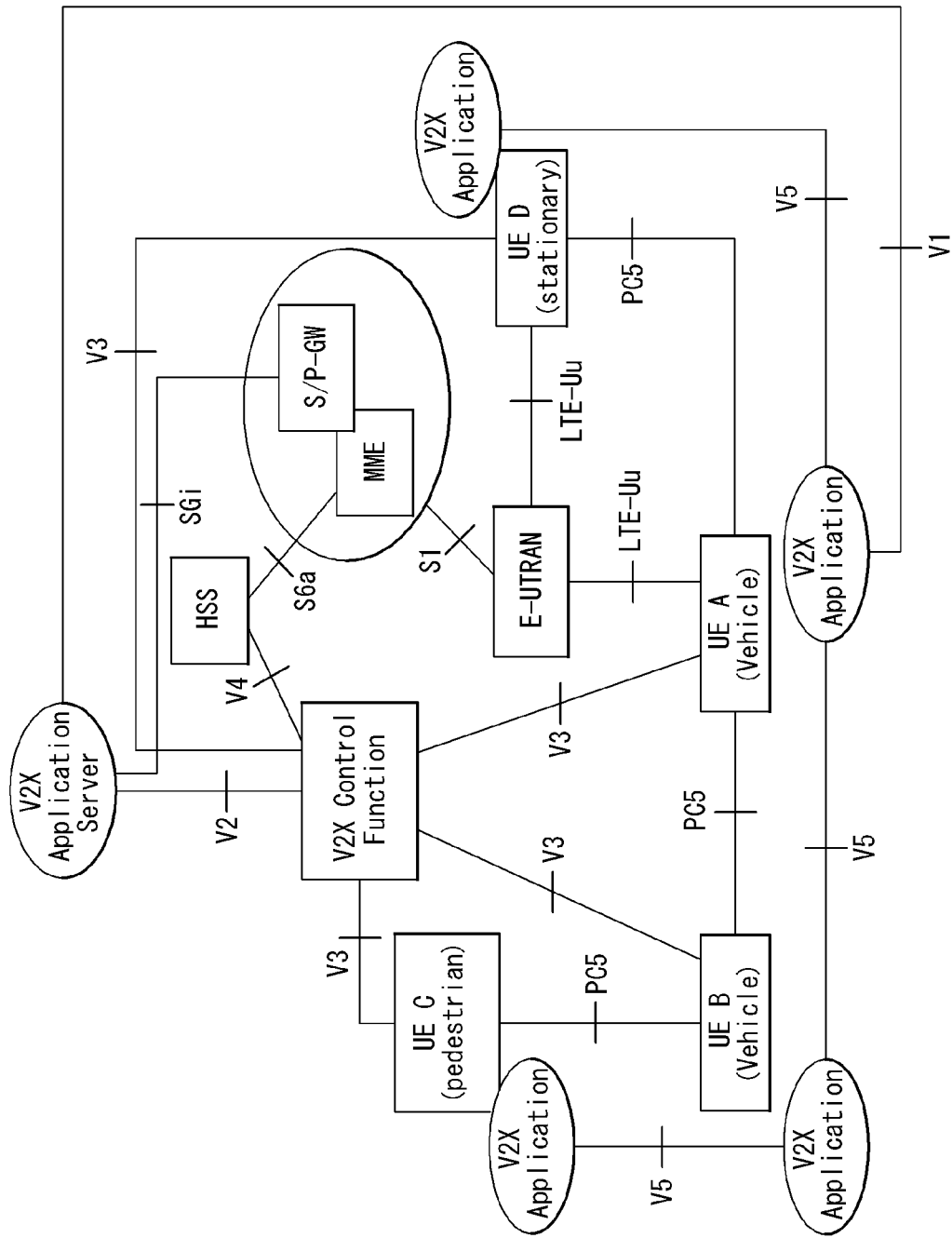
[FIG. 11]

[FIG. 12]
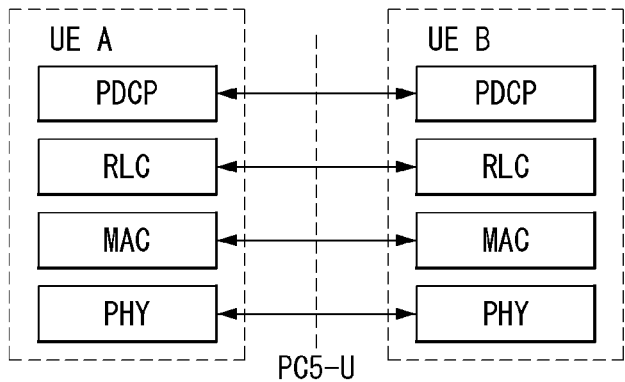
[FIG. 13]
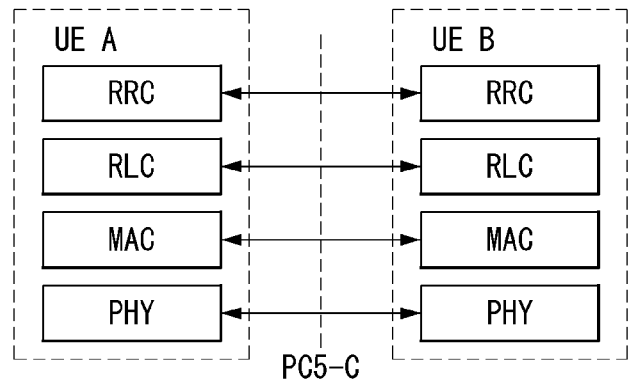
[FIG. 14]
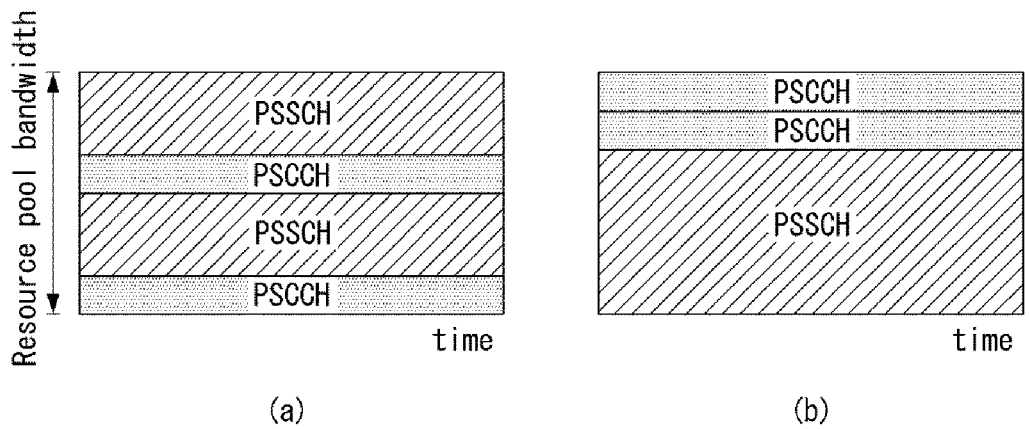

[FIG. 15]
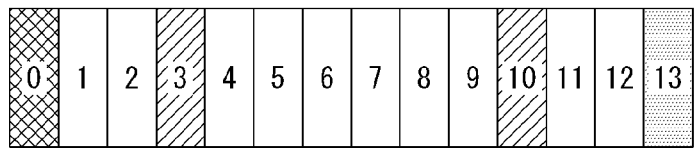
(a)
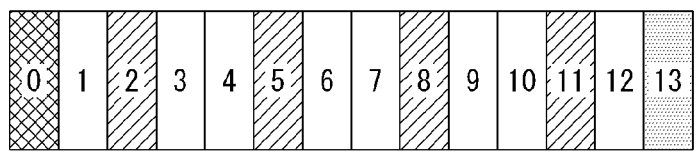
(b)
▨ AGC   ☐ Data symbol   ▨ DMRS symbol   ▨ GP
[FIG. 16]
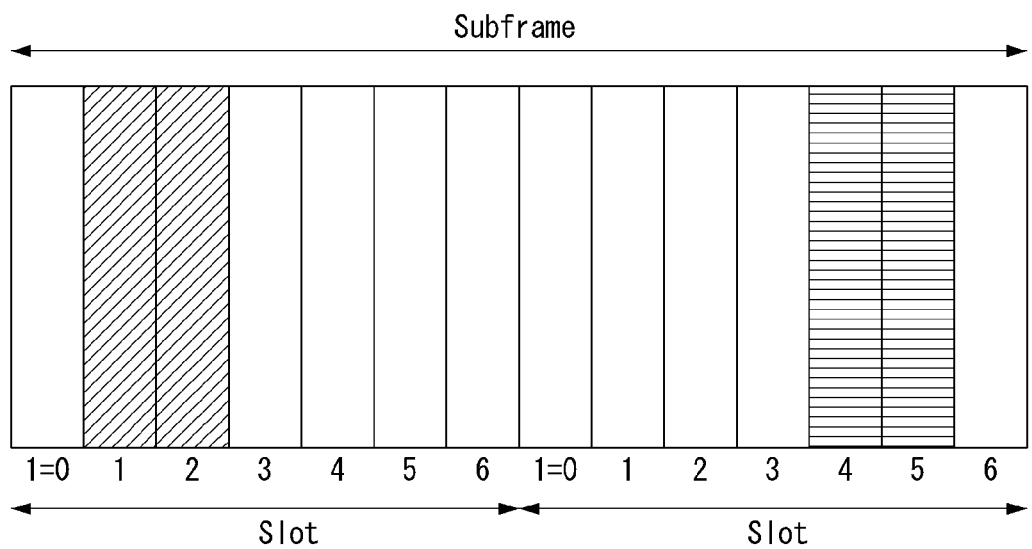

[FIG. 17]
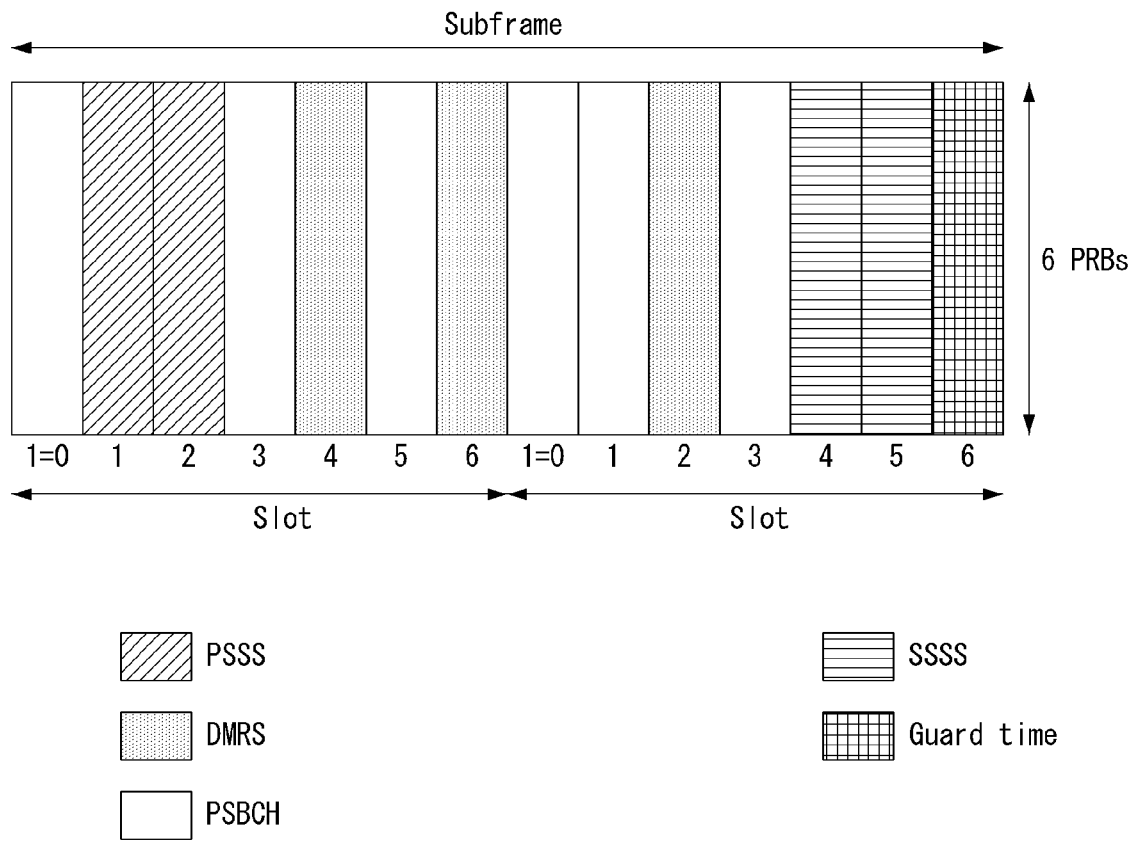
[FIG. 18]
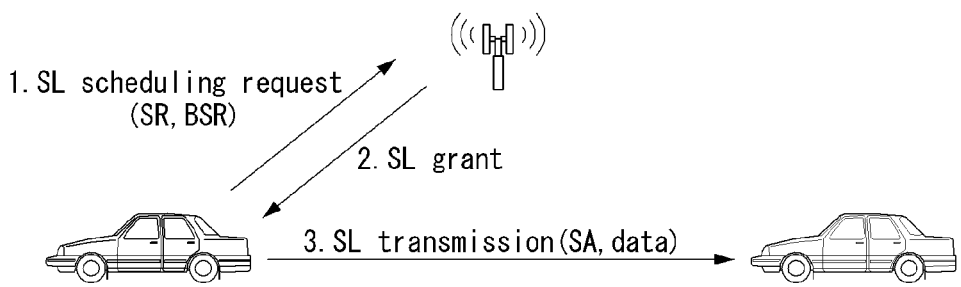
[FIG. 19]
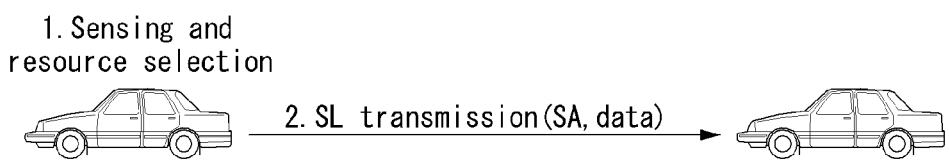

[FIG. 20]
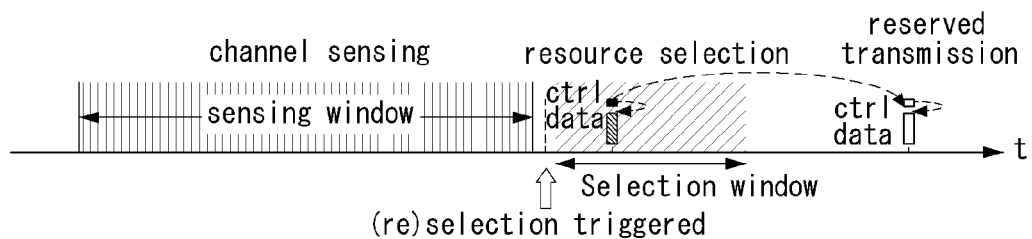
[FIG. 21]
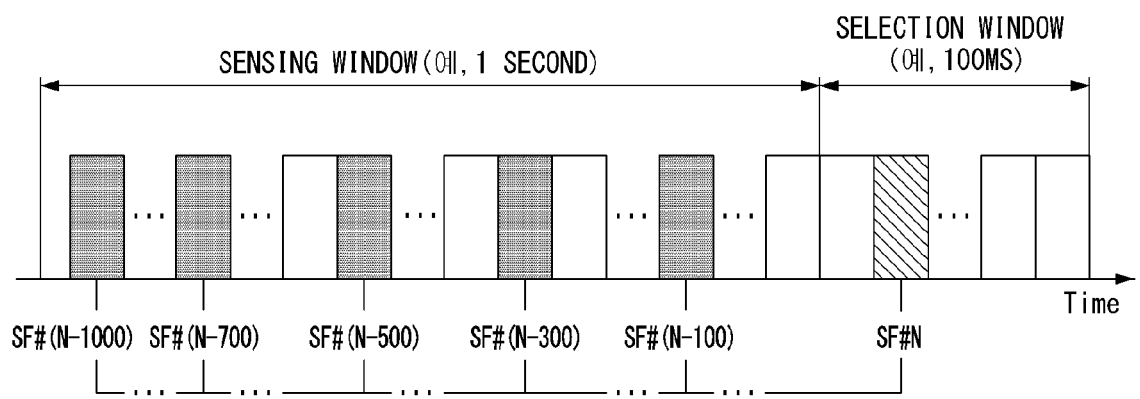
[FIG. 22]
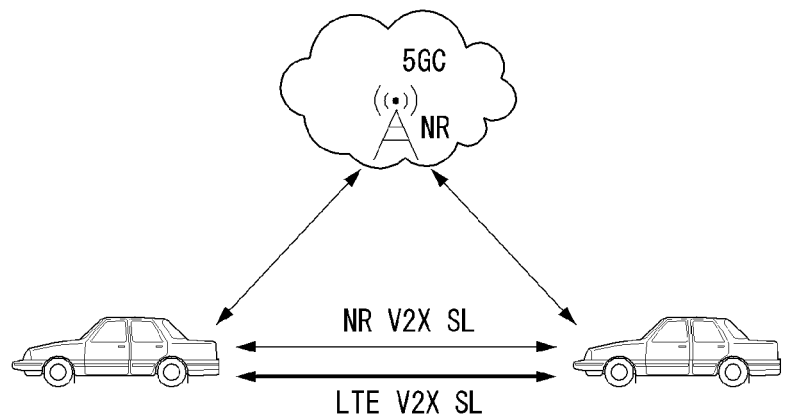

[FIG. 23]
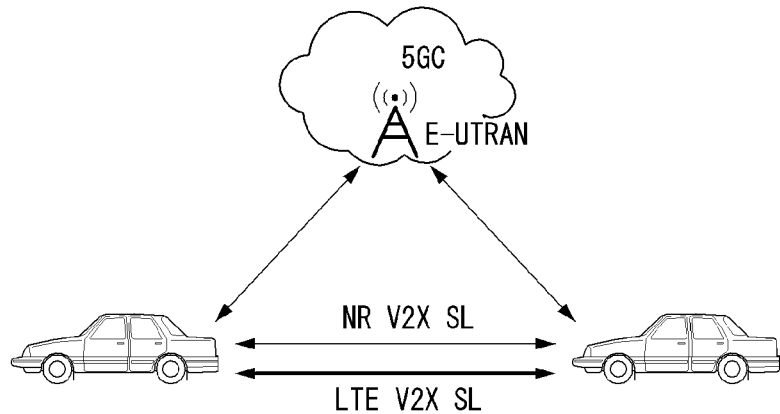
[FIG. 24]
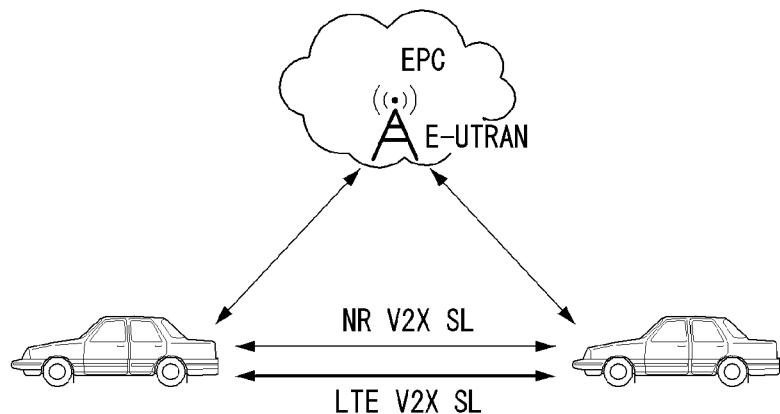
[FIG. 25]
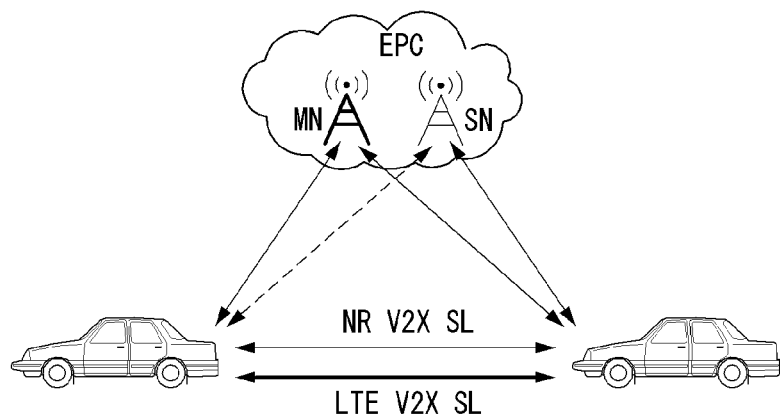

[FIG. 26]
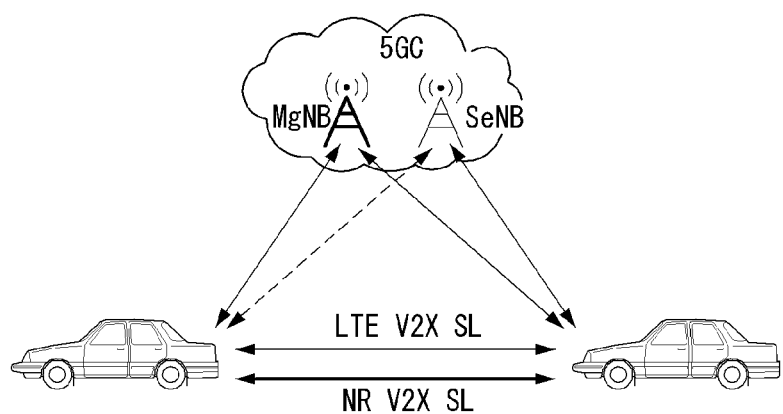

[FIG. 27]
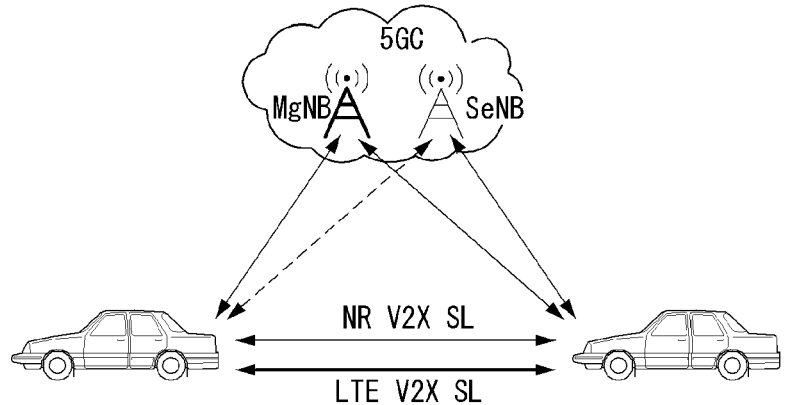
[FIG. 28]
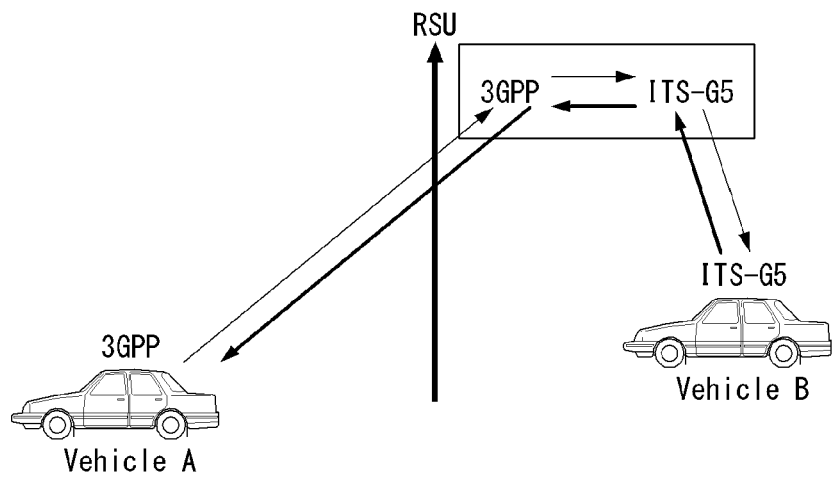
[FIG. 29]
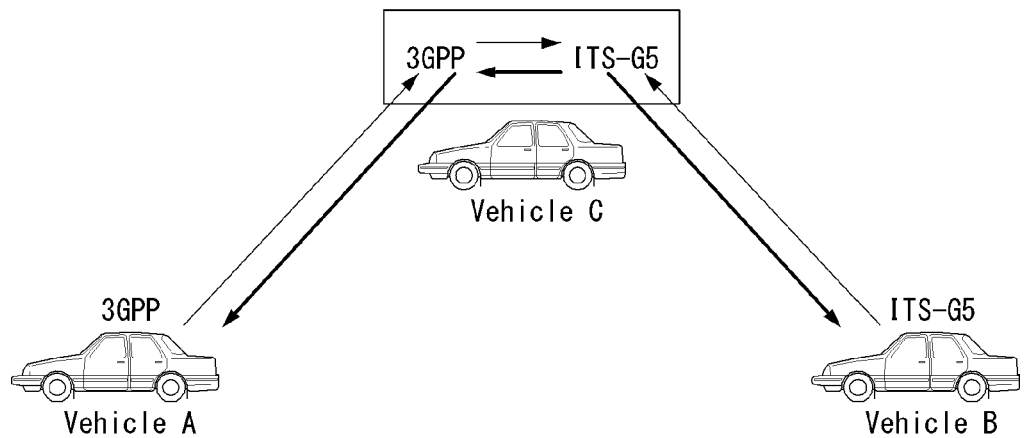

[FIG. 30]
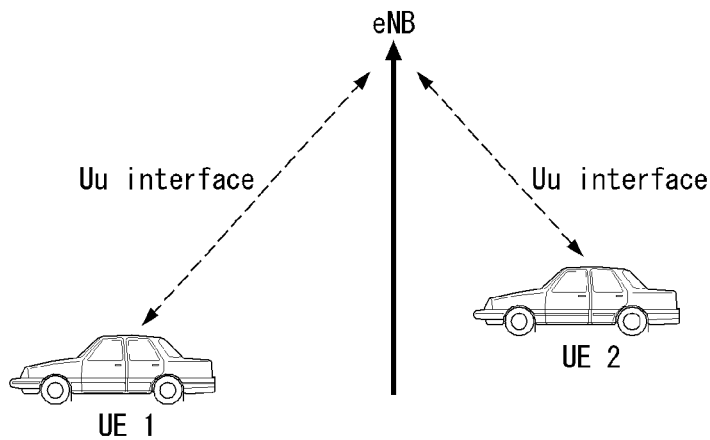
[FIG. 31]
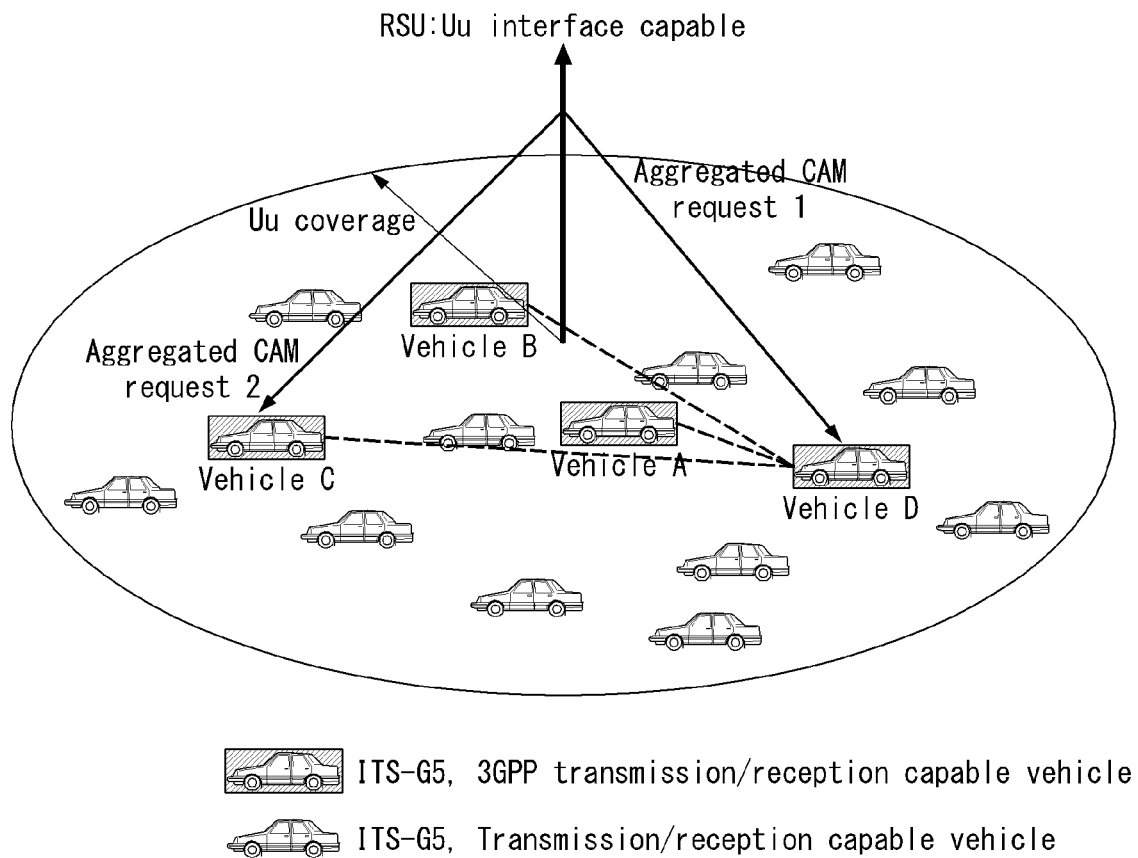

[FIG. 32]
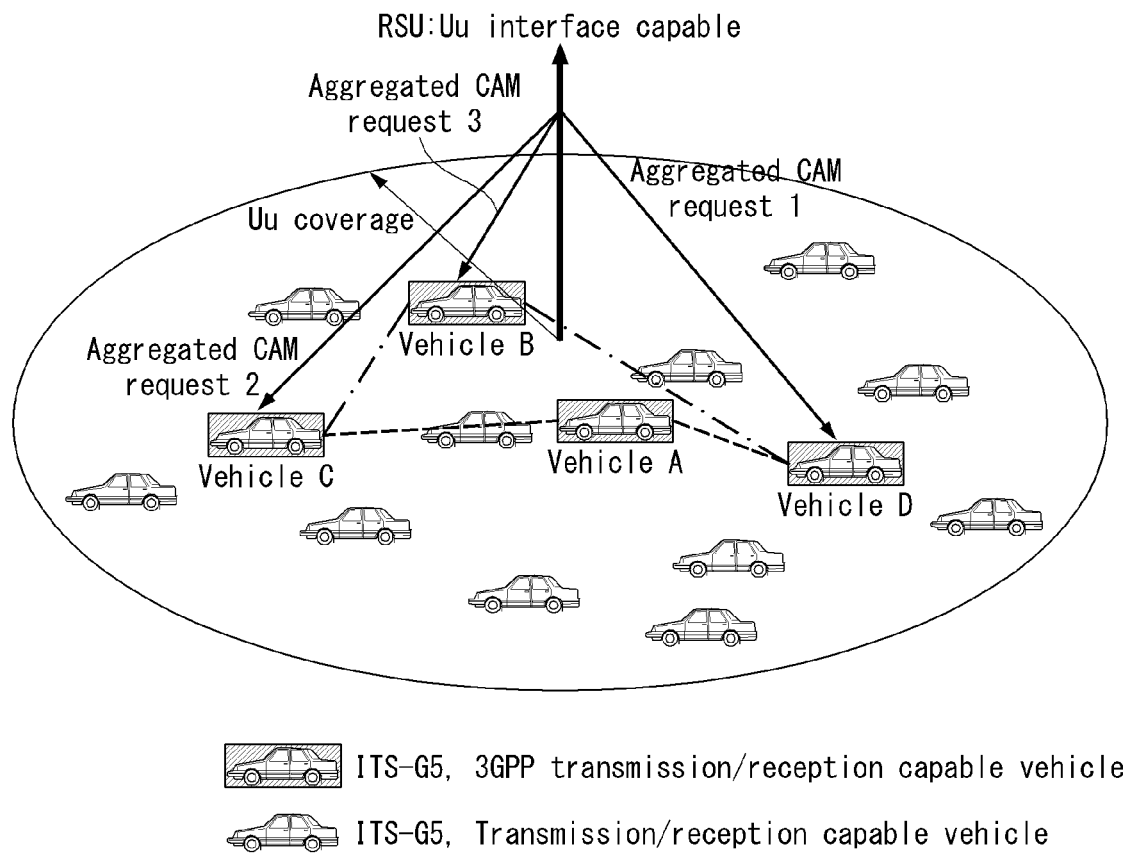
[FIG. 33]
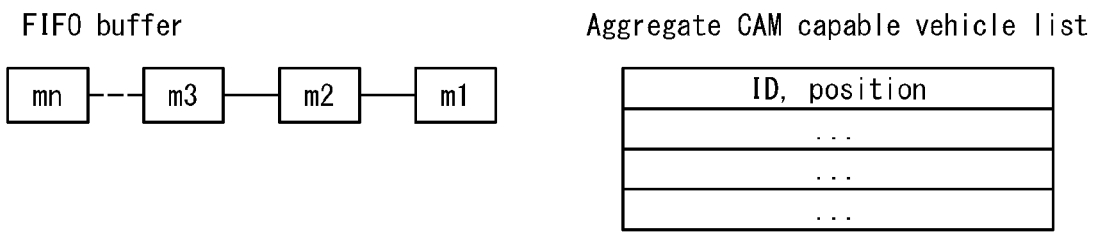

[FIG. 34]
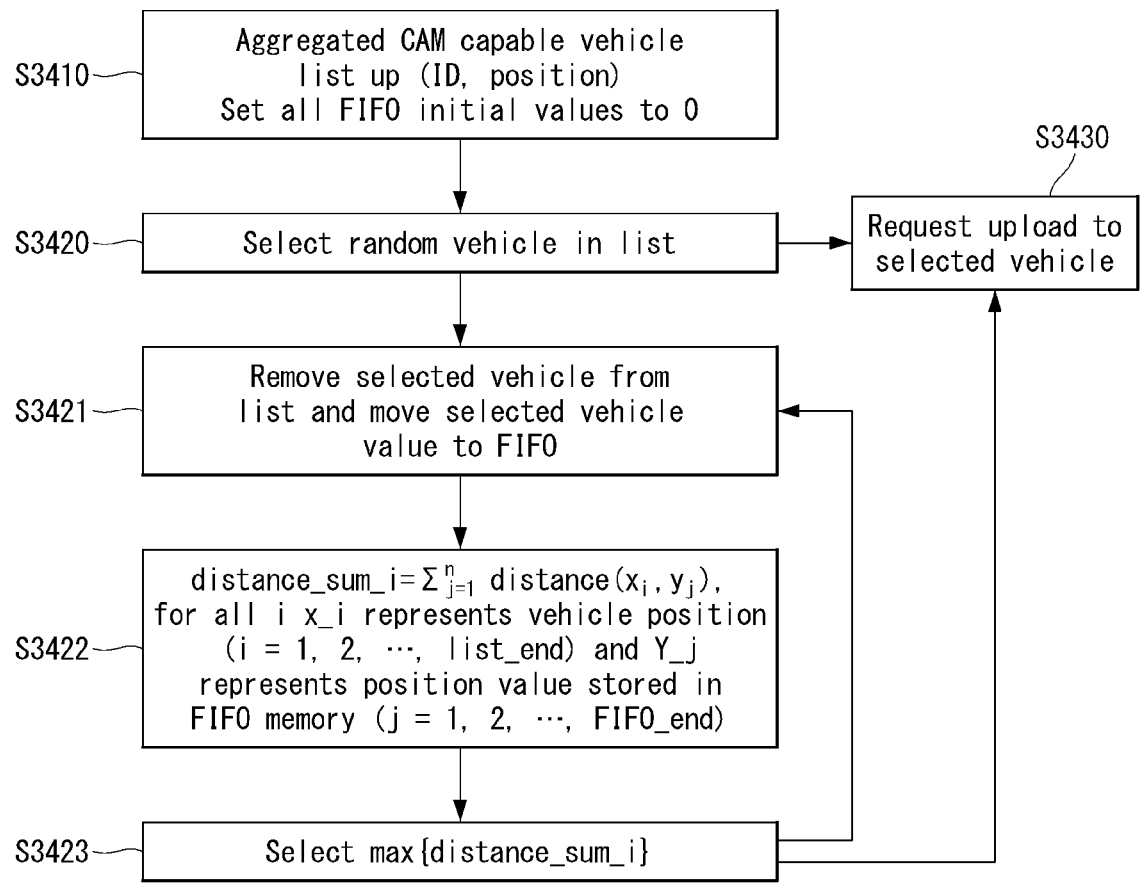

[FIG. 35]
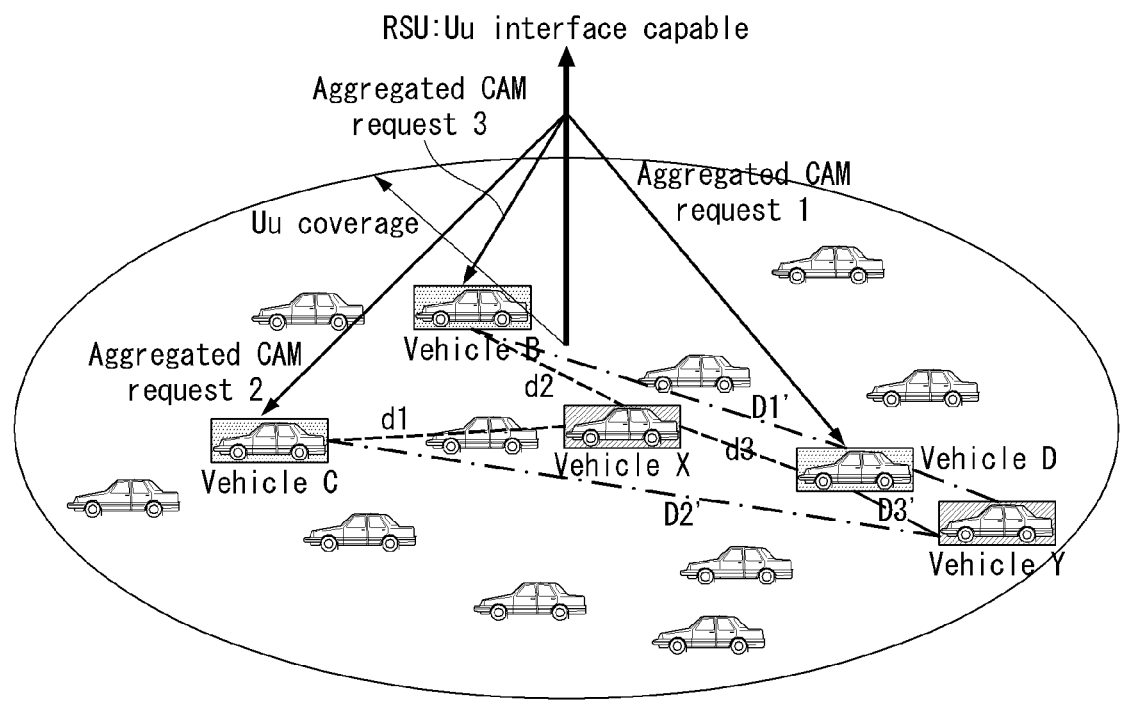

[FIG. 36]
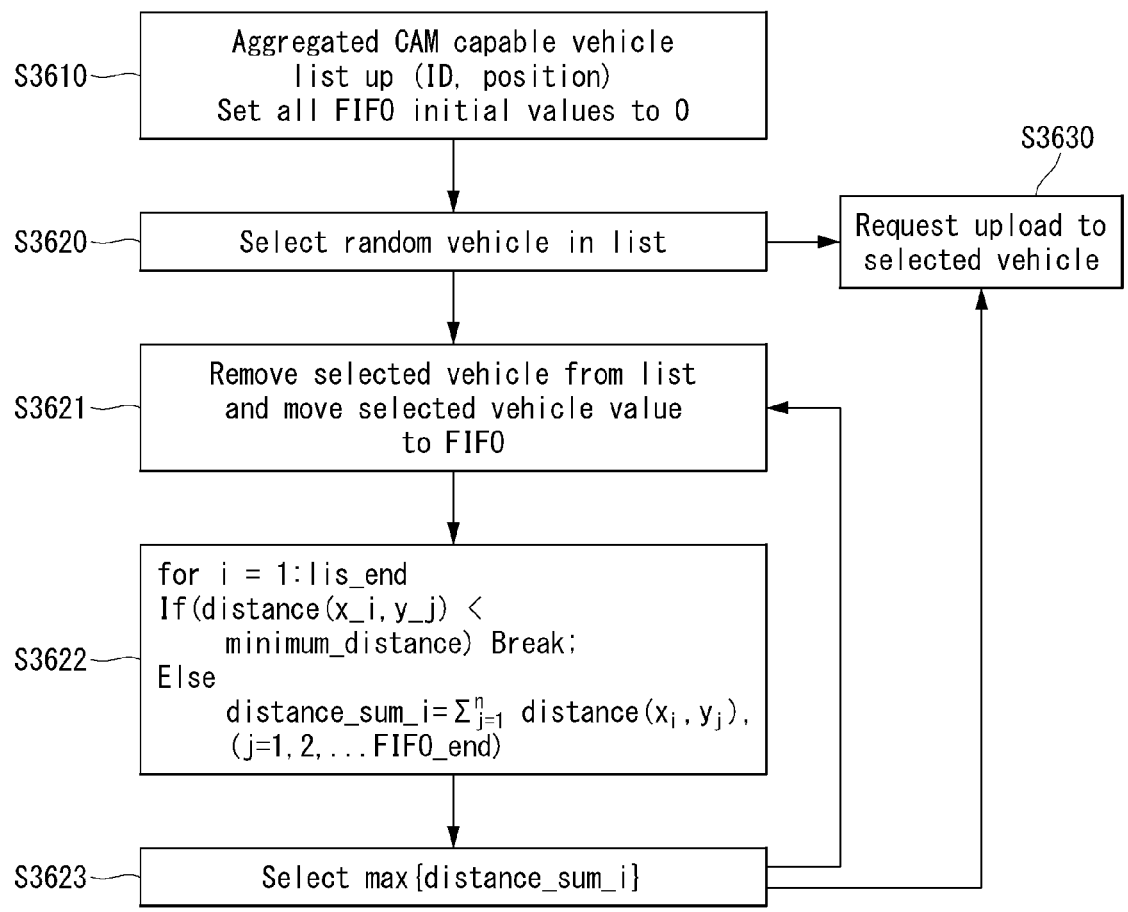

[FIG. 37]
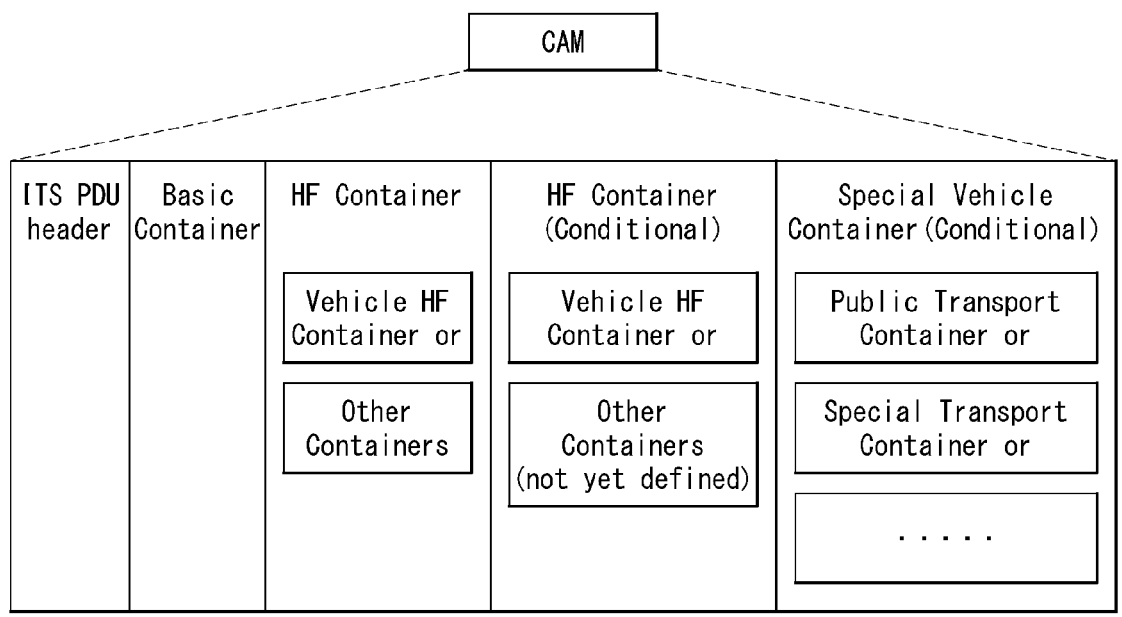

[FIG. 38]
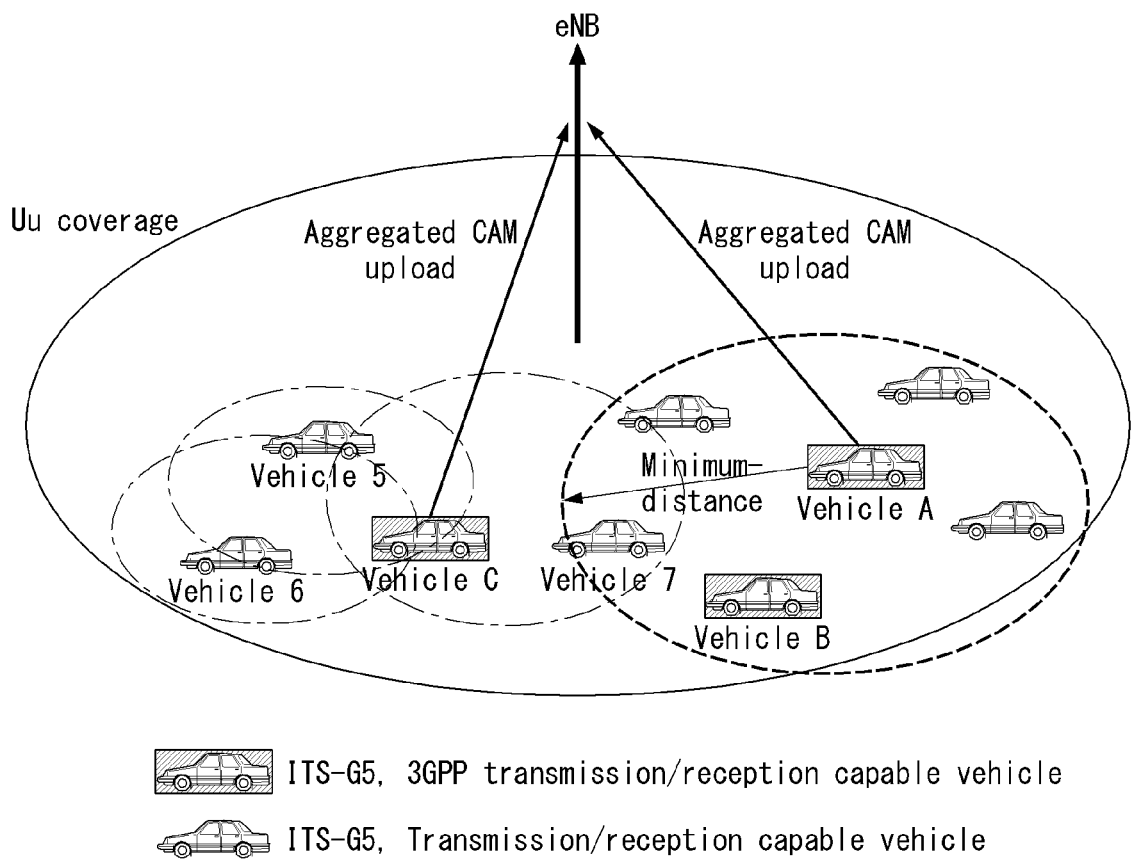

[FIG. 39]
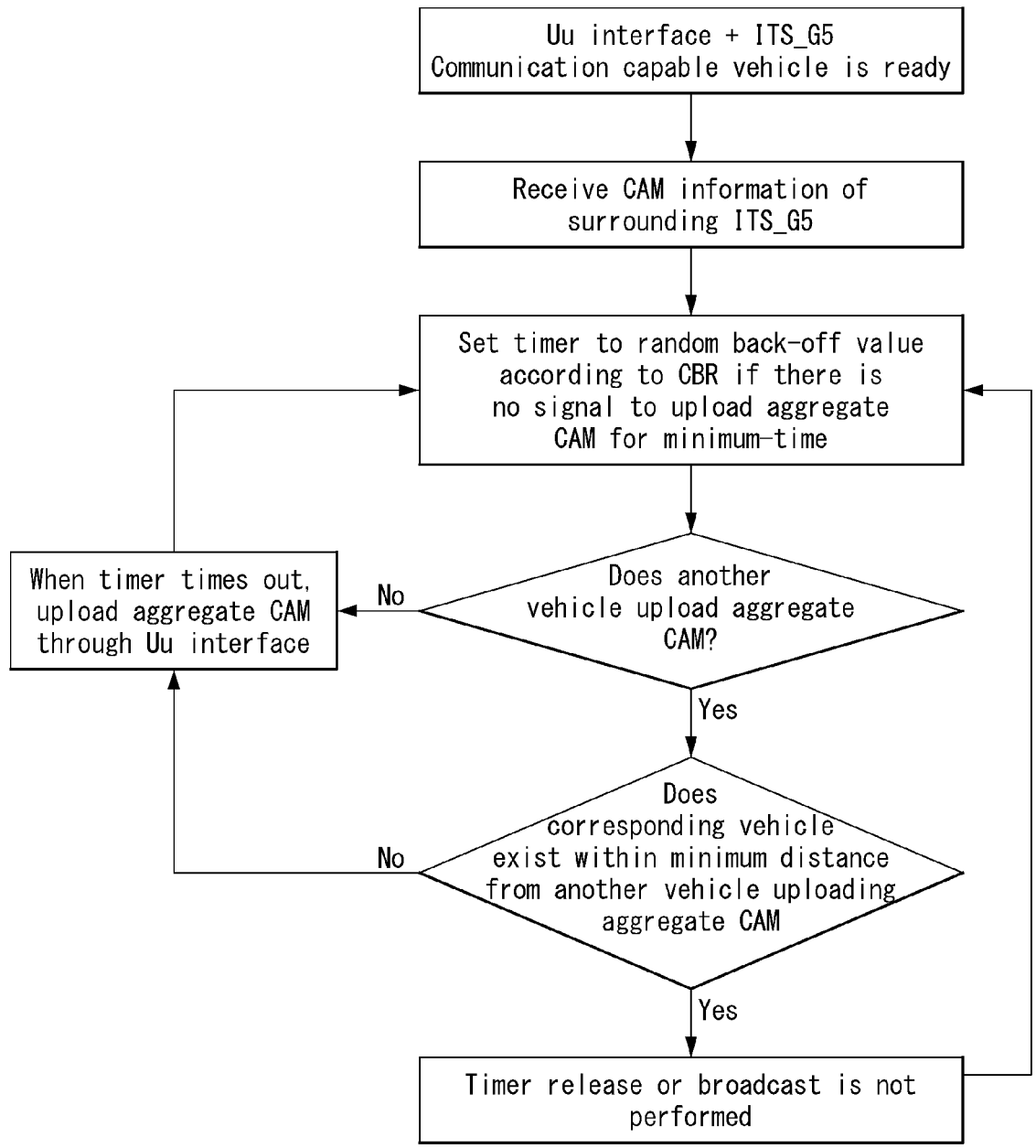

[FIG. 40]
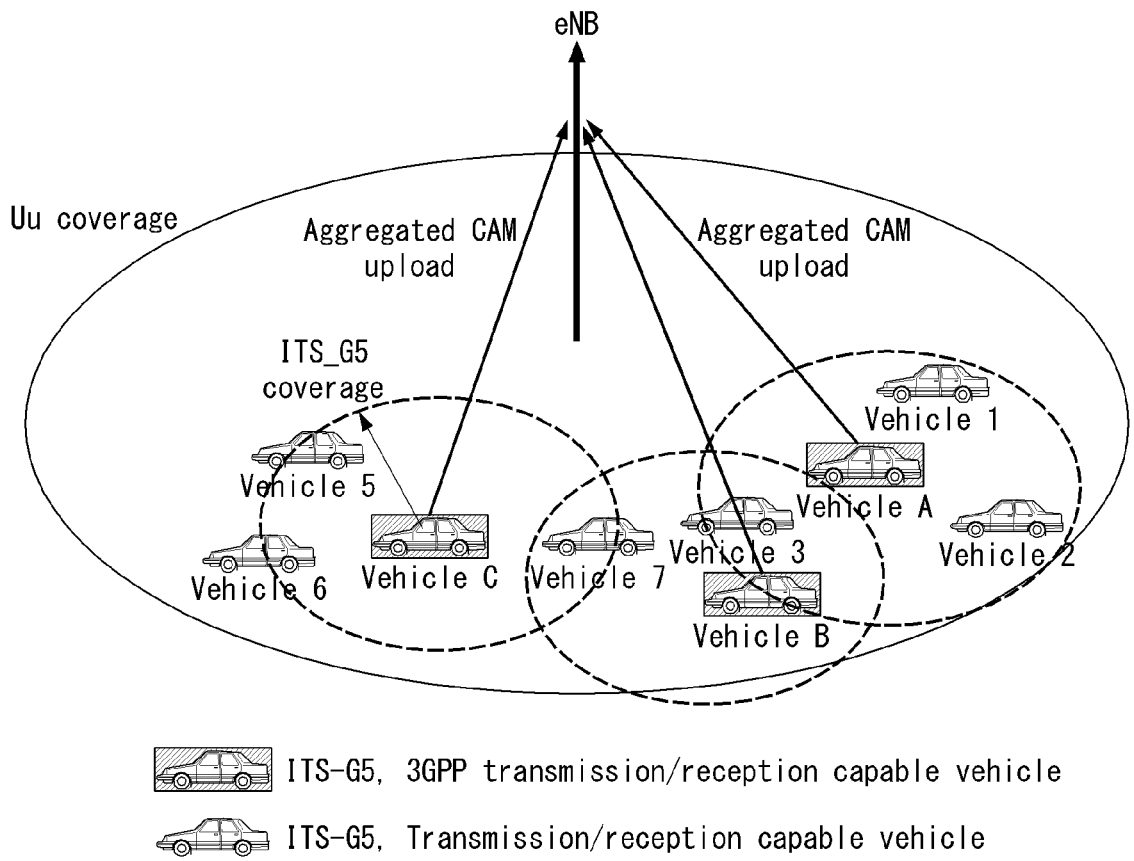
[FIG. 41]
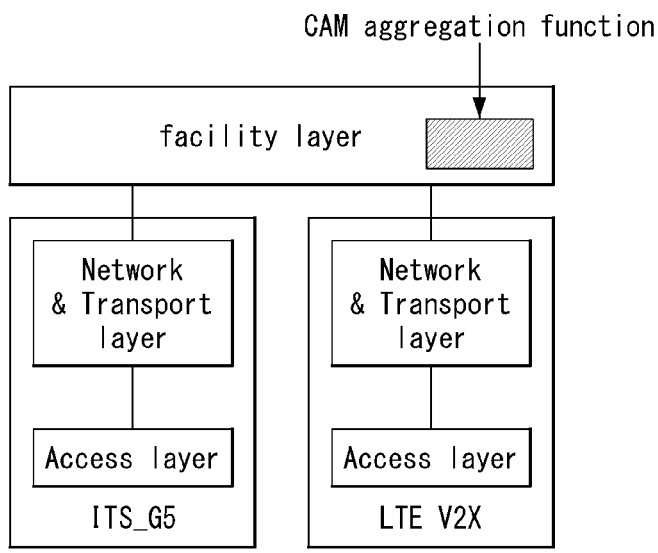

[FIG. 42]
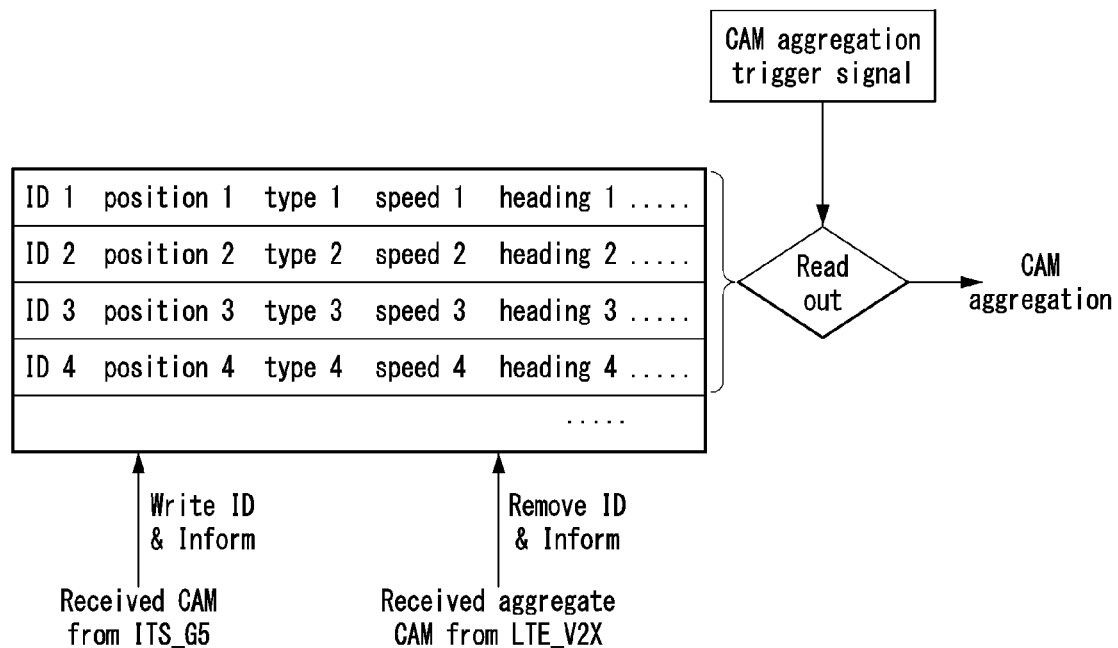

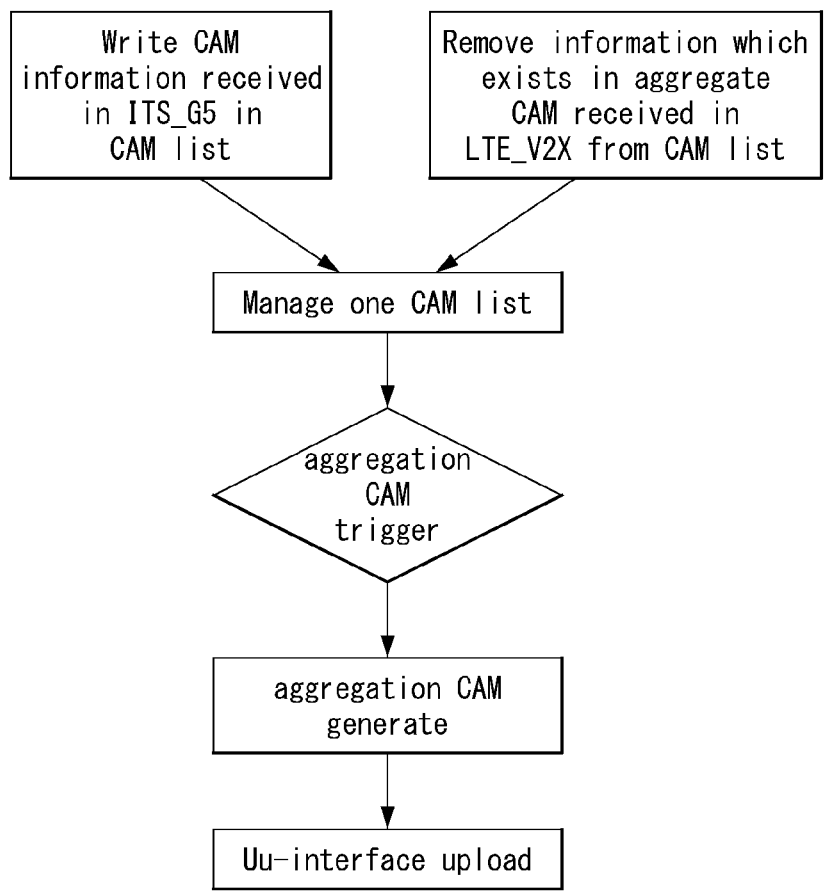
[FIG. 43]

[FIG. 44]
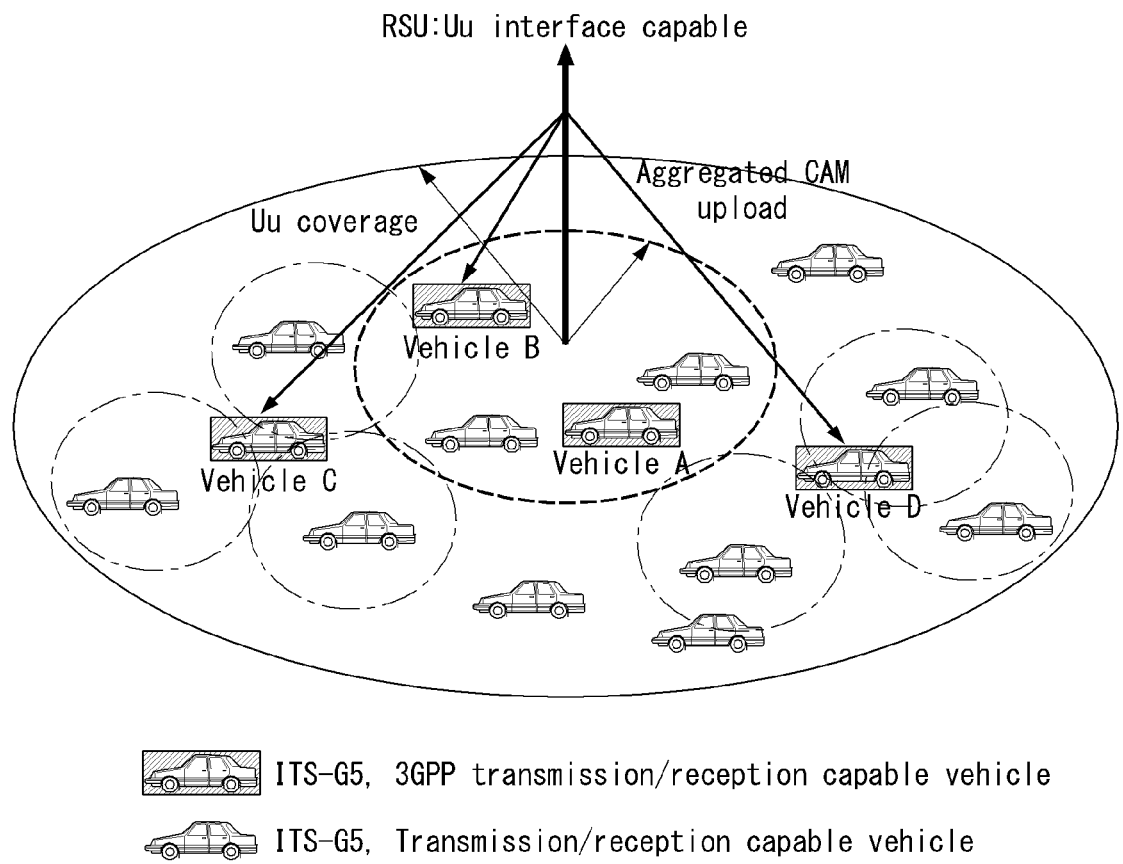

[FIG. 45]
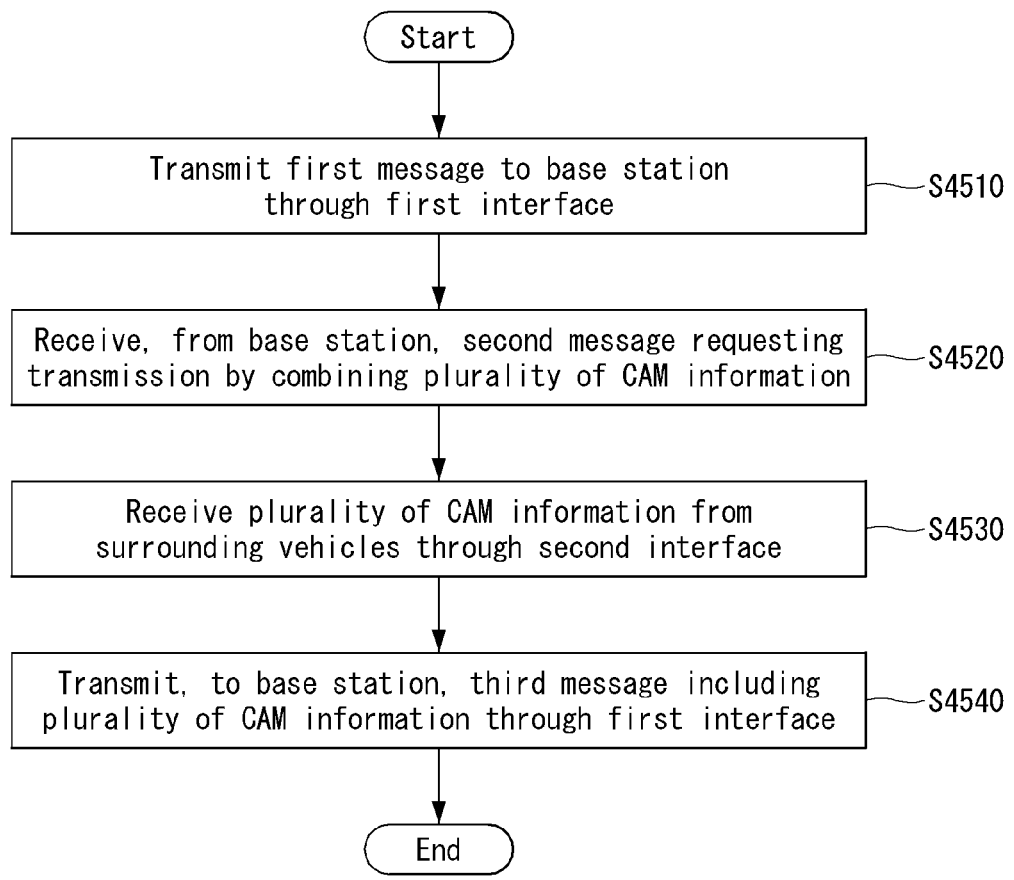

[FIG. 46]
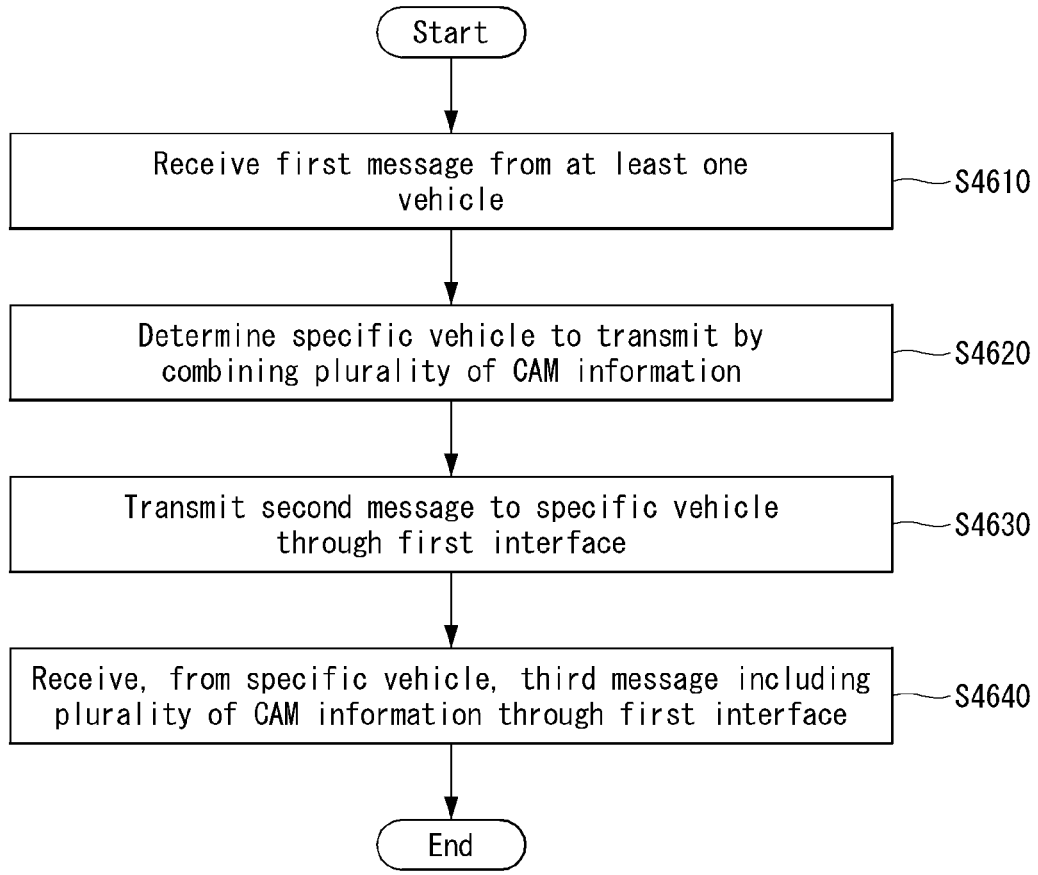
[FIG. 47]
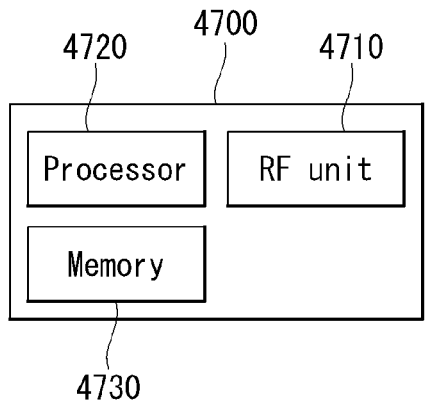

METHOD AND DEVICE FOR TRANSMITTING AND RECEIVING A PLURALITY OF COOPERATIVE AWARENESS MESSAGE (CAM) INFORMATION IN A V2X SYSTEM

CROSS-REFERENCE TO RELATED APPLICATIONS

This application is the National Stage filing under 35 U.S.C. 371 of International Application No. PCT/KR2019/004360, filed on Apr. 11, 2019, the contents of which is hereby incorporated by reference herein in its entirety.

TECHNICAL FIELD

The present disclosure relates to a device and a method for V2X communication, and particularly, to a method for transmitting and receiving, by a V2X communication device, a plurality of Cooperative Awareness Message (CAM).

BACKGROUND ART

Recently, a vehicle becomes a product of a complex industrial technology in which electrical, electronic and communication technologies have been converged out of mechanical engineering. In this respect, a vehicle is also called a smart car. The smart car provides various customized mobile services in addition to conventional vehicle technologies, such as traffic safety/congestion solution, by connecting drivers, vehicles, and transportation infrastructure. Such connectivity may be implemented using a vehicle to everything (V2X) communication technology.

DISCLOSURE

Technical Problem

In the present disclosure, a situation is assumed in which a Uu interface capable vehicle and a Uu interface non-capable vehicle coexist.

An object of the present disclosure is to provide a method for providing a method for determining, when the Uu interface capable vehicle collects and reports, to a Road Side Unit (RSU) or a central system, information of surrounding Uu interface non-capable vehicles, which vehicle among the Uu interface capable vehicles reports (uploads) the information.

Technical objects to be achieved by the present disclosure are not limited to the aforementioned technical objects, and other technical objects not described above may be evidently understood by a person having ordinary skill in the art to which the present disclosure pertains from the following description.

Technical Solution

In order to solve the above technical problem, the present disclosure proposes an apparatus and method for V2X communication.

More specifically, in the present disclosure, a method for transmitting a plurality of Cooperative Awareness Message (CAM) information in a V2X system, the method performed by a vehicle comprising: transmitting, to a base station, a first message including first information representing whether aggregation of a plurality of CAM information is possible through a first interface; receiving, from the base station, a second message requesting transmission by combining the plurality of CAM information; receiving, from surrounding vehicles, the plurality of CAM information through a second interface; and transmitting, to the base station, a third message including the plurality of CAM information through the first interface.

Furthermore, in the present disclosure, further comprising: performing processing to combine the plurality of CAM information received from the surrounding vehicles.

Furthermore, in the present disclosure, wherein the first message further includes second information on a communication type supported by a vehicle.

Furthermore, in the present disclosure, wherein the second control information represents a type supporting only 3GPP communication, a type supporting both the 3GPP communication and ITS-G5 communication, or a type supporting only the ITS-G5 communication.

Furthermore, in the present disclosure, wherein the first message further includes third information representing a quantity for a plurality of combinable CAM information.

Furthermore, in the present disclosure, wherein the second message is transmitted to the vehicle based on at least one of a channel busy ratio (CBR), a distance between vehicles capable of combining a plurality of CAM information, or the third information.

Furthermore, in the present disclosure, wherein the first interface is a Uu interface, and wherein the second interface is an ITS-G5 communication related interface.

Furthermore, in the present disclosure, wherein the vehicle is located within a specific geographic area.

Furthermore, in the present disclosure, a method for receiving a plurality of Cooperative Awareness Message (CAM) information in a V2X system, the method performed by a base station comprising: receiving, from at least one vehicle, a first message including at least one of first information representing whether aggregation of a plurality of CAM information is possible or second information representing a quantity for a plurality of combinable CAM information through a first interface; determining a specific vehicle to transmit by combining the plurality of CAM information based on at least one of the first message, a channel busy ratio (CBR), or a distance between vehicles capable of combining the plurality of CAM information; transmitting, to the specific vehicle, a second message requesting transmission by combining the plurality of CAM information through the first interface; and receiving, from the specific vehicle, a third message including the plurality of CAM information through the first interface.

Furthermore, in the present disclosure, A V2X communication device of a vehicle, comprising: memory for storing data; a transmitter for transmitting a radio signal; a receiver for receiving a radio signal; and a processor for controlling the memory, the transmitter, and the receiver, wherein the processor is configured to control: the transmitter to transmit, to a base station, a first message including first information representing whether aggregation of a plurality of CAM information is possible through a first interface; the receiver to receive, from the base station, a second message requesting transmission by combining the plurality of CAM information; the receiver to receive, from surrounding vehicles, the plurality of CAM information through a second interface; and the transmitter to transmit, to the base station, a third message including the plurality of CAM information through the first interface.

Advantageous Effects

According to the present disclosure, there is an effect that a Uu interface capable vehicle having wide coverage can collect information of surrounding Uu interface non-capable vehicles and transmit the collected information to an RSU.

More specifically, according to the present disclosure, there is an effect that a message the Uu interface capable vehicle makes a message for collecting and transmitting surrounding information include indication information indicating that a plurality of CAM information can be coupled, and distinguishes the indication information from another information and the RSU (or a BS) can control the information or the vehicle can efficiently transmit (or upload) without a control of the RSU.

Further, according to the present disclosure, vehicles at distributed locations can upload a vehicle situation in Uu coverage in determining a vehicle situation in the Uu coverage to assist rapidly determining an overall situation in a short time.

Further, a method proposed in the present disclosure is applied to minimize and transmit duplicated data even when a channel resource for transmitting aggregated CAM information is limited, thereby increasing overall efficiency.

Further, according to the present disclosure, the Uu interface capable vehicle determines whether to upload the information of the surrounding Un interface non-capable vehicle by collecting the information of the surrounding Uu interface non-capable vehicle by considering a busyness situation of a channel and mutual distances for itself.

Through this, there is an advantage that the RSU (or BS) can autonomously determine whether to upload the information so that locations of upload vehicles have a uniform distribution without a control signal which is additionally required.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings which are included for further understanding of the disclosure and included in this disclosure and which form part of the disclosure illustrate embodiments of the disclosure along with the detailed description that describes the principle of the disclosure.

FIG. 1 illustrates exemplary architecture of a V2X communication device according to an embodiment of the disclosure.

FIG. 2 illustrates a method of processing a V2X message according to an embodiment of the disclosure.

FIG. 3 illustrates an architecture of a V2X communication device providing a CP service according to an embodiment of the disclosure.

FIG. 4 illustrates a function block diagram of a CP service according to an embodiment of the disclosure.

FIG. 5 illustrates a CPM structure according to an embodiment of the disclosure.

FIG. 6 illustrates a method of extracting sensor data by a V2X communication device providing a CP service according to an embodiment of the disclosure.

FIG. 7 illustrates a CP service as an embodiment to which the disclosure is applicable.

FIG. 8 illustrates a structure of a CPM message according to an embodiment to which the disclosure is applied.

FIG. 9 illustrates a method of managing a CPM message according to an embodiment of the disclosure.

FIG. 10 illustrates a type of a V2X application.

FIG. 11 illustrates a reference point and a reference architecture for V2X communication.

FIG. 12 is a block diagram illustrating a radio protocol architecture for a user plane for the V2X communication.

FIG. 13 is a block diagram illustrating a radio protocol architecture for a control plane for the V2X communication.

FIG. 14 illustrates a resource allocation method in a sidelink in which V2X is used.

FIG. 15 illustrates a mapping example of a Demodulation Reference Signal (DMRS) in the sidelink in which the V2X is used.

FIG. 16 illustrates a mapping example in time domains of PSSS and SSSS in a normal CP.

FIG. 17 illustrates an example of a subframe in which a physical sidelink broadcast channel (PSBCH) for transmitting an SL-BCH is transmitted.

FIG. 18 illustrates a case where a UE performs a mode 3 operation.

FIG. 19 illustrates a case where the UE performs a mode 4 operation.

FIG. 20 illustrates sensing and resource selection of mode 4.

FIG. 21 illustrates a V2X transmission resource selection (/reservation) method according to a (partial) sensing operation.

FIG. 22 illustrates a standalone scenario supporting V2X SL communication.

FIG. 23 illustrates another example of a standalone scenario supporting V2X SL communication.

FIG. 24 illustrates yet another example of a standalone scenario supporting V2X SL communication.

FIG. 25 illustrates an MR-DC scenario supporting the V2X SL communication.

FIG. 26 illustrates another example of a standalone scenario supporting V2X SL communication.

FIG. 27 illustrates yet another example of an MR-DC scenario supporting V2X SL communication.

FIG. 28 illustrates an example of transcoding to which a method proposed in the present disclosure may be applied.

FIG. 29 illustrates another example of transcoding to which a method proposed in the present disclosure may be applied.

FIG. 30 is a conceptual view for describing a 3GPP related term and a 3GPP related RAN structure to be used in the present disclosure.

FIG. 31 illustrates an example of a method for selecting a vehicle uploading aggregate CAM information to an RSU proposed in the present disclosure.

FIG. 32 illustrates another example of a method for selecting a vehicle uploading aggregate CAM information to an RSU proposed in the present disclosure.

FIG. 33 illustrates an example of a device required for an algorithm to be used when an RSU designates a vehicle which is to upload an aggregate CAM proposed in the present disclosure.

FIG. 34 is a flowchart showing an example of a method for selecting a vehicle uploading the aggregate CAM in Uu coverage in a uniform area proposed in the present disclosure.

FIG. 35 is a diagram illustrating an example of a comparison of a distance sum between a vehicle stored in an FIFO buffer and an upload candidate vehicle proposed in the present disclosure.

FIG. 36 is a flowchart showing an algorithm for determining an upload vehicle at a distributed location by considering a minimum distance proposed in the present disclosure.

FIG. 37 illustrates an example of a structure a CAM message proposed in the present disclosure.

FIG. 38 is a diagram illustrating an example of a method for determining an aggregated CAM upload vehicle without a BS control proposed in the present disclosure.

FIG. 39 is a flowchart showing an example of a method for uploading an aggregated CAM by differently setting a timer according to an inter-vehicle mutual distance uploaded to a BS proposed in the present disclosure.

FIG. 40 is a diagram illustrating a dynamic grouping method proposed in the present disclosure.

FIG. 41 is a diagram illustrating an example of an inter-communication module structure of a vehicle capable of performing CAM aggregation proposed in the present disclosure.

FIG. 42 is a diagram illustrating an example of a CAM generation function operation proposed in the present disclosure.

FIG. 43 is a flowchart showing an example of a method for transmitting aggregated CAM information through dynamic grouping proposed in the present disclosure.

FIG. 44 is a diagram illustrating an example of a method for uploading an aggregated CAM except for a specific geographical area proposed in the present disclosure.

FIG. 45 is a flowchart showing an operation method of a vehicle for performing a method proposed in the present disclosure.

FIG. 46 is a flowchart showing an operation method of a BS for performing a method proposed in the present disclosure.

FIG. 47 illustrates a configuration of a V2X communication device according to an embodiment of the present disclosure.

MODE FOR DISCLOSURE

Preferred embodiments of the disclosure will be described in detail with reference to the accompanying drawings. The following detailed description with reference to the accompanying drawings is to illustrate preferred embodiments of the disclosure rather than illustrate only embodiments that can be implemented according to embodiments of the disclosure. The following detailed description includes details in order to provide the full understanding of the disclosure, but the disclosure does not require all of these details. The embodiments described below need not be separately used. A plurality of embodiments or all embodiments may be together used, and specific embodiments may be used in combination with each other.

Most of the terms used in this disclosure are selected from common ones widely used in the corresponding field, but some terms are arbitrarily selected by the applicant and the meaning thereof will be described in detail in the following description as necessary. Therefore, the disclosure should be understood based on the intended meanings of the terms rather than the simple names or meanings of the terms.

The disclosure relates to a V2X communication device. The V2X communication device is included in an intelligent transport system (ITS), and may perform some of or all the functions of the ITS system. The V2X communication device may perform communication between a vehicle and a vehicle, a vehicle and infrastructure, a vehicle and a bicycle, or with a mobile device. In one embodiment the V2X communication device may correspond to the on board unit (OBU) of a vehicle or may be included in an OBU. The OBU may be referred to as an on board equipment (OBE). The V2X communication device may correspond to a road side unit (RSU) of infrastructure or may be included in an RSU. The RSU may be referred to as roadside equipment (RSE). Alternatively, the V2X communication device may correspond to an ITS station or may be included in an ITS station. All of given OBU, RSU and mobile equipment that perform V2X communication may be referred to as ITS stations. Alternatively, the V2X communication device may correspond to a wireless access in vehicular (WAVE) apparatus or may be included in a WAVE apparatus. The V2X communication device may be abbreviated as a V2X apparatus.

Hereinafter, a collective perception (CP) service provided by the V2X communication device and a basic structure of a CP message (CPM) for the CP service (hereinafter, may be referred to as CPS) are first described. Furthermore, various embodiments of a CPM structure for performance improvements of the CP service are described. In the disclosure, various embodiments are described, assuming that the V2X communication device generating the CPM is a V2X communication device of a vehicle. However, the following embodiments described below may be applied to a V2X communication device of an RSU or a personal V2X communication device in the same or similar manner, if necessary or desired. In the disclosure, the CPM may also be referred to as a CPM message.

FIG. 1 is a view illustrating an exemplary architecture of an V2X communication device according to an embodiment of the disclosure. FIG. 1 may be an exemplary architecture of a V2X communication device that may be implemented based on, for example, the reference architecture of an ITS station compliant with the EU standard.

Application layer: The application layer may implement and support various use cases. For example, an application may provide road safety, efficient traffic information, and other application information.

Facilities layer: The facilities layer may support effective implementation of various usage examples defined in the application layer.

This facilities layer may basically support the same or similar functions as the upper three layers of an OSI model. In addition, facilities for the V2X communication device may be provided. For example, the facilities layer may provide facilities such as application support, information support, and session/communication support. Here, the facilities refer to a component that provides functionality, information, and data. The three facilities proposed as an example will be described as follows.

The application support facility refers to a facility that supports a basic application set (or message set). In the case of the V2X communication device of FIG. 1, the facilities layer may support V2X messages/ITS messages, for example, a periodic message such as CAM or an event message such as Decentralized Environmental Notification Messages (DENM). The facilities layer may also support, for example, CPM messages.

The information support facility may be a facility that provides common data information or database used for a basic application set (or message set), and may be, for example, a Local Dynamic Map (LDM).

The session/communication support facility is a facility that provides services for communication and session management, and may be an addressing mode, a session support and the like.

As described above, the facilities layer supports the application set (or message set) as one of main functions thereof. That is, the facilities layer performs a role of generating a message set (or message) based on information to be transmitted or a service to be provided by the application layer. The generated message may be referred to as an V2X message/ITS message, which will be described in detail below with reference to the accompanying drawings.

Access layer: The access layer may transmit the message/data received at the upper layers through a physical channel. For example, the access layer may perform/support data communication, based on an IEEE 802.11 and/or 802.11p standards-based communication technology, an ITS-G5 wireless communication technology based on a physical transmission technology of the IEEE 802.11 and/or 802.11p standards, a 2G/3G/4G (LTE)/5G wireless cellular communication technology including satellite/broadband wireless mobile communication, a broadband terrestrial digital broadcasting technology such as DVB-T/T2/ATSC, a GPS technology, and an IEEE 1609 WAVE technology.

Network and Transport Layer: The network/transport layer may configure a network for vehicle communication between homogenous/heterogeneous networks, by using various transport protocols and network protocols.

The transport layer is a connection layer between services provided by the upper layers (session layer, presentation layer, and application layer) and the lower layers (network layer, data link layer, and physical layer). The transport layer may manage the transmitted data to exactly arrive at a destination. At the transmitting side, the transport layer may process the data into packets of an appropriate size for efficient data transmission, and at the receiving side, the transport layer may perform processing to recover the received packets to the original file. In an embodiment, protocols such as Transmission Control Protocol (TCP), User Datagram Protocol (UDP), and Basic Transport Protocol (BTP) may be used as a transport protocol.

The network layer may manage the logical address, and may determine the delivery path of the packet. The network layer may receive the packet generated in the transport layer, and may add the logical address of the destination to a network layer header. In an embodiment, the packet path may be considered for unicast/broadcast between vehicles, between vehicles and fixed stations, and between fixed stations. In an embodiment, geo-networking, IPv6 networking with mobility support, and IPv6 over geo-networking may be considered as the networking protocol.

The exemplary architecture of V2X communication device may further include a management layer and a security layer.

FIG. 2 is a view illustrating a method of processing a V2X message according to an embodiment of the disclosure.

As described above, the application layer or the facilities layer may generate a V2X message. For example, a CAM, a DENM, or a CPM message may be generated as the V2X message.

The transport layer may generate a BTP packet, and the network layer may encapsulate the BTP packet to generate a GeoNetworking packet. The GeoNetworking packet may be encapsulated into an LLC packet. In the embodiment of FIG. 2, the data may include a message set, and the message set may become a basic safety message.

BTP is a protocol for transmitting the V2X message generated in a facilities layer to a lower layer. A BTP header includes A type and B type. The A type BTP header may include a destination/destination port and a source port, which are necessary for transmission/reception in interactive packet transmission. The B type header may include destination port and destination port information necessary for transmission in non-interactive packet transmission. A description of fields/information included in the header is as follows.

Destination Port: The destination port identifies a facility entity corresponding to the destination of the data (BTP-PDU) included in the BTP packet.

Source Port: As a field generated in the case of the BTP-A type, the sound port indicates the port of the protocol entity of the facilities layer at a source to which the corresponding packet is transmitted. This field may have a size of 16 bits.

Destination Port Info: As a field generated in the case of the BTP-B type. The destination port info may provide additional information when the destination port is the most well-known port. This field may have a size of 16 bits.

The GeoNetworking packet includes a basic header and a common header according to the protocol of the network layer, and selectively includes an extension header according to the geo networking mode. The GeoNetworking header will be again described below.

An LLC header is added to the GeoNetworking packet to generate an LLC packet. The LLC header provides a function of distinguishing and transmitting IP data and GeoNetworking data. The IP data and the GeoNetworking data may be distinguished by Ethertype of SNAP. In an embodiment, when IP data is transmitted, the Ether type may be set to 0x86DD and included in the LLC header. In an embodiment, when GeoNetworking data is transmitted, the Ether type may be set to 0x86DC and included in the LLC header. A receiver may check the Ethertype field of the LLC packet header, and may forward and process the packet to the IP data path or the GeoNetworking path according to the value of the Ethertype field of the LLC packet header.

FIG. 3 illustrates an architecture of a V2X communication device providing a CP service according to an embodiment of the disclosure.

The V2X communication device may provide various services for traffic safety and efficiency. One of the services may be a cooperative awareness (CA) service. The cooperative awareness in road traffic means that road users and roadside infrastructures can know mutual positions, dynamics and attributes. Here, the road users may be all kinds of users on or near a road, which act as traffic safety and control, such as a vehicle, a truck, a motorcycle, a bicycle or a pedestrian, and the roadside infrastructures may be equipments including a road sign, a traffic light or a barrier, and an entrance.

This awareness of each other becomes basics of several road safety and traffic efficiency applications. This can be performed by regular exchange of information between the road users at vehicle to vehicle (V2V), vehicle to infrastructure (V2I), infrastructure to vehicle (I2V) or everything to everything (X2X), etc. which are based on a wireless network called a V2X network.

The cooperative safety and traffic efficiency applications require the V2X communication device to develop situational awareness that includes the presence and behavior of road users around the V2X communication device. For example, the V2X communication device may develop situational awareness through communication with its own sensors and other V2X communication devices. In this instance, the CA service may specify how the V2X communication device can inform its own position, dynamics and attributes by sending a cooperative awareness message (CAM).

As above, in the CA service, the V2X communication device may periodically provide its own position and state to surrounding V2X communication devices, thereby supporting traffic safety. However, the CA service has a limitation in that only information of the corresponding V2X communication device itself can be shared. In order to overcome this limitation, it is necessary to develop services such as a CP service.

The CP service may specify how the V2X communication device can inform other V2X communication devices about the position, dynamics, and attributes of surrounding road users and other objects that are detected. For example, the CP service may share this information with other V2X communication devices through the sending of collective perception messages (CPM). This CP service may be an optional facility for all types of V2X communication devices (vehicle V2X communication device, RSU V2X communication device, personal V2X communication device, etc.) participating in road traffic.

Hereinafter, a CPM transmitted by a V2X communication device participating in a V2X network and a CP service for transmitting the CPM are described in detail with reference to FIG. 3. In the disclosure, the CPM may be a message exchanged between V2X communication devices via a V2X network, and may be used to generate collective perception for road users and other objects detected and/or recognized by the V2X communication device. In this instance, the detected road user or object may be a road user or an object which is not equipped with a V2X communication device, but is not limited thereto.

As described above, the V2X communication device sharing information through the CAM shares only information about the state recognition of the V2X communication device itself with other V2X communication devices in order to generate cooperative awareness. In this case, since the road user or other objects unequipped with the V2X communication device are not a part of the system, a view about safety and traffic management related situations is limited.

One method for improving this is that a system that is equipped with the V2X communication device and is able to recognize road users and objects unequipped with the V2X communication device informs other V2X communication devices of the presence and state of road users and objects unequipped with a V2X device. In order to easily increase the safety and traffic management performance, the CP service recognizes the cooperative awareness of the presence of the road user and the object unequipped with the V2X device, and hence can easily increase the safety and traffic management performance of the system equipped with the V2X communication device.

As shown in FIG. 3, the CP service may be a facilities layer entity that operates a CPM protocol. For example, the CP service may be a part of an application support domain of the facilities layer. FIG. 3 illustrates a logical interface for the CP service and other layers in the architecture of the V2X communication device and a potential logical interface for entities in the facilities layer.

This CP service may provide two services, for example, sending and receiving of the CPM. The CP service may be fundamentally different from the CA service in that the CP service cannot receive input data about a host V2X communication device, for example, from a VDP or POTI unit.

The sending of the CPM includes generation and transmission of the CPM. In a process for generating the CPM, an originating V2X communication device configures a CPM, and then the CPM is delivered to the networking and transport layer for dissemination. In the disclosure, the originating V2X communication device may be referred to as a sending V2X communication device, a transmitting V2X communication device, a host V2X communication device, etc.

In order to collect relevant information for the CPM generation and to deliver the received CPM content for additional processing, the CP service may interface with other entities in the facilities layer and V2X applications in the facilities layer. In an embodiment, at the V2X communication device, the entity for data collection may be a facility that provides object detection at a host object detector.

Further, in order to disseminate (or send) the CPM, the CP service may use services provided by protocol entities of the networking and transport layer. For example, the CP service may interface with the networking and transport layer (N&T) through NF-SAP to exchange CPM messages with other V2X communication devices. In addition, the CP service may interface with the secure entities through SF-SAP to access the security service for CPM dissemination and CPM reception, may interface with the management entities through MF-SAP, and may interface with the application layer through FA-SAP if the received CPM data are directly provided to the application.

The dissemination of the CPM may vary depending on the applied communication system. For example, in the ITS-G5 network (defined in ETSI EN 302 663), the CPM may be sent to all the V2X communication devices within a direct communication range by the originating V2X communication device. The communication range may be particularly affected by the originating V2X communication device by changing the transmission power according to a relevant region.

Further, the CPM may be periodically generated at a rate that is controlled by the CP service in the originating V2X communication device. The generation frequency may be determined considering a radio channel load determined by decentralized congestion control (DCC), and determined in consideration of the state of the detected non-V2X object, for example, dynamic behavior of position, speed or direction, and transmission of the CPM for the same (perceived) object by other V2X communication devices.

Further, when the receiving V2X communication device receives the CPM, the CP service allows the contents of the CP to be able to be used in facilities within the receiving V2X communication device, such as a V2X application and/or a local dynamic map (LDM). For example, the local dynamic map (LDM) may be updated with the received CPM data. The V2X application may retrieve this information from the LDM for additional processing.

FIG. 4 illustrates a function block diagram of a CP service according to an embodiment of the disclosure. More specifically, FIG. 4 illustrates a functional block of a CP service and a function block having interfaces for other facilities and layers according to an embodiment of the disclosure As shown in FIG. 4, the CP service may provide the following sub-functions for CPM transmission and reception.

CPM encoding: This sub-function may configure or generate a CPM according to a predefined format. In this instance, the latest in-vehicle data may be included in the CPM.

CPM decoding: This sub-function may decode the received CPM.

CPM transmission management: This sub-function may implement a protocol operation of the originating V2X communication device. In particular, this may include activation and termination of the CPM transmission operation, determination of the CPM generation frequency, and trigger of the CPM generation.

CP reception management: This sub-function may implement a protocol operation of the receiving V2X communication device. In particular, this may include triggering "CPM decoding" function in the CPM reception, providing the received CPM data to the LDM or the V2X application of the receiving V2X communication device, and checking information of the optionally received CPM.

The CPM dissemination is described in detail below. Specifically, the requirements for CPM dissemination, CP service activation and termination, CPM trigger conditions, CPM generation cycle, constraints, etc. are described.

In an embodiment, point-to-multipoint communication may be used for CPM transmission. For example, when ITS-G5 is used for CPM dissemination, a control channel (G5-CCH) may be used. In an embodiment, the CPM generation may be triggered and managed by the CP service while the CP service is being activated. For example, the CP service may be activated together with the activation of the V2X communication device and may be terminated when the V2X communication device is terminated.

In an embodiment, the host V2X communication device may send a CPM whenever at least one object having a sufficient level of confidence that needs to be exchanged with the neighboring V2X communication device is detected. With regard to the inclusion of the detected object, the CP service should consider a trade-off between the object age and the channel utilization. For example, in terms of an application using information received by the CPM, updated information should be provided as frequently as possible. However, in terms of the ITS-G5 stack, the channel utilization should be minimized, and thus a low transmission cycle is required. Accordingly, considering this, the V2X communication device should appropriately include the detected object or object information in the CPM. In order to reduce a resulting message size, the object needs to be evaluated before transmission thereof.

FIG. 5 illustrates a CPM structure according to an embodiment of the disclosure. In an embodiment of FIG. 5, the CPM structure may be a basic CPM structure.

As described above, the CPM may be a message exchanged between V2X communication devices in a V2X network and may be used to generate collective perception for road users and/or other objects detected and/or recognized by the V2X communication device. That is, the CPM may be an ITS message for generating the collective perception for an object detected by the V2X communication device.

In an embodiment, the CPM may include state and attribute information of road users and objects detected by the originating V2X communication device. The content may vary depending on types of detected road users or objects and a detection performance of the originating V2X communication device. For example, in the case of a vehicle object, the state information may at least include information on an actual time, a position, and a motion state. Further, the attribute information may include attributes such as a dimension, a vehicle type, and a role within road traffic.

The CPM may complement the CAM and act similarly to the CAM. That is, this may be to increase the cooperative awareness. The CPM may include externally observable information about the detected road user or object. The CP service may include a method of reducing replication or duplication of a CPM sent by a different V2X communication device by checking a CPM sent by another station.

Upon the CPM reception, the receiving V2X communication device may recognize the presence, type and state of the road user or object that has been detected by the originating V2X communication device. The received information may be used by the receiving V2X communication device in order to support V2X applications for increasing safety and improving traffic efficiency and travel time. For example, by comparing the received information with the state of the detected road user or object, the receiving V2X communication device may estimate a risk of collision with the road user or object. Further, the receiving V2X communication device may inform a user through a human-machine interface (HMI) of the receiving V2X communication device, or may automatically take corrective actions.

A basic structure/format of the CPM is described below with reference to FIG. 5. This CPM format may be presented as ASN.1. Also, a data element (DE) and a data frame (DF) which are not defined in the disclosure may be derived from the common data dictionary specified in ETSI TS 102 894-2.

Referring to FIG. 5, the CPM may include an ITS protocol data unit (PDU) header and a plurality of containers.

The ITS PDU header is a common header including information on a protocol version, a message type, and an ITS ID of the originating V2X communication device. The ITS PDU header is a common header used in the ITS message and exists in the starting part of the ITS message. The ITS PDU header may be referred to as a common header, a header, etc.

The plurality of containers may include an originating vehicle container (OVC), a perceived (or detected) object container (POC), and/or a field-of-view container (FOC) (or may be referred to as a sensor information container (SIC)). For example, the CPM may include the OVC as a mandatory container and may optionally include the FoVC and the POC. Each container is described below with reference to Tables 1 to 3.

Table 1 represents an exemplary OVC in the CPM.

TABLE 1

| DE | TS 102 894-2 [2] CDD reference |
| --- | --- |
| Generation Delta Time | See CAM ETSI EN 302 637-2 [3] |
| Reference Position | A.124 |
| Heading | A.112 |
| Longitudinal Speed | A.126 |
| Lateral Speed | A.126 |
| Vehicle Length | A.131 |
| Vehicle Width | A.95 |

Specifically, Table 1 shows data elements (DEs) and/or data frames (DFs) included in the exemplary OVC. Here, the DE is a data type including single data. The DF is a data type that includes one or more elements in the predefined order. For example, the DF may be a data type that includes one or more DEs and/or one or more DFs in the predefined order.

The DE/DF may be used to configure a facilities layer message or a V2X application layer message. Examples of the facilities layer message may include a CAM, a CPM, a DENM, and the like. In the disclosure, these messages may be referred to as V2X messages or ITS messages.

As shown in Table 1, the OVC includes basic information related to the V2X communication device that disseminates the CPM. The OVC may be interpreted as a scale-down version of the CAM, but may include only the DE required for a coordination transformation process. That is, although similar to the CAM, the OVC provides basic information about the originating V2X communication device. However, the included information focuses on supporting the coordinate transformation process.

The OVC may provide the followings.

The latest geographic position of the originating V2X communication device obtained by the CP service upon the CPM generation The lateral and longitudinal absolute velocity components of the originating V2X communication device Geometric dimensions of the originating V2X communication device Each information (DE or DF) is described below with reference to Table 1.

Generation delta time: as the DE, indicates time corresponding to time of a reference position in the CPM. This may be considered as time of the CPM generation. In the disclosure, the generation delta time may be referred to as a generation time.

Reference position: as the DF, indicates a geographic position of the V2X communication device. This indicates a geographic point position. In an embodiment, the reference position includes information about a latitude, a longitude, a position confidence and/or an altitude. Here, the latitude represents a latitude of the geographic point, and the longitude represents a longitude of the geographic point. Further, the position confidence represents the accuracy of the geographic position, and the altitude represents an altitude and altitude accuracy of the geographic point.

Heading: as the DF, indicates an orientation in a coordinate system. In an embodiment, the heading includes information about heading value and/or heading confidence. Here, the heading value indicates a traveling direction based on the north, and the heading confidence indicates accuracy of a reported heading value having a predefined confidence level.

Longitudinal speed: as the DF, may describe a longitudinal speed and accuracy of speed information about a moving object (e.g., a vehicle). In an embodiment, the longitudinal speed includes information on speed values and/or speed accuracy. Here, the speed value represents a speed value in the longitudinal direction, and the speed accuracy represents accuracy of the reported speed value.

Lateral speed: as the DF, may describe a lateral speed and accuracy of speed information about a moving object (e.g., a vehicle). In an embodiment, the lateral speed includes information on speed values and/or speed accuracy. Here, the speed value represents a speed value in the lateral direction, and the speed accuracy represents accuracy of the reported speed value.

Vehicle length: as the DF, represents a vehicle length and an accuracy indication. In an embodiment, the vehicle length includes information about a vehicle length value and/or a vehicle length accuracy indication. Here, the vehicle length represents a length of the vehicle, and the vehicle length accuracy indication represents an indication of reported length value confidence.

Vehicle width: as the DE, indicates a width of the vehicle. For example, the vehicle width may represent the width of the vehicle including side mirrors. For example, when the vehicle width is equal to or greater than 6.1 meters, the value has to be set to 61. If this information is not available, the value has to be set to 62.

Table 2 shows an exemplary FOC (or SIC) in the CPM.

TABLE 2

| DE | SI-Unit | Description |
| --- | --- | --- |
| Sensor ID | — | Unique ID of sensor which is used to identify by which sensor an object has been perceived. The ID is a random number generated when the ITS-S is activated and never changes until the ITS-S is deactivated. |
| Sensor Type | — | Enumeration of sensor types: undefined (0), radar (1), lidar (2), monovideo (3), stereovision (4), nightvision (5), ultrasonic (6), fusedObject (7), pmd (8) |
| Sensor Position | | |
| Position X | m | Mounting position of the sensor in negative x-direction according to the ISO 8855 [i.15] reference frame, measured from the ETSI reference position (see Clause B.19 in EN 302 637-2 [3]) |
| Position Y | m | Mounting position of the sensor in y-direction according to the ISO 8855 [i.15] reference frame, measured from the ETSI reference position (see Clause B.19 in EN 302 637-2 [3]) |
| Radius | m | Average perception range of the sensor as defined by the manufacturer |
| Opening Angle | | |
| Begin Angle | deg | Start angle of the sensor frustum in ISO 8855 [i.15] coordinate system |
| End Angle | deg | End angle of the sensor frustum in ISO 8855 [i.15] coordinate system |
| Quality Class | — | Classification of sensor defining the quality of measured objects |

The FOC provides a description of at least one sensor mounted on the originating V2X communication device. When the V2X communication device is equipped with a multi-sensor, the description may be added several times. For example, the FOC provides information about sensor capabilities of the originating V2X communication device. To this end, generic sensor characteristics which provide a mounting position of a sensor on the disseminating V2X communication device as well as a sensor type and a range and an opening angle of the sensor (i.e., frustum of the sensor) may be included as a part of the message. This information may be used by the receiving V2X communication device to select an appropriate prediction model according to a performance of the sensor.

Each piece of information (DE or DF) is described below with reference to Table 2.

Sensor ID: This indicates a unique ID of a sensor used to identify a sensor by which an object has been perceived (or detected). That is, the sensor ID indicates a unique ID of a sensor that detects the object. In an embodiment, the sensor ID is a random number generated when the V2X communication device is activated, and may never change until the V2X communication device is deactivated.

Sensor type: This indicates a type of sensor. That is, the sensor type is enumerated. For example, the sensor type may be undefined (0), radar (1), lidar (2), monovideo (3), stereovision (4), nightvision (5), ultrasonic (6), fusedObject (7), or pmd(8).

Sensor position: Position X indicates a mounting position of the sensor in the negative x-direction, and position Y indicates a mounting position of the sensor in the y-direction.

Radius: This indicates an average perception range of the sensor as defined by the manufacturer.

Opening angle: a begin angle indicates a start angle of the sensor frustum, and an end angle indicates an end angle of the sensor frustum.

Quality Class: This represents classification of the sensors that define the quality of the measured objects.

Table 3 shows an exemplary POC in the CPM.

TABLE 3

| DE | TS 102 894-2 [2] CDD reference | Mandatory | Description |
|---|---|---|---|
| Time of Measurement | | Yes | Time in micro-seconds from the message reference time. Defines the relative age of the measured object. |
| Object ID | | Yes | Unique random ID assigned to object. This ID is maintained (i.e. does not change) as long as the object is tracked (i.e. considered by the disseminating ITS-S's data fusion processes). |
| Sensor ID | | Yes | Corresponds to the Sensor ID DE in Table 4. This DE is used to relate the object information to the sensor providing the measurement. |
| Longitudinal Distance | | Yes | |
| Distance Value | | Yes | Relative x-distance to object in originator reference frame ISO 8855 [i.15] |
| Distance Confidence | | Yes | Confidence of relative x-distance to object in originator reference frame ISO 8855 [i.15] |
| Lateral Distance | | Yes | |
| Distance Value | | Yes | Relative y-distance to object in originator reference frame ISO 8855 [i.15] |
| Distance Confidence | | Yes | Confidence of relative y-distance to object in originator reference frame ISO 8855 [i.15] |
| Longitudinal Speed | A.126 | Yes | Longitudinal speed of detected object along with confidence as described in CDD |
| Lateral Speed | A.126 | Yes | Lateral speed of detected object along with confidence as described in CDD |
| Object Heading | A.112 | No | Absolute orientation of object in WGS84 reference frame, if provided by data fusion process |
| Object Length | | No | |
| Length Value | | No | Measured length of the object |
| Length Confidence | | No | Confidence of measured length of the object |
| Object Width | | No | |
| Width Value | | No | Measured width of the object |
| Width Confidence | | No | Confidence of measured width of the object |
| Object Type | A.78 | No | Classification of object, if provided by data fusion process |

The POC is used to describe an object perceived by the sensor in terms of the transmitting V2X communication device. Upon reception of the POC, the receiving V2X communication device may perform the coordinate transformation process with the help of the OVC to convert a position of the object into a reference frame of a receiving vehicle. In order to reduce the message size, several optional DEs may be provided, which may be used when the originating V2X communication device can provide the DE.

The POC may be configured with selection of DEs to provide an abstract description of the perceived (or detected) object. For example, relative distance and velocity information and timing information about the perceived object related to the originating V2X communication device may be included in the POC as a mandatory DE. In addition, when the sensor of the originating V2X communication device can provide requested data, additional optional DEs may be provided.

Each information (DE or DF) is described below with reference to Table 3.

Measurement time: This indicates time in microseconds from a message reference time. This may define a relative age of the measured object.

Object ID: This indicates a unique random ID assigned to an object. This ID is maintained (i.e., is not changed) as long as the object is tracked (i.e., as long as considered by data fusion processes of the disseminating V2X communication device).

Sensor ID: This is an ID corresponding to the sensor ID DE in Table 2. This DE may be used to relate object information to a sensor providing the measurement.

Longitudinal distance: A distance value indicates a relative x-distance to the object in an originator reference frame, and distance confidence: this indicates a confidence of a relative x-distance to the object in the originator reference frame.

Lateral distance: A distance value indicates a relative x-distance to the object in the originator reference frame, and distance confidence: this indicates a confidence of the relative x-distance to the object in the originator reference frame.

Longitudinal speed: This indicates a longitudinal speed of the detected object according to the confidence.

Lateral speed: This indicates a lateral speed of the detected object according to the confidence.

Object heading: This indicates an absolute orientation of the object in the reference frame, if provided by the data fusion process.

Object length: A length value indicates a measured length of the object, and length confidence: this indicates a confidence of the measured length of the object.

Object width: A width value indicates a measured width of the object, and width confidence: this indicates a confidence of the measured width of the object.

Object type: this represents the classification of the object, if provided by the data fusion process.

FIG. 6 illustrates a method of extracting sensor data by a V2X communication device providing a CP service according to an embodiment of the disclosure. More specifically, FIG. 6(a) illustrates how the V2X communication device extracts sensor data at a low level, and FIG. 6(b) illustrates how the V2X communication device extracts sensor data at a high level.

A source of sensor data to be transmitted as a part of any CPM needs to be selected according to requirements of a prospective data fusion process on the receiving V2X communication device. In general, the transmitted data should be as close as possible to original sensor data. However, simply transmitting the original sensor data, for example, raw data is not a viable solution. Because this imposes very high requirements in regard to a data rate and a transmission cycle. FIGS. 6(a) and 6(b) illustrate possible implementations for selecting data to be transmitted as a part of the CPM.

In an embodiment of FIG. 6(a), sensor data is obtained from different sensors and is processed as a part of a low-level data management entity. This entity may select object data to be inserted as a part of a next CPM, and also calculate the plausibility of the detected object. In FIG. 6(a), because data of each sensor is transmitted, an amount of data transmitted through the V2X network increases, but there is an advantage in that sensor information can be efficiently utilized in the receiving V2X communication device.

In an embodiment of FIG. 6(b), sensor data or object data provided by a data fusion process specific to the V2X communication device manufacturer are transmitted as a part of the CPM. In FIG. 6(b), because integrated sensor data collected into one via a data fusion block is transmitted, there is an advantage in that a small amount of data is transmitted through the V2X network. However, there is a disadvantage that it is dependent on the collection method of the V2X communication device collecting the sensor information. In this case, because different data fusion processes can be implemented by different manufacturers, this implementation method is not generally preferred to FIG. 6(a).

Each time the object is detected by the sensor of the V2X communication device regardless of the implementation type, the plausibility thereof needs to be calculated. When the plausibility of the object exceeds a given threshold PLAUS_OBJ, the transmission should be considered. For example, when an absolute difference between a current yaw angle of the detected object and a yaw angle included in the CPM that has been previously sent by the originating V2X communication device exceeds 4°, when a difference between a relative distance of current positions of the originating V2X communication device and the detected object and a relative position between the originating V2X communication device and the detected object included in the CPM that has been previously sent by the originating V2X communication device exceeds 4 meters, or when an absolute difference between a current velocity of the detected object and a velocity included in the CPM that has been previously sent by an originating object exceeds 0.5 m/s, the transmission may be considered.

The CAM is a technology in which a vehicle provided with a V2X module periodically transmits its position and state to a surrounding V2X vehicle to help more stable driving. However, the existing CAM had a limitation of sharing only information of its own vehicle, and thus a collective perception service (CPS) technology is being discussed to complement this. Because vehicles equipped with an ADAS technology are constantly increasing, many vehicles are equipped with sensors such as camera, radar, Lidar, etc. to recognize many surrounding vehicles and perform a driving driver assistance function. The CPS technology is a technology that informs the surroundings of sensor data recognizing a surrounding environment through V2X communication in an ADAS.

The disclosure proposes an effective managing method of the CPS technology transmitting information of the surrounding vehicle and a communication algorithm suitable for a V2X communication environment, in order to complement the CAM message transmitting only information of its own vehicle.

FIG. 7 illustrates a CP service as an embodiment to which the disclosure is applicable.

Referring to FIG. 7, it is assumed that each of TxV1 and RxV2 vehicles is equipped with at least one sensor and has a sensing range shown by the dotted line.

The TxV1 vehicle having a CPS function may recognize RV1 to RV11 vehicles, that are surrounding objects belonging to the sensing range, using several ADAS sensors mounted on the TxV1 vehicle. Object information obtained as described above may be delivered to surrounding vehicles equipped with a V2X receiver through the V2X communication. For example, an RxV1 vehicle not having the sensor among the surrounding vehicles receiving a CPS message can obtain information of the vehicles that follow, and an RxV2 vehicle equipped with the sensor can also obtain information of an object that is out of a sensing range of the RxV2 vehicle or is positioned at a blind spot.

As illustrated in FIG. 3 above, to this end, the facilities layer can provide the above-described CP service. That is, the CP service may be performed in the facilities layer and may use the services that internally exist in the facilities layer. Here, a local dynamic map (LDM) is a service providing a map and may provide map information for the CP service. A position and time (POTI) is a service providing a position of the vehicle and time and may provide a position of its own vehicle and exact time using the corresponding information. A vehicle data provider (VDP) is a service providing information about the vehicle and may transmit by loading information, such as the size of its own vehicle, on the CPM using this.

The ADAS vehicles are equipped with various sensors, such as a camera, an infrared sensor, radar, and Lidar, for the purpose of a driver driving assistance. The respective sensors may individually recognize an object, and object information recognized thus may be collected and fused by a data fusion block and may be provided to an ADAS application. Referring again to FIG. 6 above, for the CP service, a method of collecting (or fusing) sensor information in the existing ADAS technology is described.

An existing sensor for ADAS or an existing sensor for CPS may always track surrounding objects and collect relevant data. In this case, when sensor values for CPS service are used, sensor information may be collected using two methods. Referring to FIG. 6(a), the respective sensor values may be individually provided to the surrounding vehicles through the CP service. As illustrated in FIG. 6(a), because information is transmitted for each sensor, an amount of data transmitted through the V2X increases, but there is an advantage in that a receiving system can efficiently utilize each piece of sensor information. Referring to FIG. 6(b), integrated sensor information collected into one after the data fusion block may be provided to the CP service. In such a case, there is an advantage in that a size of the CPM message sent through the V2X decreases, but there is a disadvantage that it is dependent on a collection method of the vehicle collecting sensor information.

FIG. 8 illustrates a structure of a CPM message according to an embodiment to which the disclosure is applied.

Referring to FIG. 8, a CPM message may include header, originating station container (OSC), sensor information container (SIC), and perceived object container (POC) fields (or data, information, containers).

The header may include 'protocolVersion', 'messageID', 'stationID' and/or 'generationDeltaTime' fields. The respective fields represent, in turn, a version of protocol, an ID for distinguishing messages, an ID for distinguishing stations, and time at which the messages are generated.

The OSC field used to transmit information of its own vehicle may include 'BasicContainer' field and/or 'StationData' field. The stations may be roughly distinguished into a vehicle and a road side unit (RSU), and 'StationData' field suitable for this may exist. Commonly needed originating station information may be included in the 'BasicContainer' field. The 'BasicContainer' field of the OSC may include 'referencePosition' field representing a reference position of the vehicle transmitting the CPM and 'stationType' field representing a station type (e.g., vehicle, RSU). The 'StationData' field of the OSC may be defined differently depending on the station type. If the station is the vehicle, the 'StationData' field may include 'OrignatingVehicleContainer' field, and the 'OrignatingVehicleContainer' field may include 'Heading', 'Speed', 'OrientationDeltaAngle', 'driveDirection', 'Acceleration' and/or 'trailerData' fields (or data, information, containers). The respective fields may represent, in turn, a vehicle's driving direction, a vehicle's driving speed, an angle between the vehicle's driving direction and the vehicle's front, a vehicle's acceleration, and trailer information. If the station is the RSU, the 'StationData' field may include 'intersectionReferenceID' field and/or 'RoadSegmentationID' field, and the respective fields may represent an intersection identification ID and a road ID.

The SIC represents a container used to deliver installation/function information of the sensor used to detect the object. The SIC may include a vehicle sensor field or an RSU sensor field depending on the station type. The vehicle sensor field may include SensorID representing an ID of the sensor, SensorType representing a type of the sensor, offset data (represented by offset based on xOffset, yOffset, zOffset, and referencePosition) representing a position of the sensor, and/or data representing a measuring range (range, horizontalFrustumStart/End, verticalFrustumStart/End, measuring distance, horizontal measuring range, vertical measuring range) of the sensor. The RSU sensor field may include SensorID representing an ID of the sensor, offset information (represented by offset based on xOffset, yOffset, zOffset, and referencePosition) representing a position of the sensor, and/or data representing a measuring range (range, horizontalFrustumStart/End, verticalFrustumStart/End, measuring distance, horizontal measuring range, vertical measuring range) of the sensor.

The POC is a container that contains information of surrounding objects collected through the sensors. 'ObjectData' field including each object information is generated according to the number of measured objects. For example, if four objects are measured, four object data may be included in the POC field.

The object data may include 'ObjectID' representing an ID of the object, data 'SensorID' and 'TimeOfMeasurement' representing a sensor and time used in the measurement, position information ('xDistance', 'yDistance', 'zDistance'; representing x-distance, y-distance, and z-distance at 'referencePosition') of the measured object, motion information ('xSpeed', 'ySpeed', 'zSpeed', 'xAcceleration', 'yAcceleration', 'zAcceleration'; representing speed and acceleration at x-axis, y-axis, and z-axis) of the object, size information ('planarObjectDimension1', 'planarObjectDimension1', 'verticalObjectDimension'; informing size and height values of the horizontal plane that the object has) of the object, and/or state information ('classification', 'lanePosition', 'intersectionTopologyPositoin'; vehicle type of the object, lane information of the object, and intersection position information of the object) of the object.

FIG. 9 is a diagram illustrating an operation method of a CPM message according to an embodiment of the present disclosure.

Referring to FIG. 9, a V2X vehicle may manage a location and a state of an object by continuously tracking surrounding objects by using a sensor. In addition, the V2X vehicle may generate the CPM message by using information thereof and tracked object information. The CPM message generated as such passes through a network and a transport layer, and an access layer, and is generated as a V2X packet. In addition, object information sensed by a vehicle which provides a CPS service through an RF module may be transmitted to a surrounding V2X vehicle according to a preconfigured (or allocated) message transmission period.

A V2X message generated as illustrated in FIG. 9 may be periodically transmitted in an RF channel. When a transmission period (time t1) of the V2 vehicle is reached, the V2X vehicle transmits the generated V2X message to a surrounding vehicle. A time at which the message is actually transmitted corresponds to Ton and means a time when the channel is occupied. When the number of sensors increases or the number of sensed objects increases, a size of the CPS message may increase and a value of Ton may increase in proportion thereto. The V2X message may be periodically transmitted and transmitted at the time t1, and then the V2X message may also be transmitted again at a time t2 and a time t3. In this case, the V2X messages transmitted at the subsequent times t2 and t3 may be messages generated by using newly updated object information. A transmission period at which the V2X message is transmitted may be represented by Tinterval. The transmission period may be fixedly determined, and for example, adjusted according to a channel load as in a case where DCC technology is applied.

Vehicle-to-Everything (V2X) Communication

The V2X communication includes communication between the vehicle and all entities, which includes vehicle-to-vehicle (V2V) referring to communication between vehicles, vehicle to infrastructure (V2I) referring to communication between eNB or a road side unit (RSU), vehicle-to-pedestrian (V2P) referring to communication between the vehicle and a terminal possessed by an individual (a pedestrian, a bicycle driver, a vehicle driver, or a passenger), vehicle-to-network (V2N), etc.

The V2X communication may represent the same meaning as a V2X sidelink or NR V2X or represent a wider meaning including the V2X sidelink or NR V2X.

The V2X communication is applicable to various services including, for example, a front crash warning, an automatic parking system, a cooperative adaptive cruise control (CACC), a control loss warning, a traffic parade warning, a traffic vulnerable safety warning, an emergency vehicle warning, a speed warning when driving on a bent road, a traffic flow control, etc.

The V2X communication may be provided through a PC5 interface and/or a Uu interface. In this case, in the wireless communication system supporting the V2X communication, there may be specific network entities for supporting the communication between the vehicle and all entities. For example, the network entity may be the eNB, the road side unit (RSU), the UE, or an application server (e.g., a traffic safety server).

Further, the UE performing the V2X communication may mean a vehicle UE (V-UE), a pedestrian UE), a eNB type RSU, or a UE type RSU, a robot including a communication module, etc., in addition to a general handheld UE.

The V2X communication may be performed directly between UEs, or performed through the network entity (entities). A V2X operation mode may be distinguished according to a performing scheme of the V2X communication.

Terms used in the V2X communication are defined as follows.

A Road Side Unit (RSU): The Road Side Unit (RSU) is a V2X service capable device which may perform transmission and reception to and from a moving vehicle by using a V2I service.

Further, the RSU as a fixed infrastructure entity supporting a V2X application program may exchange a message with another entity supporting the V2X application program.

Pseudonymity: Processing of personally identifiable information (PII) is condition when data may not be provided to a specific subscriber without using additional information any longer, and if there is technical and organizational measures to ensure a non-attribution to a subscriber in which the additional information is separately maintained and identified or identifiable.

The RSU is a term frequently used in an existing ITS specification, and the term is introduced into a 3GPP specification in order to more easily read a document in an ITS industry.

The RSU is a logical entity that combines V2X application logic with a function of the eNB (referred to as eNB—type RSU) or UE (referred to as UE—type RSU).

V2I Service: As a type of V2X service, and one side is the vehicle and the other side is an entity which belongs to an infrastructure.

V2P Service: As a type of V2X service, and one side is the vehicle and the other side is a device (e.g., a handheld UE held by which the pedestrian, a person riding a bicycle, a driver, or a fellow passenger).

V2X Service: A 3GPP communication service type in which a transmitting or receiving device is related to the vehicle.

The V2X service may be further divided into the V2V service, the V2I service, and the V2P service according to the other party which participates in communication.

V2X enabled UE: A UE supporting the V2X service.

V2V Service: As a type of V2X service, both sides of communication are vehicles.

V2V communication range: A direct communication range between both vehicles participating in the V2V service.

A V2X Application Program Support Type

A V2X application which is referred to as Vehicle-to-Everything (V2X) is four types of (1) vehicle to vehicle (V2V), (2), vehicle to infrastructure (V2I), (3) vehicle to network (V2N), and (4) vehicle to pedestrian (V2P) as described.

FIG. 10 illustrates a type of a V2X application.

The V2X applications of four types may use "co-operative awareness" providing a more intelligent service for a final user.

This means that entities such as the vehicle, a roadside infrastructure facility, the application server, and the pedestrian may collect a knowledge (e.g., information received from other adjacent vehicles or sensor equipments) for a corresponding local environment so as to process and share the corresponding knowledge in order to provide more intelligent information such as the cooperative crash warning or autonomous driving.

Such an intelligent transport service and a related message set are defined as a vehicle SDO outside 3GPP.

Three basic classes for providing the ITS service: A road safety, traffic efficiency, and other application programs are described in, for example, ETSI TR 102 638 V1.1.1, "Vehicular Communications; Basic Set of Applications; Definitions".

The 3GPP processes only transmission of such a message in order to support various types of V2X application programs.

FIG. 11 illustrates a reference point and a reference architecture for V2X communication.

In the reference architecture for the V2X communication, a V2X control function and a V2X application server are added to the existing LTE network. The V2X control function may serve to authenticate the UE and grant an authority for the service. There may be a plurality of V2X control functions in multiple PLMNs. The V2X application server may become the traffic safety server, and receive data, and deliver the data by using a unicast or multicast scheme.

A reference point in the reference architecture for the V2X communication is described.

V1: is a reference point between the V2X application in the UE and the V2X application in the V2X applicant server.

V2: is a reference point between V2X control functions in the V2X application server and an operator network. Here, the V2X application server may be connected to V2X control functions which belong to a plurality of public land mobile networks (PLMNs).

V3: is a reference point between V2X control functions in the UE and a home PLMN of the UE. This may be applied to PC5 and LTE-Uu based V2X communication, and additionally applied to both a Multimedia Broadcast/Multicast Service (MBMS) and the LTE-Uu based V2X communication.

V4: is a reference point between V2X control functions in a Home Subscriber Server (HSS) and the operator network.

V5: is a reference point between V2X applications in the UE.

V6: is a reference point between a V2X control function in an HPLMN and a V2X control function in a VPLMN.

PC5: is a reference point between UEs used in the user plane for ProSe direct communication for the V2X service.

S6a: In the V2X service, S6a is used for downloading V2X service related subscription information to a mobility management entity (MME) during an E-UTRAN access procedure or notifying that MME subscription information in the HSS is changed.

S1-MME: In the V2X service, an S1-MME is used for transporting a V2X service authentication to eNodeB (base station) from the MME.

MB2: is a reference point between the V2X application server and BM-SC.

LTE-Uu: is a reference point between the UE and the E-UTRAN.

FIG. 12 is a block diagram illustrating a radio protocol architecture for a user plane for the V2X communication, and FIG. 13 is a block diagram illustrating a radio protocol architecture for a control plane for the V2X communication. FIGS. 12 and 13 are the same as a protocol stack for a sidelink of FIG. L2, and the above description is referred to for a description other than contents mentioned below.

Referring to FIGS. 12 and 13, the radio protocol architecture for the user plane may include a Packet Data Convergence Protocol (PDCP), a Radio Link Control (RLC), a Medium Access Control (MAC), and a physical layer (PHY), and the radio protocol architecture for the control plane may include a radio resource control (RRC), the RLC, the MAC, and the physical layer.

The physical (PHY) layer provides an information transfer service to a higher layer a physical channel. The physical layer is connected to a medium access control (MAC) layer which is the upper layer through a transport channel. Data moves between the MAC layer and the physical layer through the transport channel. The transport channel is classified according to how the data is transmitted through a radio interface and what feature the data is transmitted.

Data move between different physical layers, that is, between the physical layers of a transmitter and a receiver through the physical channel. The physical channel may be modulated by an orthogonal frequency division multiplexing (OFDM) scheme and uses a time and a frequency as the radio resources, for example.

The function of the MAC layer includes mapping between a logical channel and a transmission channel and multiplexing/demultiplexing to the transport block provided to the physical channel on the transport channel of an MAC service data unit (SDU) which belongs to the logical channel. The MAC layer provides a service to a radio link control (RLC) layer through the logical channel.

The function of the RLC layer includes concatenation, segmentation, and reassembly of the RLC SDUs. The RLC layer may provide various operation modes in order to guarantee various Quality of Service (QoS) requested by a radio bearer.

The radio resource control (RRC) layer is defined only in the control plane. The RRC layer may serve to control the logical, transport, and physical channels in connection with configuration, re-configuration and release of the radio bearers.

The function of the packet data convergence protocol (PDCP) layer in the user plane may include transmission of the user data, header compression, and ciphering.

The physical channel is constituted by several symbols in a time domain and several subcarriers in a frequency domain. One sub-frame is composed of the plurality of symbols in the time domain. A resource block as a resource allocation unit is constituted by the plurality of symbols and a plurality of subcarriers.

FIG. 14 illustrates a resource allocation method in a sidelink in which V2X is used.

In the sidelink, different sidelink control channels (PSCCHs) may be spaced and allocated in the frequency domain and different sidelink shared channels (PSSCHs) may be spaced and allocated as illustrated in FIG. 14(a). Alternatively, as illustrated in FIG. 14(b), different PSCCHs may be consecutively allocated in the frequency domain and the PSSCHs may also be consecutively allocated in the frequency domain.

FIG. 15 illustrates a mapping example of a Demodulation Reference Signal (DMRS) in the sidelink in which the V2X is used.

In, the DMRS is mapped to two symbols in one subframe (for example, the DMRS is arranged in symbol #3 and symbol #10 as illustrated in FIG. 15(a)). However, in a high-speed vehicle driving environment, a Doppler effect may increase and a rapid channel change may occur. By considering such a point, more DMRSs may be mapped than those in the existing LTE-Rel 12/13 (for example, the DMRS may be arranged in four symbols in one subframe), as illustrated in FIG. 15(b).

V2X Synchronization

In time division multiple access (TDMA) and frequency division multiples access (FDMA) systems, accurate time and frequency synchronization is required. When the time and frequency synchronization is not accurately achieved, intersymbol interference (ISI) and intercarrier interference (ICI) are caused, and as a result, system performance deteriorates. This is also the same for V2X. In the V2X, for the time/frequency synchronization, a sidelink synchronization signal (SLSS) may be used in the physical layer and master information block-sidelink-V2X (MIB-SL-V2X) may be used in a radio link control (RLC) layer.

First, a source of synchronization or a reference of synchronization in the V2X is described The UE may acquire information on the time/frequency synchronization from at least one of global navigation satellite systems (GNSS), a base station (serving cell, hereinafter, it is the same), or other adjacent UEs.

Specifically, the UE may be directly synchronized with the GNSS or synchronized with another UE which is time/frequency synchronized with the GNSS. When the GNSS is configured as a synchronization source, the UE may calculate a direct frame number (DFN) and a subframe number by using a coordinated universal time (UTC) and a (pre) configured DFN offset.

Alternatively, the UE may be directly synchronized with the eNB or synchronized with another UE which is time/frequency synchronized with the eNB. For example, when the UE is within network coverage, the UE may receive synchronization information provided by the eNB and be directly synchronized with the eNB. Thereafter, the synchronization information may be provided to another adjacent UE. When an eNB timing is configured as a reference of synchronization, the UE may follow a cell associated with a corresponding frequency (when the UE is within cell coverage in the frequency, a primary cell, or a serving cell (when the UE is outside the cell coverage in the frequency) for synchronization and downlink measurement.

The eNB (serving cell) may provide a synchronization configuration for a carrier used for V2X sidelink communication. In this case, the UE may follow the synchronization configuration received from the eNB. If no cell is detected in the carrier used for the V2X sidelink communication and the synchronization configuration may not also be received from the serving cell, the UE may follow a pre-configured synchronization configuration.

Alternatively, the UE may be synchronized with another UE which may not acquire the synchronization information directly or indirectly from the eNB or GNSS. The source and preference of the synchronization may be pre-configured to the UE or configured through a control message provided by the eNB.

The synchronization signal (SLSS) and the synchronization information are described.

The SLSS as a sidelink specific sequence may include a primary sidelink synchronization signal (PSSS) and a secondary sidelink synchronization signal (SSSS).

Each SLSS may have a physical layer sidelink synchronization identity (ID), and a value thereof may be nay one of 0 to 335. The synchronization source may be identified according to which value among the values is used. For example, 0, 168, and 169 may mean the GNSS, 1 to 167 may represent the eNB, and 170 to 335 may mean a coverage outside. Alternatively, among the physical layer sidelink synchronization identities (IDs), 0 to 167 may be used by the network and 168 to 335 may also be values used outside the network coverage.

As the PSSS, a sequence $d_i(0), \ldots, d_i(61)$, i=1, 2 generated by Equation 1 below may be used.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 1]}$$

When the physical layer sidelink synchronization identity (ID) is 167 or less, u=26 in Equation 1 above and if not, u=37 may be used.

A sequence di(n) generated by the above equation may be multiplied by an amplitude scaling factor (e.g., $\sqrt{72/62} \cdot \beta_{PSBCH}$), and then mapped to a resource element ak,l of a first slot of the subframe. Equation 2 shows an example of ak,l.

$$a_{k,l} = d_i(n), n = 0, \ldots, 61 \quad \text{[Equation 2]}$$

$$k = n - 31 + \frac{N_{RB}^{SL} N_{sc}^{RB}}{2}$$

$$l = \begin{cases} 1, 2 & \text{normal cyclic prefix} \\ 0, 1 & \text{extended cyclic prefix} \end{cases}$$

NRBSC represents a size of a resource block expressed by the number of subcarriers in the frequency domain and NSLRB represents a sidelink band configuration expressed by a multiple of the NRBSC. k may represent a subcarrier index and l may mean a symbol index in a symbol.

In respect to the SSSS, in Equations 3 to 8 below, in the case of transmission modes 1 2, subframe 0, $N_{ID}^{(1)} = N_{ID}^{SL}$ mod 168, and $N_{ID}^{(2)} = \lfloor N_{ID}^{SL}/168 \rfloor$ are assumed and in the case of transmission modes 3 and 4, subframe 5 is assumed, and then a generated sequence $d_i(0), \ldots, d_i(61)$, i=1, 2 may be used. Specifically, the SSS may be generated by a combination of two sequences having a length of 31, and may vary depending on the subframe. However, 0≤n≤30.

$$d(2n) = \begin{cases} s_0^{(m_0)}(n)c_0(n) & \text{in subframes } 0, 1, 2, 3, 4 \\ s_1^{(m_1)}(n)c_0(n) & \text{in subframes } 5, 6, 7, 8, 9 \end{cases} \quad \text{[Equation 3]}$$

$$d(2n+1) = \begin{cases} s_1^{(m_1)}(n)c_1(n)z_1^{(m_0)}(n) & \text{in subframes } 0, 1, 2, 3, 4 \\ s_0^{(m_0)}(n)c_1(n)z_1^{(m_1)}(n) & \text{in subframes } 5, 6, 7, 8, 9 \end{cases}$$

In Equation 3, indices $m_0$ and $m_1$ may be determined according to $N_{ID}^{(1)}$ which is a physical layer cell ID.

$$m_0 = m' \bmod 31 \quad \text{[Equation 4]}$$

$$m_1 = (m_0 + \lfloor m'/31 \rfloor + 1) \bmod 31$$

$$m' = N_{ID}^{(1)} + q(q+1)/2,$$

$$q = \left\lfloor \frac{N_{ID}^{(1)} + q'(q'+1)/2}{30} \right\rfloor,$$

$$q' = \lfloor N_{ID}^{(1)}/30 \rfloor$$

In Equation 3, two sequences $s_0^{(m_0)}(n)$ and $s_1^{(m_1)}(n)$ may be determined as in an equation below.

$$s_0^{(m_0)}(n) = \tilde{s}((n + m_0) \bmod 31) \quad \text{[Equation 5]}$$

$$s_1^{(m_1)}(n) = \tilde{s}((n + m_1) \bmod 31)$$

In Equation 3, $\tilde{s}(i) = 1 - 2x(i)$ and $0 \leq i \leq 30$, and x(i) may be determined as in an equation below.

$$x(\tilde{i} - +5) = (x(\tilde{i} + 2) + x(\tilde{i})) \bmod 2, \ 0 \leq \tilde{i} \leq 25 \quad \text{[Equation 6]}$$

An initial condition may be x(0)=0, x(1)=0, x(2)=0, x(3)=0, x(4)=1.

$c_0(n)$ and $c_1(n)$ which are sequences scrambled in Equation 3 may be determined as in an equation below.

$$c_0(n) = \tilde{c}((n + N_{ID}^{(2)}) \bmod 31) \quad \text{[Equation 7]}$$

$$c_1(n) = \tilde{c}((n + N_{ID}^{(2)} + 3) \bmod 31)$$

In Equation 7, $N_{ID}^{(2)} \in \{0,1,2\}$, and $\tilde{c}(i) = 1 - 2x(i)$ and $0 \leq i \leq 30$ may be determined as in an equation below.

$$x(\tilde{i} + 5) = (x(\tilde{i} + 3) + x(\tilde{i})) \bmod 2, \ 0 \leq \tilde{i} \leq 25 \quad \text{[Equation 8]}$$

An initial condition may be x(0)=0, x(1)=0, x(2)=0, x(3)=0, x(4)=1.

A sequence di(n) generated by Equations 3 to 8 above may be multiplied by an amplitude scaling factor ($\beta_{SSSS}$), and then mapped to a resource element ak,l of a second slot of the subframe. Equation 9 shows an example of ak,l.

$$a_{k,l} = d_i(n), \ n = 0, \ldots, 61 \quad \text{[Equation 9]}$$

$$k = n - 31 + \frac{N_{RB}^{SL} N_{sc}^{RB}}{2}$$

$$l = \begin{cases} 4, 5 & \text{normal cyclic prefix} \\ 3, 4 & \text{extended cyclic prefix} \end{cases}$$

NRBSC represents a size of a resource block expressed by the number of subcarriers in the frequency domain and NSLRB represents a sidelink band configuration expressed by a multiple of the NRBSC. k may represent a subcarrier index and l may mean a symbol index in a symbol.

FIG. 16 illustrates a mapping example in time domains of PSSS and SSSS in a normal CP.

The PSSS may be mapped to second and third symbols in the first slot of the subframe and the SSSS may be mapped to fifth and sixth symbols in the second slot.

It may be regarded that a UE providing the synchronization information to another UE may operate as a synchronization reference. The UE may provide information on synchronization through a sidelink broadcast channel (SL-BCH) additionally together with the SLSS.

Table 4 below shows an example of MasterinformationBlock-SL-V2X (MIB-SL-V2X) which is one example of the synchronization information transmitted through the SL-BCH.

TABLE 4

```
-- ASN1START
MasterInformationBlock-SL-V2X-r14 ::=    SEQUENCE {
   sl-Bandwidth-r14                      ENUMERATED {
      n6, n15, n25, n50, n75, n100},
   tdd-ConfigSL-r14                      TDD-ConfigSL-r12,
   directFrameNumber-r14                 BIT STRING (SIZE (10)),
   directSubframeNumber-r14              INTEGER (0..9),
   inCoverage-r14                        BOOLEAN,
   reserved-r14                          BIT STRING (SIZE (27))
}
-- ASN1STOP
```

'directFrameNumber' indicates a frame number in which the SLSS and the SL-BCH are transmitted for the V2X sidelink communication. A subframe in a frame corresponding to 'directFrameNumber' is indicated by 'directSubframeNumber'.

When a value of 'inCoverage' is 'TRUE', it is indicated that a UE transmitting the MIB-SL-V2X is within network (E-UTRAN) coverage. 'sl-Bandwidth' is a parameter representing a transmission band configuration, and for example n6 represents 6 resource blocks (RBs) and n15 represents 15 resource blocks.

FIG. 17 illustrates an example of a subframe in which a physical sidelink broadcast channel (PSBCH) for transmitting an SL-BCH is transmitted.

The PSSS may be mapped to second and third symbols in the first slot of the subframe and the SSSS may be mapped to fifth and sixth symbols in the second slot. In fifth and seventh symbols of the first slot, and a third symbol of the second slot, the DMRS may be mapped and transmitted. A last symbol of the second slot may be used as a guard time.

V2X Related Resource Allocation Method

LTE Rel-15 is further improved from LTE Rel-14 V2X while maintaining compatibility with the LTE Rel-14 V2X. To this end, in the LTE Rel-15 V2X, the following configurations may be additionally provided as compared with the LTE Rel-14 V2X.

The LTE Rel-15 V2X may support 64 Quadrature Amplitude Modulation (QAM) for a higher peak rate.

UE internal scheduling latency reduction may be supported.

More carriers may be supported in the sidelink. For example, up to four carriers may be supported in the sidelink.

Further, aggregating a plurality of carriers may also be supported. In this case, the number of transmission carriers is made to be smaller than the number of reception carriers to increase a system capacity. Further, for higher reliability, packet replication may also be supported.

There are transmission modes 1, 2, 3, and 4 in the sidelink,

In transmission mode ⅓, the eNB performs resource scheduling through a PDCCH (more specifically, DCI) to UE 1 and UE 1 performs D2D/V2X communication with UE 2 according to the corresponding resource scheduling. UE 1 may transmit, to UE 2, sidelink control information (SCI) through a physical sidelink control channel (PSCCH), and then transmit data based on the SCI through a physical sidelink shared channel (PSSCH). Transmission mode 1 may be applied to D2D and transmission mode 3 may be applied to V2X.

Transmission mode ⅔ may be regarded as a mode in which the UE autonomously performs scheduling. More specifically, transmission mode 2 may be applied to the D2D, and the UE autonomously selects a resource in a configured resource pool to perform a D2D operation. Transmission mode 4 may be applied to the V2X, and the UE may perform a V2X operation after autonomously selecting the resource within a selection window through a sensing process. UE 1 may transmit, to UE 2, the SCI through the PSCCH, and then transmit the SCI based data through the PSSCH. Hereinafter, the transmission mode may be abbreviated as a mode.

Control information which the eNB transmits to the UE through the PDCCH may be referred to as downlink control information (DCI), while control information which the UE transmits to another UE through the PSCCH may be referred to as SCI. The SCI may deliver sidelink scheduling information. In the SCI, there may be various formats, and for example, there may be SCI format 0 and SCI format 1.

SCI format 0 may be used for scheduling of the PSSCH. SCI format 0 may include a frequency hopping flag (1 bit), a resource block allocation and hopping resource allocation field (a bit number may vary depending on the number of resource blocks of the sidelink), a time resource pattern (7 bits), a modulation and coding scheme (MCS) (5 bits), a time advance indication (11 bits), a group destination ID (8 bits), etc.

SCI format 1 may be used for scheduling of the PSSCH. SCI format 1 may include a priority (3 bits), a resource reservation (4 bits), frequency resource locations of initial transmission and retransmission (the bit number may vary depending on the number of subchannels of the sidelink), a time gap between initial transmission and retransmission (4 bits), an MCS (5 bits), a retransmission index (1 bit), a reserved information bit, etc. The reserved information bit may be hereinafter abbreviated as a reserved bit. The reserved bit may be added until a bit size of SCI format 1 becomes 32 bits.

SCI format 0 may be used for transmission modes 1 and 2 and SCI format 1 may be used for transmission modes 3 and 4.

Hereinafter, resource allocation in modes 3 and 4 applied to the V2X will be described in more detail. First, mode 3 is described.

1. Mode 3

Mode 3 may be referred to as scheduled resource allocation. The UE may be in an RRC_CONNECTED state in order to transmit data.

FIG. 18 illustrates a case where a UE performs a mode 3 operation.

The UE may request transmission and reception resources to the eNB, and the eNB may schedule, to the UE, sidelink control information and/or a resource(s) for transmission and reception of data. In this case, a sidelink SPS may also be supported for the scheduled resource allocation. The UE may transmit and receive, to and from another UE, the sidelink control information and/or the data by using an allocated resource.

2. Mode 4

FIG. 19 illustrates a case where the UE performs a mode 4 operation.

Mode 4 may be referred to as a UE autonomous resource selection. The UE may perform sensing for (re)selection of a sidelink resource. The UE may randomly select/reserve the sidelink resource among the remaining resources other than a specific resource based on a sensing result. The UE may also perform up to two parallel standalone resource reservation processes.

Sensing and resource selection of Mode 4 are described in more detail.

FIG. 20 illustrates sensing and resource selection of mode 4.

As described above, the UE may perform sensing in order to select a mode 4 transmission resource.

For example, the UE may determine transmission resources reserved by another UE through sensing in a sensing window or resources being used by another UE, and randomly select a resource among resources having small interference among resources which remain after excluding the determined resources.

For example, the UE may decode a PDSCH including information on periods of the reserved resources within the sensing window, and measure a PSSCH RSRP in resources periodically determined based on the PSCCH. Resources in which the PSSCH RSRP value exceeds a threshold may be excluded within the selection window. Thereafter, the sidelink may be randomly selected among resources which remain within the selection window.

Alternatively, received signal strength indications (RSSIs) of periodic resources are measured within the sensing window to determine resource having small interference corresponding to lower 20%, for example. In addition, the sidelink resource may also be randomly selected among the resources included in the selection window among the periodic resources. For example, when decoding the PSCCH is unsuccessful, such a method may be used.

FIG. 21 illustrates a V2X transmission resource selection (/reservation) method according to a (partial) sensing operation.

When a condition defined in advance is satisfied, selection of a resource for V2X signal transmission may be triggered. For example, in subframe #m, it is assumed that the transmission resource selection is triggered. In this case, the UE may select the resource for the V2X signal transmission in a subframe interval from subframe #m+T1 up to subframe #m+T2. The subframe interval from subframe m+T1 up to subframe #m+T2 is referred to as the selection window. The selection window may be constituted by, for example, 100 consecutive subframes.

The UE may select a minimum of Y subframes as candidate resources within the selection window. The Y value may be a preconfigured value or a value configured by the network. Alternatively, how to select Y subframes within the selection window may also be a problem of UE implementation.

When the Y value is, for example, 50, the UE may select which 50 subframes among 100 subframes constituting the selection window are to be selected. For example, the UE may also select 50 subframes in which the subframe number is an odd number among 100 subframes, and select 50 subframes in which the subframe number is an even number. Alternatively, 50 subframes may be selected according to an arbitrary rule.

In order to select (/reserve) a specific subframe among Y subframes, e.g., subframe #N(SF #N) as a V2X transmission subframe capable of transmitting a V2X signal, the UE may have to sense at least one subframe linked to or associated with subframe #N.

A subframe interval defined for sensing may be referred to as a sensing window, and may be constituted by, for example 1000 subframes. That is, the sensing window may be constituted as 1000 milliseconds (ms) or 1 second.

For example, the UE may sense subframes corresponding to subframe #N-100*k (here, k may be a set of each element in a range of [1, 10], and may be a value preconfigured or configured by the network), within the sensing window.

In FIG. 21, a case where the k value is {1, 3, 5, 7, 10} is illustrated. That is, the UE may estimate/determine whether subframe #N is used by another V2X UE by sensing #N-1000, #N-700, #N-500, #N-300, #N-100 and/or whether there is interference of a threshold preconfigured or signaled on subframe #N, and finally select subframe #N according to the estimation/determination result.

Carrier Reselection

Carrier reselection for the V2X sidelink communication may be performed by an MAC layer based on a channel busy radio of configured carriers and a prose per packet priority to a V2X message to be transmitted.

That is, as parameters related to the carrier reselection, CBR and PPPP may be considered. The CBR may mean the portion of sub-channels in a resource pool in which it is sensed that a measured S-RSSI exceeds a preconfigured threshold. There may be PPPP related to each logic channel, and a latency required for both the UE and the eNB should be reflected to a configuration of a PPPP value.

During the carrier reselection, one or more carriers may be selected among candidate carriers in an increasing order from a lowest CBR.

Sidelink Congestion Control

A sidelink communication wireless environment may be easily congested according to a density of vehicles, an increase in transmission information amount, etc. In this case, various methods are applicable in order to reduce the congestion. As one example, there is a distributed congestion control.

In the distributed congestion control, the UE determines a congestion situation of the network and performs a transmission control. In this case, a congestion control considering a priority of traffic (e.g., packet) is required.

Specifically, each UE measures a channel busy ratio (CBR), and determines a maximum value CRlimitk of a channel use rate CRk which each traffic priority (e.g., k) may occupy according to the CBR. For example, the UE may derive the maximum value CRlimitk of the channel use rate for the priority for each traffic based on a CBR measurement value and a predetermined table. In the case of traffic having a relatively higher priority, a maximum value of a higher channel use rate may be derived.

Thereafter, the UE restricts a total sum of channel use rates of traffics in which the traffic priority k is lower than i to a predetermined value or less to perform the congestion control. According to such a method, a stronger channel use rate restriction is given to traffics having a relatively low priority.

Besides, the UE may also use a method such as magnitude adjustment of transmission power, drop of a packet, determination whether retransmission is performed, transport RB size adjustment (MCS adjustment), etc.

NR V2X

In order to extend a 3GPP platform to an automotive industry during 3GPP release 14 and 15, supporting the V2V and V2X services is introduced in LTE.

Requirements for supporting an enhanced V2X use case are largely organized into four use case groups.

(1) Vehicle platooning enables platoon in which vehicles move together to be dynamically formed. All vehicle of the platoon acquire information from a leading vehicle in order to manage the platoon. The information allows the vehicle to be driven harmonized than a normal direction, and to move in the same direction and operate together.

(2) Extended sensors allow raw or processed data collected through a local sensor or a live video image to be exchanged in the vehicle, a road site unit, a pedestrian device, and the V2X application server. The vehicle may increase perception for an environment at a higher degree which a sensor thereof may sense the environment, and a local situation more extensively and generally. A high data rate is one of the main features.

(3) Advanced driving enables anti-automatic or fully-automatic driving. Each vehicle and/or RSU shares its own recognition data obtained by a local sensor with a close vehicle, and allows the vehicle to synchronize and adjust trajectory or maneuver. Each vehicle shares a driving intention with a close driving vehicle.

(4) Remote driving allows a remote driver or a V2X application program to drive a remote vehicle for a passenger who cannot travel autonomously or with a remote vehicle which is in a dangerous environment. When a variation is limited and a route may be predicted like a public transportation, driving based on cloud computing may be used. High reliability and a low latency are key requirements.

The following description is applicable to both NR sidelink (SL) or LTE SL, and if radio access technology (RAT) is not displayed, the following description may mean the NR SL.

There may be six operating scenarios considered in NR V2X as follows.

FIGS. 22, 23, and 24 illustrate a standalone scenario supporting V2X SL communication. In particular, 1) In scenario 1, gNB provides a control/configuration for the V2X communication of the UE in both LTE SL and the NR SL.

2) In scenario 2, ng-eNB provides the control/configuration for the V2X communication of the UE in both the LTE SL and the NR SL.

3) In scenario 3, eNB provides a control/configuration for the V2X communication of the UE in both the LTE SL and the NR SL.

FIGS. 25, 26, and 27 illustrate an MR-DC scenario supporting V2X SL communication. In particular, 1) In scenario 4, the V2X communication of the UE in the LTE SL and the NR SL are controlled/configured by the Uu while the UE is configured to EN-DC, 2) In scenario 5, the V2X communication of the UE in the LTE SL and the NR SL are controlled/configured by the Uu while the UE is configured to NE-DC, and 3) In scenario 6, the V2X communication of the UE in the LTE SL and the NR SL are controlled/configured by the Uu while the UE is configured to NGEN-DC.

NR sidelink unicast, groupcast, and broadcast are described.

SL broadcast, groupcast, and unicast transmission are supported in in-coverage, out-of-coverage, and partial-coverage scenarios.

An AS protocol stack for the control plane of the PC5 interface is constituted at least by RRC, PDCP, RLC, and MAC lower layers and physical layers.

Physical Layer Structure

Physical layer structure and processing for a physical SL control channel (PSCCH), a physical SL shared channel (PSSCH), a physical SL feedback channel (PSFCH), etc., are described. A more detailed description regarding the physical layer processing is made with reference to the above-described contents.

Waveform

A single waveform is used for all SL channels of the carrier. CP-OFDM may be supported. DFT-S-OFDM may be supported, but SL synchronization, and coverage enhancement of the PSCCH and the PSFCH may be considered. When multiple waveforms are supported, which waveform is to be used may be determined according to a (pre-) configuration.

Subcarrier Spacing and Cyclic Prefix

In FR1, 15 kHz, 30 kHz, and 60 kHz SCSs are supported in the 60 kHz SCS having a normal CP and an extended CP. In FR2, 60 and 120 kHz SCSs are supported. In a given carrier, the UE need not receive SL transmission simultaneously by two or more combinations of the SCS and the CP, and need not transmit the SL transmission simultaneously by two or more combinations of the SCS and the CP. A numerology configuration is a part of an SL BWP configuration.

SL Bandwidth Part (BWP) and Resource Pool

The BWMP is defined for the SL and the same SL BWP is used for transmission and reception. In a licensed carrier, the SL BWP is defined apart from a Uu BWP. One SL BWP is (pre) configured for RRC IDLE and out-of-coverage NR V2X UEs in one carrier. For UEs in an RRC_CONNECTED mode, one SL BWP is activated in the carrier. No signal is exchanged through the SL for activation or deactivation of the SL BWP.

Only one SL BWP is configured in one carrier.

The resource pool is a set of time-frequency resources which may be used for SL transmission and/or reception. From the viewpoint of the UE, the resource pool is within the bandwidth of the UE in the SL BWP, and has a single numerology. Multiple resource pools may be (pre) configured in one carrier.

HARQ Feedback

In the case of SL unicast and groupcast, HARQ feedback and HARQ coupling in the physical layer are supported. An HARQ-ACK feedback for the PSSCH is transported an SL feedback control information (SFCI) format through the PSFCH.

When an SL HARQ feedback is enabled for the unicast, a reception UE generates the HARQ-ACK when successfully decoding a corresponding TB in the case of a non-codebook block group operation. When the corresponding TB is not successfully decoded after a related PSCCH targeting the reception UE is decoded, HARQ-NACK is generated.

When the SL HARQ feedback is enabled for the groupcast, two followings are enabled in the case of the non-CBG operation.

(Option 1): When the reception UE does not successfully decode the corresponding TB after an associated PSCCH, the reception UE transmits the HARQ-NACK to the PSFCH. If not the reception UE does not transmits a signal to the PSFCH.

(Option 2): When the reception UE successfully decodes the corresponding TB, the reception UE transmits the HARQ-ACK in the PSFCH. When the corresponding TB is not successfully decoded after the related PSCCH targeting the reception UE is decoded, the HARQ-NACK is transmitted to the PSFCH.

CSI Acquisition and Link Adaptation

In NR V2X, availabilities of information representing a channel between the transmission UE and the reception UE and information representing interference in the reception UE are considered if the information is enabled. An example of the information may be a CQI, a PMI, an RI, an RSRP, an RSRQ, a route gain/route loss, an SRS resource indicator (SRI), a CSI-RS resource indicator (CRI), an interference condition, a vehicle operation, etc.

Synchronization

V2X SL synchronization includes the following matters.

SL synchronization signal: SL primary synchronization signal (S-PSS) and SL secondary synchronization signal (S-SSS)

Physical SL broadcast channel (PSBCH)

SL synchronization sources and procedure

Using another SL signal and channel for SL synchronization, such as a reference signal and the PSCCH/PSSCH is also considered.

S-PSS, S-SSS, PSBCH

The S-PSS, the S-SSS, and the PSBCH are constituted by a block format (S-SSB) supporting periodic transmission. The S-SSB has the same numerology (i.e., SCS and CP length) as the PSCCH/PSSCH in the carrier, and a transmission bandwidth thereof is within a (preconfigured) SL BWP.

Synchronization Procedure

An SL synchronization source may be GNSS, gNB, eNB, and NR UEs. The eNB may become a synchronization source only for an NR UE supporting LTE Uu/PC5 or LTE Uu. In this case, an operation when the NR SL is synchronized with the LTE SL and NR and LTE SL synchronization procedures independently operate is considered Resource Allocation The NR V2X may define at least two following SL resource allocation modes.

(Mode 1): The base station schedules an SL resource(s) to be used by the UE for the SL transmission.

The NR Uu may allocate NR SL resources to cases of (i) a licensed carrier shared between the NR Uu and the NR SL and (ii) an NR SL dedicated carrier, and supports the following operations.

Dynamic resource allocation
Configured grant (Mode 2): The UE determines an SL transmission resource in the SL resource configured by the base station/network or a preconfigured SL resource, that is, the base station does not perform scheduling.

SL resource allocation mode 2 is defined as follows.
 a) The UE autonomously selects an SL resource to be transmitted.
 b) The UE helps SL resource selection for other UE(s).
 c) The UE is configured to an NR configured grant (similar to Type-1) for the SL transmission.
 d) The UE schedules SL transmission of other UEs.

Sensing and Resource Selection

A sensing procedure is defined as decoding the SCI(s) from other UEs and/or SL measurements. In a considered resource (reselection) procedure, a resource for the SL transmission is determined by using a result of the sensing procedure.

Mode 2(a)

In a situation of a semi-persistent configuration in which the resource is selected for multiple transmissions of other TBs and a dynamic configuration in which the resource is selected for each TB transmission, an SL sensing and resource selection procedure for Mode 2(a) may be considered.

The following procedures may be used for identifying an occupied SL resource.
 Decoding of SL control channel transmission
 SL measurement
 SL transmission detection In addition, matters may be considered for SL resource selection.
 Method in which the UE selects resources for PSCCH and PSSCH transmissions (and other SL physical channel/defined signal)
 Which the UE uses for a resource selection procedure Mode 2(b)

Mode 2(b) is a function which may become some of the operations of Modes 2(a), 2(c), and 2(d).

Mode 2(c)

For an outer-of-coverage operation, Mode 2(c) assumes a (pre) configuration of a single or multiple SL transmission patterns defined in each SL resource pool. For an in-coverage operation, Mode 2(c) assumes that a BS configuration represents the single or multiple SL transmission patterns defined in each SL resource pool. When one pattern is configured for the transmission pattern, if the UE configures multiple patterns without performing the sensing procedure, the sensing procedure may occur.

The 'pattern' is defined by a size and a location of the resource, and the number of resources in a time and a frequency.

Mode 2(d)

A procedure which becomes a scheduling UE for in-coverage and out-of-coverage scenarios or plays a role thereof may be considered as follows.

The scheduling UE is configured by the base station.
An application layer or pre-configuration selects the scheduling UE.
The reception UE schedules transmission of the transmission UE during a session.
The scheduling UE is determined by multiple UEs including a finally selected UE. The UE may autonomously determine to function as the scheduling UE/scheduling UE functions (i.e., self-nomination).

In a working group (WG1) of a current ETSI standardization group, a standardization task related to a collective perception service (CPM) message is performed in a facility layer (ETSI TR 102 562 V0.0.10).

The CPM message is basically a message for sharing sensor information acquired from a local sensor attached to the vehicle or the road side unit (RSU).

In respect to the use of the CPM message, it is also considered that the CPM message is used for sharing of the sensor information and aggregated cooperative awareness message (CAM) information.

It is considered that the aggregated CAM information is primarily transmitted in an infra-structure or a central system.

The CAM information delivered in each vehicle may be gathered in the infra-structure or central system, and the aggregated CAM information may be broadcasted to a specific region or a related vehicle.

In the present disclosure, in addition to information broadcasted by the CAM information in the RSU, even when the Uu interface capable vehicle collects positional information of a surrounding Uu interface non-capable vehicle and uploads the gathered positional information through the Uu interface, the corresponding information will be referred to as an aggregated CAM.

Transcoding

When a UE (e.g., vehicle) using 3GPP and a UE (e.g., vehicle) using ITS-G5 coexist on a road, mutual communication on the physical layer is technologically impossible.

Hereinafter, for convenience of description, the UE using the 3GPP will be expressed as a 3GPP UE or a 3GPP vehicle, and the UE using the ITS-G5, i.e., a UE not using the 3GPP will be expressed as a non-3GPP (or ITS-G5) or a non-3GPP (or ITS-G5) vehicle.

The 3GPP UE (or vehicle) may be a UE capable of using the Uu interface (or the Uu interface capable UE), and the non-3GPP UE (or vehicle) may be a UE incapable of using the Uu interface (or the Uu interface non-capable UE).

However, a transcoding method may be used in order to logically enable communication between the both UEs.

The transcoding is a concept in which a specific UE having two transmission/reception modules of 3GPP and ITS-G5 exists, and a message received through a 3GPP channel is transmitted through an ITS-G5 channel and a message received through the ITS-G5 channel is transmitted through the 3GPP channel to enable communication between both technologies.

FIG. 28 illustrates an example of transcoding to which a method proposed in the present disclosure may be applied.

FIG. 28 illustrates a case where the RSU performs transcoding with two types of reception modules of 3GPP and ITS-G5, and vehicle A and vehicle B transmit/receive a mutual message.

The expression of 'A/B' in the present disclosure may be construed as the same meaning as 'including at least one of A or B', and also expressed as 'A and/or B'.

FIG. 29 illustrates another example of transcoding to which a method proposed in the present disclosure may be applied.

FIG. 29 illustrates a case where vehicle C performs transcoding with two types of reception modules of 3GPP and ITS-G5, and vehicle A and vehicle B transmit/receive a mutual message.

FIG. 30 is a conceptual view for describing a 3GPP related term and a 3GPP related RAN structure to be used in the present disclosure.

A description related to FIG. 30 will be made with reference to the above-described V2X related description.

The base station may be represented as evolved NodeB (eNB), next generation NodeB (gNB), or a base station, and a user terminal may be expressed as a user equipment (UE), the vehicle, etc.

Further, an interface between the base station and the user terminal is expressed as a Uu interface.

The present disclosure will be described by assuming that the road side unit (RSU) is included in an eNB function.

In order to use CAM information aggregation, the vehicle on the road should be able to deliver positional information thereof to the RSU. In addition, the RSU that receives the positional information of the vehicle may broadcast (or multicast), to vehicles in a specific region, aggregation CAM information processed in a backend server based on the received information, or unicast the aggregation CAM information to a specific vehicle.

In this case, the following scenarios may be considered.
(Scenario 1)

Scenario 1 shows a case where only a 3GPP transmitter/receiver is mounted on the RSU.

Communication with the RSU is enabled as the Uu interface, and a vehicle having only an ITS-G5 communicator exists around, and there may be a case where CAM information of the vehicle should be collected and uploaded to the RSU or a case where CAM information of a vehicle which exists out of the Uu coverage should be collected and uploaded to the RSU.
(Scenario 2)

Scenario 2 shows a case where both ITS-G5 and 3GPP transmitters/receivers are mounted on the RSU.

The communication with the RSU is enabled through the Uu interface or the ITS-G5.

The RSU may overhear positional information of the vehicle mounted with the ITS-G5, but in this case, only short range CAM information may be aggregated.

In addition, when the RSU needs to aggregate CAM information of the vehicle in a wider area, efficiency may be increased through a Uu interface having wide coverage.

That is, when the Uu interface capable vehicle having the wide coverage should upload, to the RSU (base station), information of a surrounding Uu interface non-capable vehicle instead, a method for determining which vehicle uploads the information is efficient is required.

Hereinafter, unless particularly mentioned, as defined as above, the Uu interface capable vehicle will be expressed as the '3GPP vehicle' and the Uu interface non-capable vehicle will be expressed as the 'non-3GPP vehicle.'

When the 3GPP vehicle aggregates information of surrounding vehicles and delivers the aggregated information instead, the 3GPP vehicle should be able to transmit a message having a large size.

A case where all Uu interface capable vehicles aggregate and upload the information of the surrounding Uu interface non-capable vehicles may cause a channel load.

Further, there may be a disadvantage in that when too close Uu interface capable vehicles aggregate and upload the information of the surrounding vehicles, redundant data increase.

Accordingly, a method for determining which Uu interface capable vehicle is to upload information is required in order to evenly acquire information in a desired area while minimizing redundant positional information of vehicles.

Hereinafter, a method for determining a Uu interface capable vehicle for collecting the CAM information of the surrounding vehicles and transmitting the collected CAM information to the RSU proposed in the present disclosure will be described.

In the present disclosure, the vehicle, the UE, etc., may be construed to have the same meaning unless particularly mentioned.

Further, in the present disclosure, the base station, the RSU, the eNB, etc., may be construed to have the same meaning unless particularly mentioned.

Further, upload used in the present disclosure may be construed as the same meaning as delivery, transmission, etc.

First Embodiment

The first embodiment relates to a method for determining a vehicle for collecting surrounding vehicle information and transmitting the collected surrounding vehicle information to the RSU when the RSU has only a 3GPP channel transmission/reception function.

UEs capable of aggregating CAM information of surrounding vehicles and delivering the aggregated CAM information to the RSU may be divided into two following cases.

First: Vehicles capable of transmitting/receiving two channels of 3GPP and ITS-G5

Second: Vehicles having only the 3GPP channel transmission/reception function

The second vehicle may be requested to upload the CAM information instead from a UE having another 3GPP transmission/reception function, which exists in out-of-coverage of the Uu interface.

In this case, the UE which exists in the out-of-coverage may transmit information indicating that the UE exists in the out-of-coverage at the time of CAM broadcast.

In respect to two above cases (first and second cases), the following case should be considered in an issue for determining which UE is to upload (or transmit or deliver) CAM information acquired by aggregating surrounding information to the RSU (or base station) through the Uu interface.

Channel busy ratio (CBR): When positional information of the Uu interface non-capable vehicle is frequently uploaded through the Uu interface, there is an advantage in that accuracy increases, but a load is charged on the channel. Accordingly, an upload period should be able to vary depending on a CBR value.

Distance: When two Uu interface capable vehicles which are close in terms of a distance upload locations of surrounding Uu interface non-capable vehicles, redundant information may be a lot. In terms of the RSU receiving the information, receiving uniformly distributed information in coverage may increase efficiency.

A method for selecting the UE uploading the location to the RSU by considering two above cases is described below.

(Method 1)

Method 1 is a case where the base station determines the UE to upload.

The UE that aggregates and delivers the CAM information of the surrounding vehicles described above indicates, to the base station, that the UE itself is a UE capable of transmitting the aggregated CAM information.

In this case, a quantity of the information which may be uploaded may also be displayed together and transmitted to the base station.

The base station may request the upload to a UE which is at a required location by a unicast scheme. In this case, the base station may determine the UE which is to request the upload by considering the CBR, a distance between upload capable UEs, and the information quantity which may be uploaded, etc.

A case where the UEs which are to upload the information (the UEs determined by the base station) are uniformly distributed in Un coverage may become a help to rapidly determine positional information of the ITS-G5 vehicle in entire coverage.

Accordingly, when the RSU designates the vehicle to be uploaded, the RSU determines a distribution degree of uploaded vehicles to be distributed as much as possible.

The present disclosure also proposes an algorithm for the determination.

That is, a basic concept of the algorithm proposed in the present disclosure is illustrated in FIGS. 31 and 32 below.

The RSU first selects a random vehicle that transmits an indication indicating that an aggregate CAM is enabled.

In the case of FIG. 31, it is assumed that vehicle D is selected.

The RSU that receives aggregate CAM information from Vehicle D requests the aggregate CAM information to Vehicle C which is positioned most far from Vehicle D.

Next, the RSU requests the aggregate CAM information to Vehicle B which exists at a location most far from Vehicles D and C which are already selected.

In addition, as the vehicle which is to upload (the aggregated CAM information) next, a vehicle which is most far from the vehicle which uploads as above in terms of the distance is selected.

In FIG. 31, it can be seen that Vehicle B is selected.

Accordingly, the RSU requests the aggregate CAM upload to Vehicle B. Through such a method, a location of the ITS-G5 vehicle in the Uu coverage may be rapidly determined while the redundant information is made to be small.

FIG. 31 illustrates an example of a method for selecting a vehicle uploading aggregate CAM information to an RSU proposed in the present disclosure.

FIG. 32 illustrates another example of a method for selecting a vehicle uploading aggregate CAM information to an RSU proposed in the present disclosure.

A device required for applying Method 1 described above is as follows.

An FIFO buffer means a general memory buffer, and serves as a storage storing a location of a pre-selected vehicle.

It is possible to select a vehicle at a more distributed location as a length of FIFO increases. However, there is a disadvantage in that a processing time may become long.

Up to three FIFO buffers are required on the algorithm, and initial values of respective buffers are all set to 0.

In addition, in an aggregate CAM capable vehicle list, information on a vehicle which notifies that the aggregate CAM may be transmitted is listed up, and it is sufficient if the aggregate CAM capable vehicle list is constituted only by identifier (ID) and positional information.

This value may be periodically updated, and when the value is uploaded, the value is filled in the list at all times. If there is information which is not updated even though the update period elapsed, the information is removed.

FIG. 33 illustrates an example of a device required for an algorithm to be used when an RSU designates a vehicle which is to upload an aggregate CAM proposed in the present disclosure.

As described above, in order to select the vehicle which is most far from the pre-selected vehicle which is to upload the aggregate CAM, the RSU first selects a random value in the aggregated CAM capable of vehicle list of FIG. 33, and locates the selected random value in FIFO buffer ml.

In addition, this value is removed from the aggregated CAM capable vehicle list.

In addition, the RSU calculates and stores a sum of a distance difference between one location value in the aggregated CAM capable vehicle list and a location in FIFO.

In addition the RSU finds a value in which the distance difference is largest while repeating the above process by substituting the values in the aggregated CAM capable vehicle list one by one.

In this case, an ID corresponding to the found value becomes the vehicle which is to upload the aggregated CAM, and this value is moved to the FIFO and removed from the aggregated CAM capable vehicle list.

The vehicle which is to upload the aggregated CAM is selected while repeating the same process, and an aggregated CAM request is delivered to the corresponding vehicle.

FIG. 34 is a flowchart showing an example of a method for selecting a vehicle uploading the aggregate CAM in Uu coverage in a uniform area proposed in the present disclosure.

The method is described in brief with reference to FIG. 34.

As a precondition, the aggregated CAM capable vehicle may be signaled and periodically notified, and listed up at any moment.

First, the RSU lists up an aggregated CAM capable vehicle based on an ID and a position (SD3410). Here, all initial values of FIFO are 0.

In addition, the RSU determines a random vehicle in the corresponding list (S3420).

In addition, the RSU requests to upload aggregated CAM information to the determined vehicle (S3430).

Here, the method for determining the vehicle (S3420) is described in detail by the following algorithm.

First, the determined vehicle is removed from the corresponding list, and a value of the determined vehicle is moved to FIFO (S3421).

In addition, a largest value is selected as distance sum i by Equation 10 below, and the vehicle is accordingly determined (S3422 and S3423).

$$\text{distance\_sum\_i} = \sum_{i=1}^{n} \text{distance}(x_i, x_y), \text{ for all } i \quad \text{[Equation 10]}$$

Here, x_i represents a position of a vehicle which exists in the list, and has i=1, 2, . . . , list_end.

y_i represents a position value stored in an FIFO memory, and has j=1, 2, . . . , FIFO_end.

When the method illustrated in FIG. 34 is executed, selection of positions distributed to some degree is enabled, but the following problems may also occur.

In FIG. 35, position values of vehicles A, B and C are stored in the FIFO memory described above, and values of vehicles X and Y are position values stored in an aggregate CAM capability list.

When a vehicle which is to upload the aggregate CAM next is selected, it is more preferable to select vehicle X than vehicle Y.

The reason is that there is a high possibility that vehicle D already uploads the position of the surrounding ITS-G5 vehicle, and as a result, the case of vehicle Y will include redundant data.

However, when the above-described algorithm is applied, a situation occurs in which (d1+d2+d3)<(D1'+D2'+D3), and as a result, vehicle Y may be selected as the vehicle which is to upload the position next.

In order to prevent such a situation, when the position stored in the FIFO buffer and the position stored in the aggregate CAM capability list are compared with each other, a vehicle which is within a minimum distance may be excluded from a candidate group.

That is, in FIG. 35, when vehicle Y exits within a minimum distance from vehicle D in a current FIFO buffer, vehicle Y is excluded from a next upload vehicle candidate.

In this case, the minimum distance may be determined as approximately 250 m which is a stable communication distance of ITS-G5.

The vehicle at the distributed position may be configured as a target vehicle of an upload request through such a process.

FIG. 35 is a diagram illustrating an example of a comparison of a distance sum between a vehicle stored in an FIFO buffer and an upload candidate vehicle proposed in the present disclosure.

When the above-described algorithm is enhanced by such a method, an operation method is described in FIG. 36.

That is, FIG. 36 is a flowchart showing an algorithm for determining an upload vehicle at a distributed location by considering a minimum distance proposed in the present disclosure.

When FIG. 36 is described, a different part from FIG. 34 is described.

A precondition, S3610, S3620, and S3630 are the same as the precondition S3410, S3420, and S3430, and different parts are primarily described.

In step S3420, the RSU determines a maximum value of distance sum i by using Equation 11 below to determines a vehicle which is to transmit the aggregated CAM information.

$$\begin{aligned}&\text{for } i = 1\text{: lis\_end} \\ &\quad \text{if } (\text{distance}(x\_i, y\_i) < \text{minimum\_distance}) \\ &\quad\quad \text{Break;} \\ &\quad \text{Else} \\ &\quad\quad \text{distance\_sum\_i} = \sum\nolimits_{i=1}^{n} \text{distance}(x_i, x_y), \\ &\quad\quad (j = 1, 2, \ldots, \text{FIFO\_end})\end{aligned}$$

[Equation 11]

To this end, the vehicle should periodically notify, to the RSU, that the vehicle is a vehicle capable of uploading a CAM aggregation message as described above because both LTE_V2X communication and ITS-G5 communication are enabled.

In this case, a field representing whether both the LTE_V2X communication and the ITS-G5 communication are enabled may be added to a CAM message which is periodically updated.

FIG. 37 illustrates an example of a structure a CAM message proposed in the present disclosure.

Referring to FIG. 37, the CAM message includes the following fields (containers).

StationType: represents a type of a station which transmits a message. That is, StationType indicates a type of a passenger car, a bus, a truck, etc.

ReferencePosition: indicates a position of the vehicle at the time when the vehicle sends the message.

Therefore, a field to be added for the present disclosure, i.e., a field representing whether both the LTE_V2X communication and the ITS-G5 communication are enabled is as follows.

CommunicationType: indicates a communication type which the vehicle itself may support, such as Uu-interface(0), ITS_G5(1), Uu-interface+ITS_G5(2), etc.

The RSU which receives information of the field may give a request command to the vehicle determined according to the algorithm to distribute and report the aggregation CAM information, which is described above when the aggregation CAM information is required.

(Method 2)

Method 2 relates to a method in which the UE uploads the aggregated CAM information without a control of the base station.

(Method 2-1)

Method 2-1 is a method for setting and uploading a timer according to a mutual distance between vehicles which is uploaded to the base station.

In the case of Method 2-1, as in Method 1 above, when the base station requests the RSU to the vehicle, an additional signal for the RSU may be required, and a resulting delay may occur.

Accordingly, it may be preferable that the vehicle autonomously determines whether to report the information by determining a mutual upload situation without a control of the RSU.

In this case, the UE which may upload the aggregated CAM information to the RSU follows the method.

In the following method, the UE autonomously determines whether to upload the aggregated CAM information, and when the CBR is low, the upload period is shortened in overall, and a distance between UEs which upload the aggregated CAM information also decreases to increase accuracy of the aggregated CAM.

On the contrary, when the CBR is high, the UE lengthens the upload period and also increases the distance between the UEs uploading the aggregated CAM information to reduce the load charged on the channel.

However, in the above method, positional accuracy may deteriorate.

Specifically, the UE determines a CBR threshold for determining a channel status, and determines the resulting channel status.

In addition, the UE may determine a minimum-time, a back-off time, and a minimum-distance according to the channel status.

In this case, the CBR value may also be determined by the base station and notified to the UE, and may also be a value measured by each UE. Table 5 below is a table showing an example of the minimum-time, a back-off time set, and the minimum distance according to the channel status.

TABLE 5

| Channel status | Minimum-time | Back-off time | Minimum distance |
|---|---|---|---|
| relaxed | T1 | back-off set 1 | D1 |
| active | T2 | back-off set 2 | D2 |
| restrictive | T3 | back-off set 3 | D3 |

Here, the channel status indicates a busyness degree of the channel, and in Table 5 above, a channel load increases in the order of restrictive, active, and relaxed.

Minimum-times T1, T2, and T3 may be the same value or may be different.

Even though the above values are different, a magnitude value order of T3>T2>T1 should be maintained. This causes the aggregated CAM information to be uploaded with a longer period as a channel load is larger.

The back-off time set may represent an integer set, and all back-off time sets may be the same value or different values.

When the back-off time sets are different, a range of a magnitude value included in the set should follow an order of set3>set2>set1. That is, the range of the value included in set3 is widened, and as a result, when the channel is busy, the aggregated CAM information is uploaded more slowly.

For example, the integer set may be constructed like set3={1, 2, 3, ... , 1023}, set2={1, 2, 3, ... , 511}, and set 1={1, 2, 3, ... , 255}.

The minimum distance represents a distance from the UE. The minimum distance has a magnitude value order of D3>D2>D1, and as the channel is in a more busy state, a distance between uploaded UEs increases, and as a result, an uploaded CAM value is duplicated, thereby reducing an upload possibility.

When the minimum-time, the back-off time set, and the minimum distance are determined according to the channel status, the UE operates as follows.

All subjects of the following operation are the Uu interface capable UEs capable of transmitting the aggregated CAM.

First, the UE (Uu interface capable UE) selects a random value in the back-off time set and sets the timer when there is not aggregated CAM information which the surrounding UE uploads for the minimum-time.

In addition, when there is no aggregate CAM information which the surrounding UE uploads until the timer times out, the UE uploads the aggregated CAM information collected thereby.

Here, the uploaded aggregated CAM includes an indication distinguished from a CAM just indicating only the position thereof.

If the timer of the UE is set, but another UE uploads the aggregated CAM, the UE confirms whether the UE itself exists in a distance far from the UE uploading the aggregated CAM by the minimum distance.

When the UE exists within the minimum distance of the UE uploading the aggregated CAM, the UE releases the set timer.

On the contrary, if the UE exists out of the minimum distance of the UE uploading the aggregated CAM, the UE continuously maintains the set timer value.

If another UE within the minimum distance does not upload the aggregated CAM until the timer times out, the UE uploads the aggregated CAM information stored thereby.

FIG. 38 is a diagram illustrating an example of a method for determining an aggregated CAM upload vehicle without a BS control proposed in the present disclosure.

In FIG. 38, vehicles A, B, and C as the Uu interface capable vehicles are capable of uploading the aggregated CAM to the RSU.

The minimum-time, the back-off time set, and the minimum distance are determined according to channel busyness.

In this case, a degree of the channel busyness may be broadcasted through a control signal by the base station or determined based on a value measured by each vehicle.

When there is no vehicle which uploads the aggregated CAM within a minimum-distance radius for the minimum-time, a random value is selected among the back-off time sets, and each vehicle sets an internal timer as large as the corresponding value.

In FIG. 38, if any one of vehicles A, B, and C does not upload the aggregated CAM, each vehicle selects the random value in the back-off time set and sets a timer thereof.

If the timer of another vehicle B within the minimum-distance does not time out until the timer of vehicle A times out, vehicle A uploads the aggregated CAM to the RSU.

Since vehicle B which hears this belongs to the minimum-distance, vehicle B releases the timer thereof.

Since vehicle C exists out of the minimum-distance of vehicle A, even though vehicle A uploads the aggregated CAM, vehicle A does not release the timer thereof.

When the timer of vehicle A times out, vehicle C uploads the aggregated CAM information acquired by aggregating the information of the surrounding vehicles to the RSU.

As the Minimum-time, back-off time set, and Minimum-distance values are smaller, the CAM information is frequently updated, and a lot of redundant information is also included.

Since when a lot of redundant information is included, the redundant information is frequently updated, the accuracy of the information may increase.

On the contrary, as the Minimum-time, back-off time set, and Minimum-distance values are larger, an update time interval may increase and the accuracy may be lowered.

FIG. 39 is a flowchart showing an example of a method for uploading an aggregated CAM by differently setting a timer according to an inter-vehicle mutual distance uploaded to a BS proposed in the present disclosure.

Referring to FIG. 39, a vehicle (vehicle 1) capable of the ITS-G5 communication with the Uu interface aggregates CAM information of a vehicle (vehicle 2) capable of only the ITS-G5 communication through an ITS-G5 communication network.

Next, if there is no signal to upload the aggregate CAM for the minimum-time, vehicle 1 selects a random value in a back-off set determined according to the CBR value, and then sets the timer thereof.

If another vehicle does not upload the aggregate CAM in this state, vehicle 1 uploads the aggregate CAM through the Un interface when the set time times out.

However, if another vehicle uploads the aggregated CAM, vehicle 1 calculates a distance difference between the corresponding vehicle (the vehicle uploading the aggregated CAM) and vehicle 1.

If the calculated distance value belongs within the minimum distance, vehicle 1 releases the timer thereof and prepares for the aggregate CAM again.

On the contrary, if the calculated distance value belongs out of the minimum distance, vehicle 1 uploads the aggregate CAM information through the Uu interface at the time of the time-out by maintaining the timer thereof as it is.
(Method 2-2)

Method 2-2 relates to a method for uploading the aggregated CAM information by dynamic grouping without inter-vehicle negotiation.

A case may be considered, in which when a specific vehicle aggregates and uploads the surrounding information, the specific vehicle forms a group and selects a most appropriate vehicle through the negotiation in the group, and then the selected vehicle uploads the information, In this case, the reason is that when a header is selected by clustering and the header uploads the information as a representative, total channel efficiency may increase.

Clustering may be construed as the same meaning as grouping.

However, since a movement speed of the vehicle is high and a change degree of the movement speed is also dynamic, there are many cases in which a sufficient time for the clustering and the negotiation is not secured.

Accordingly, Method 2-2 proposes a method in which the Uu-interface capable vehicle aggregates CAM information of surrounding ITS-G5 and uploads the aggregated CAM information to the RSU, however, may upload the CAM information through dynamic grouping without the negotiation.

FIG. 40 is a diagram illustrating a dynamic grouping method proposed in the present disclosure.

That is, FIG. 40 is a diagram for describing a disclosure to be described below when the Uu-interface capable vehicle aggregates and uploads information of surrounding ITS-G5.

In this case, it is assumed that all Un-interface capable vehicles capable of uploading the aggregate CAM uploads the message according to a predetermined period.

In this case, the upload period may vary depending on the CBR, and the upload period may be determined and notified in the RSU, and the vehicle may also autonomously judge and determine the upload period.

In such a situation, when the aggregated CAM is uploaded, information the vehicle uploaded by another aggregate CAM is removed.

In FIG. 40, when it is assumed that all ITS-G5 communication vehicles simultaneously update the CAM information, all vehicles A, B, and C capable of making the aggregate CAM may construct the aggregate CAM information for the following vehicles.

Vehicle A=aggregate CAM {Vehicle 1, Vehicle 2, Vehicle 3}
Vehicle B=aggregate CAM {Vehicle 3, Vehicle 4}
Vehicle C=aggregate CAM {Vehicle 4, Vehicle 5, Vehicle 6}

When timings when vehicles A, B, and C upload the aggregate CAM are equal to each other, it is anticipated that all of the information will be uploaded.

However, when the timings when vehicles A, B, and C upload the aggregate CAM are different from each other, redundant CAM information is removed and the aggregate CAM information is constructed.

An upload order through the Uu-interface is random, but when the order is determined as an order of vehicle A, vehicle B, and vehicle C, each aggregate cam is constructed and uploaded as follows.

Vehicle A=aggregate CAM {Vehicle 1, Vehicle 2, Vehicle 3}
Vehicle B=aggregate CAM {Vehicle 3, Vehicle 4}
Vehicle C=aggregate CAM {Vehicle 4, Vehicle 5, Vehicle 6}

That is, the above method is a method for uploading the aggregate CAM by removing information which is the same as the information transmitted just previously.

This indirectly shows the same function as a grouping effect between vehicles by removing mutual redundant information.

In order to operate such a function, the RSU compares contents of all transmitted aggregate CAMs for each ID of the vehicle to find the same ID and remove information in which related contents are the same as contents thereof.

However, it is anticipated that such an operation causes a lot of hardware loads to be generated.

In order to effectively operate the above dynamic grouping method, the following CAM list management method is required when generating the aggregate CAM.

FIG. 41 is a diagram illustrating an example of an inter-communication module structure of a vehicle capable of performing CAM aggregation proposed in the present disclosure.

Up to a facility layer, the message may be received according to ITS-G5 and LTE V2X stacks.

On the contrary, a structure is illustrated, in which the message may also be transmitted according to a stack suitable for each communication module in the facility layer. A CAM aggregation function may exist in the facility layer.

A proposed structure for removing the same message described above exists in a CAM generation function, and an operation therefor is illustrated in FIG. 42 (FIG. 18).

FIG. 42 is a diagram illustrating an example of a CAM generation function operation proposed in the present disclosure.

Referring to FIG. 42, CAM information input through ITS-G5 is continuously written in a CAM list.

In this case, information corresponding to the same ID is updated to the same position.

On the contrary, the vehicle that aggregates the CAM information receives aggregate CAM information 8uploaded by another surrounding LTE_V2X to remove the redundant information to continuously remove a value corresponding to an uploaded ID.

Since a timing when the message is received in ITS-G5 is also random and a timing when the message is received in LTE_V2X is also random, the corresponding vehicle manages the CAM list whenever the corresponding vehicle receives the message.

When a CAM aggregation trigger signal indicates that CAM aggregation should be performed, the corresponding vehicle reads a value which exists in a current CAM list to perform the CAM aggregation.

The CAM aggregation trigger signal may a periodically generated signal (e.g., when the period is determined according to the CBR without the control of the base station) or a signal received from the RSU (when the base station controls).

FIG. 43 is a flowchart showing an example of a method for transmitting aggregated CAM information through dynamic grouping proposed in the present disclosure.

Referring to FIG. 43, a vehicle that aggregates and reports the CAM information manages one CAM list in ITS_G5 and LTE_V2X modules for CAM aggregation.

In addition, the corresponding vehicle continuously writes and updates the CAM information received ITS-G5, and information included in aggregate CAM information received in LTS_V2X is removed from the CAM list to operate the CAM list.

When the aggregate CAM trigger signal is input, the corresponding vehicle aggregates CAM information which currently remains and constructs the aggregate CAM, and broadcasts the constructed aggregate CAM and uploads the aggregate CAM to the Un-interface.

The redundant information may be prevented from being uploaded without determining which vehicle among the vehicles is to upload the aggregated CAM information through such a process and whether the corresponding vehicle is included in the group uploading the aggregated CAM information.

This may show the same as effect as uploading the aggregated CAM information by a specific header through inter-vehicle grouping without the negotiation.

(Method 3)

In Method 3, when the base station designates a specific geographical area which intends to be delivered with the aggregated CAM, only a UE which exists in the corresponding area uploads the aggregated CAM information.

The method operates similarly to the method introduced in Method 2 described above, however, when the base station determines and notifies a geographical area requiring the aggregated CAM information, only a vehicle which belongs to the corresponding area updates the aggregated CAM information.

The Uu interface capable vehicle recognizes whether the Uu interface capable vehicle itself exists in a specific geographical area designated by the RSU, and then when determining that the Uu interface capable vehicle itself exists in the designated geographical area, the Uu interface capable vehicle uploads the aggregated CAM information in the area by the scheme described in Method 2 described above.

In addition, a vehicle which exists out of the designated geographical area does not upload the CAM information.

Second Embodiment

The second embodiment relates to a method for determining a vehicle for collecting surrounding vehicle information and transmitting the collected surrounding vehicle information to the RSU when the RSU has two types of transmission/reception functions of 3GPP and ITS-G5.

When it is assumed that the RSU is capable of transmission/reception for two cases of 3GPP and ITS-G5 channels, the RSU may hear all information of vehicles in short range coverage of ITS-G5.

However, the Uu interface capable vehicle needs to aggregate information of surrounding vehicles and transmit the aggregated information to the RSU in respect to vehicles which exists out of coverage of ITS-G5.

In this case, when a geographical area capable of determining a position of a vehicle having an ITS-G5 interface based on the RSU is notified through the Uu interface, a Uu interface capable vehicle which exists out of the geographical area aggregate information of surrounding Uu interface non-capable vehicles and uploads the aggregated information to the RSU.

FIG. 44 is a diagram illustrating an example of a method for uploading an aggregated CAM except for a specific geographical area proposed in the present disclosure.

Referring to FIG. 44, Uu interface capable vehicles A and B which exist in an ITS-G5 short range coverage area around the RSU do not upload the aggregated CAM information.

Vehicles C and D which exist out of ITS-G5 short range coverage aggregate information of surrounding Uu interface non-capable vehicles and uploads the aggregated CAM information to the RSU through the Uu interface.

In this case, a method for selecting (or determining) the vehicle uploading the aggregated CAM information may adopt Method 2 described above.

FIG. 45 is a flowchart showing an operation method of a vehicle for performing a method proposed in the present disclosure.

That is, FIG. 45 illustrates an operation method of a vehicle for transmitting a plurality of cooperative awareness message information in the V2X system.

First, a vehicle transmits, to a base station, a first message including first information representing whether aggregation of a plurality of CAM information is possible through a first interface (S4510).

In addition, the vehicle receives, from the base station, a second message requesting transmission by combining the plurality of CAM information (S4520).

In addition, the vehicle receives, from surrounding vehicles, the plurality of CAM information through a second interface (S4530).

Here, the vehicle may additionally perform processing to combine the plurality of CAM information received from the surrounding vehicles.

In addition, the vehicle transmits, to the base station, a third message including the plurality of CAM information through the first interface (S4540).

Here, the first message may further include second information on a communication type supported by a vehicle.

In addition, the second control information may represent a type supporting only 3GPP communication, a type supporting both the 3GPP communication and ITS-G5 communication, or a type supporting only the ITS-G5 communication.

The first message may further include third information representing a quantity for a plurality of combinable CAM information.

In addition, the second message may be transmitted to the vehicle based on at least one of a channel busy ratio (CBR), a distance between vehicles capable of combining a plurality of CAM information, or the third information.

The first interface may be a Uu interface, and the second interface may be an ITS-G5 communication related interface.

Further, the vehicle may be located within a specific geographical area.

FIG. 46 is a flowchart showing an operation method of a BS for performing a method proposed in the present disclosure.

That is, FIG. 46 illustrates an operation method of a base station for receiving a plurality of cooperative awareness message information in the V2X system.

Here, the base station may be expressed even as the RSU.

First, the base station receives, from at least one vehicle, a first message including at least one of first information representing whether aggregation of a plurality of CAM information is possible or second information representing a quantity for a plurality of combinable CAM information through a first interface (S4610).

In addition, the base station determines a specific vehicle to transmit by combining the plurality of CAM information based on at least one of the first message, a channel busy ratio (CBR), or a distance between vehicles capable of combining the plurality of CAM information (S4620).

In addition, the base station transmits, to the specific vehicle, a second message requesting transmission by combining the plurality of CAM information through the first interface (S4630).

In addition, the base station receives, from the specific vehicle, a third message including the plurality of CAM information through the first interface (S4640).

The first message may further include third information on a communication type supported by a vehicle.

Here, the third control information may represent a type supporting only 3GPP communication, a type supporting both the 3GPP communication and ITS-G5 communication, or a type supporting only the ITS-G5 communication.

In addition, the first interface may be a Uu interface, and the second interface may be an ITS-G5 communication related interface.

The specific vehicle may be located within a specific geographical area.

V2X Communication Device

FIG. 47 illustrates a configuration of a V2X communication device according to an embodiment of the present disclosure. As described above, the V2X communication device may be referred to as a V2X communication device, a V2X device, etc.

The vehicle, the base station, etc., described above may include the V2X communication device descried in FIG. 47.

Alternatively, each of the vehicle and the base station may also perform a function as the V2X communication device.

In FIG. 47, a V2X communication device 4700 may include an RF unit 4710, a processor 4720, and a memory 4730.

The RF unit is connected with the processor to transmit and/or receive a radio signal. The communication unit may transmit a signal by upconverting data received from the processor to a transmission/reception band or downconvert a received signal. The RF unit may implement at least one operation between a physical layer or an access layer.

The RF unit may include multiple sub RF units for communicating in accordance with multiple communication protocols. As the embodiment, the RF unit may perform data communication based on Dedicated Short Range Communication (DSRC), IEEE 802.11 and/or 802.11p standard-based communication technology, ITS-G5 wireless communication technology based on physical transmission technology of the IEEE 802.11 and/or 802.11p standards, 2G/3G/4G (LTE)/5G wireless cellular communication technology including satellite/broadband wireless mobile communication, broadband terrestrial digital broadcasting technology such as DVB-T/T2/ATSC, GPS technology, IEEE 1609 WAVE technology, and the like. The RF unit may include a plurality of transceivers implementing each communication technology.

Further, the RF unit may include a transmitter and a receiver, and also expressed as an RF module, a communication unit, etc.

The processor is connected to the RF unit to implement operations of layers of the V2X communication device. The processor may be configured to perform operations in accordance with various embodiments of the present disclosure in accordance with the aforementioned drawings and descriptions. Further, at least one of a module, data, a program, or software that implements the V2X communication device according to various embodiments of the present disclosure may be stored in the memory and executed by the processor.

The memory is connected with the processor to store various information for driving the processor. The memory may be included inside the processor or installed outside the processor, and connected to the processor by a known means.

The processor of the V2X communication device may perform the method descried in the present disclosure.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

When embodiments are implemented by firmware or software, one embodiment of the disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the disclosure can be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL APPLICABILITY

The disclosure is used in a series of V2X communication fields.

It is obvious to those skilled in the art that the disclosure can be changed and modified in various ways without departing from the spirit or range of the disclosure. Accordingly, the disclosure is intended to include all the changes and modifications provided by the appended claims and equivalents thereof.

What is claimed is:

1. A method for transmitting a plurality of Cooperative Awareness Message (CAM) information in a V2X system, the method performed by a vehicle comprising:
    transmitting, to a base station, a first message including first information representing whether aggregation of the plurality of CAM information is possible through a first interface;
    receiving, from the base station, a second message requesting transmission by combining the plurality of CAM information;

receiving, from surrounding vehicles, the plurality of CAM information through a second interface; and transmitting, to the base station, a third message including the plurality of CAM information through the first interface, wherein a transmission period of the third message is determined based on a Channel Busy Ratio (CBR) of a channel between the vehicle and the base station, wherein the third message is transmitted to the base station based on no other vehicle transmitting CAM information to the base station before a timer expires, and wherein the timer is configured to a specific value based on the CBR.

2. The method of claim 1, further comprising:

performing processing to combine the plurality of CAM information received from the surrounding vehicles.

3. The method of claim 2, wherein the second information represents a type supporting only 3GPP communication, a type supporting both the 3GPP communication and ITS-G5 communication, or a type supporting only the ITS-G5 communication.

4. The method of claim 1, wherein the first message further includes second information on a communication type supported by a vehicle.

5. The method of claim 1, wherein the first message further includes third information representing a quantity for a plurality of combinable CAM information.

6. The method of claim 5, wherein the second message is transmitted to the vehicle based on at least one of the CBR, a distance between vehicles capable of combining a plurality of CAM information, or the third information.

7. The method of claim 1, wherein the first interface is a Uu interface, and wherein the second interface is an ITS-G5 communication related interface.

8. The method of claim 1, wherein the timer is configured to the specific value, based on no other vehicle within a specific radius of the vehicle is transmitting the third message to the base station, and wherein the specific value and the specific radius are each configured based on the CBR.

9. A method for receiving a plurality of Cooperative Awareness Message (CAM) information in a V2X system, the method performed by a base station comprising:

receiving, from at least one vehicle, a first message including at least one of first information representing whether aggregation of the plurality of CAM information is possible or second information representing a quantity for a plurality of combinable CAM information through a first interface;

determining a specific vehicle to transmit by combining the plurality of CAM information based on at least one of the first message, a channel busy ratio (CBR), or a distance between vehicles capable of combining the plurality of CAM information;

transmitting, to the specific vehicle, a second message requesting transmission by combining the plurality of CAM information through the first interface; and receiving, from the specific vehicle, a third message including the plurality of CAM information through the first interface, wherein a transmission period of the third message is determined based on the CBR of a channel between the specific vehicle and the base station, wherein the third message is transmitted to the base station based on no other vehicle transmitting CAM information to the base station before a timer expires, and wherein the timer is configured to a specific value based on the CBR.

10. The method of claim 9, wherein the first message further includes third information on a communication type supported by a vehicle.

11. The method of claim 10, wherein the third information represents a type supporting only 3GPP communication, a type supporting both the 3GPP communication and ITS-G5 communication, or a type supporting only the ITS-G5 communication.

12. The method of claim 9, wherein the first interface is a Uu interface, wherein the second interface is an ITS-G5 communication related interface.

13. A V2X communication device of a vehicle, comprising:

memory for storing data;

a transmitter for transmitting a radio signal;

a receiver for receiving a radio signal; and a processor for controlling the memory, the transmitter, and the receiver, wherein the processor is configured to control:

the transmitter to transmit, to a base station, a first message including first information representing whether aggregation of a plurality of CAM information is possible through a first interface;

the receiver to receive, from the base station, a second message requesting transmission by combining the plurality of CAM information;

the receiver to receive, from surrounding vehicles, the plurality of CAM information through a second interface; and the transmitter to transmit, to the base station, a third message including the plurality of CAM information through the first interface, wherein a transmission period of the third message is determined based on a Channel Busy Ratio (CBR) of a channel between the vehicle and the base station, wherein the third message is transmitted to the base station based on no other vehicle transmitting CAM information to the base station before a timer expires, and wherein the timer is configured to a specific value based on the CBR.

* * * * *